United States Patent
Meng

(10) Patent No.: US 12,534,541 B2
(45) Date of Patent: Jan. 27, 2026

(54) ANTI-PTK7 ANTIBODY AND USES THEREOF

(71) Applicant: MABCARE THERAPEUTICS, Shanghai (CN)

(72) Inventor: Tao Meng, Shanghai (CN)

(73) Assignee: MABCARE THERAPEUTICS, Shanghai (CN)

( * ) Notice: Subject to any disclaimer, the term of this patent is extended or adjusted under 35 U.S.C. 154(b) by 0 days.

(21) Appl. No.: 19/053,626

(22) Filed: Feb. 14, 2025

(65) Prior Publication Data

US 2025/0223378 A1  Jul. 10, 2025

Related U.S. Application Data

(63) Continuation of application No. PCT/CN2024/084819, filed on Mar. 29, 2024.

(30) Foreign Application Priority Data

Apr. 26, 2023 (CN) .......................... 202310466219.X

(51) Int. Cl.
C07K 16/40 (2006.01)
A61K 47/68 (2017.01)
A61P 35/00 (2006.01)

(52) U.S. Cl.
CPC .......... *C07K 16/40* (2013.01); *A61K 47/6803* (2017.08); *A61K 47/68037* (2023.08); *A61K 47/6871* (2017.08); *A61P 35/00* (2018.01); *C07K 2317/24* (2013.01); *C07K 2317/565* (2013.01); *C07K 2317/92* (2013.01)

(58) Field of Classification Search
CPC ................ C07K 16/40; C07K 2317/24; C07K 2317/565; C07K 2317/92; A61K 47/6803; A61K 47/68037; A61K 47/6871; A61P 35/00

See application file for complete search history.

(56) References Cited

U.S. PATENT DOCUMENTS

| | | | |
|---|---|---|---|
| 4,816,567 A | 3/1989 | Cabilly et al. | |
| 6,407,115 B1 | 6/2002 | Terasawa et al. | |
| 9,777,070 B2 | 10/2017 | Damelin et al. | |
| 2015/0315293 A1* | 11/2015 | Damelin | A61P 35/00 435/375 |
| 2018/0086834 A1* | 3/2018 | Fournier | C12N 15/79 |
| 2020/0345863 A1 | 11/2020 | Viricel | |
| 2022/0411436 A1 | 12/2022 | Zhu et al. | |
| 2023/0091510 A1 | 3/2023 | Chen et al. | |
| 2023/0099149 A1 | 3/2023 | Kraiem | |

FOREIGN PATENT DOCUMENTS

| | | |
|---|---|---|
| CN | 101360761 A | 2/2009 |
| CN | 101939028 A | 1/2011 |
| CN | 106659801 A | 5/2017 |
| CN | 107109405 A | 8/2017 |
| CN | 110214141 A | 9/2019 |
| EP | 3711780 A2 | 9/2020 |
| EP | 3897735 A1 | 10/2021 |
| WO | WO-2019036724 A2 | 2/2019 |
| WO | WO-2021182574 A1 | 9/2021 |
| WO | WO-2021252708 A1 | 12/2021 |
| WO | WO-2022228493 A1 | 11/2022 |
| WO | WO-2023280227 A2 | 1/2023 |
| WO | WO-2024222384 A1 | 10/2024 |

OTHER PUBLICATIONS

Dondelinger M et al. Understanding the Significance and Implications of Antibody Numbering and Antigen-Binding Surface/Residue Definition. (Front Immunol. Oct. 16, 2018;9:2278) (Year: 2018).*
Dessaux C et al. Recent insights into the therapeutic strategies targeting the pseudokinase PTK7 in cancer. (Oncogene 2024 43, 1973-1984) (Year: 2024).*
Almagro JC & Fransson J, Humanization of antibodies. Frontiers in Bioscience 2008; 13:1619-33 (Year: 2008).*
Chiu ML et al. Antibody Structure and Function: The Basis for Engineering Therapeutics. Antibodies 2019 8, 55, 1-80 (Year: 2019).*
Hasegawa H et al. Single amino acid substitution in LC-CDR1 induces Russell body phenotype that attenuates cellular protein synthesis through eIF2α phosphorylation and thereby downregulates IgG secretion despite operational secretory pathway traffic. (mAbs 2017, 9(5) 854-873) (Year: 2017).*
Wagner HJ et al. A Two-Step Approach for the Design and Generation of Nanobodies. (Int J Mol Sci. 2018 19(11): 3444) (Year: 2018).*
Behrens CR et al. Antibody-Drug Conjugates (ADCs) Derived from Interchain Cysteine Cross-Linking Demonstrate Improved Homogeneity and Other Pharmacological Properties over Conventional Heterogeneous ADCs. (Mol. Pharmaceutics 2015, 12, 11, 3986-3998) (Year: 2015).*
Kong C et al. MTX-13, a Novel PTK7-Directed Antibody-Drug Conjugate with Widened Therapeutic Index Shows Sustained Tumor Regressions for a Broader Spectrum of PTK7-Positive Tumors. (Mol Cancer Ther (2023) 22 (10): 1128-1143.) (Year: 2023).*
Alfthan, Kaija. et al. Properties of a single-chain antibody containing different linker peptides. Protein Eng. 8:725-731 (1995).
Bird, Robert E. et al. Single-chain Antigen-binding Proteins. Science 242(4877):423-426 (1988).
Brummell, David A. et al. Probing the combining site of an anti-carbohydrate antibody by saturation-mutagenesis: role of the heavy-chain CDR3 residues. Biochemistry 32(4):1180-1187 (1993).
Burks, Elizabeth A. et al. In vitro scanning saturation mutagenesis of an antibody binding pocket. Proceedings of the National Academy of Sciences 94(2):412-417 (1997).
Choi, Ingrid. et al. Recombinant chimeric OKT3 scFv IgM antibodies mediate immune suppression while reducing T cell activation in vitro. European Journal of Immunology 31(1):94-106 (2001).

(Continued)

Primary Examiner — Karen A. Canella
Assistant Examiner — John J Skoko, III
(74) Attorney, Agent, or Firm — WILSON SONSINI GOODRICH & ROSATI

(57) ABSTRACT

The present disclosure relates to anti-PTK7 antibodies or antigen-binding fragments thereof, nucleic acid molecules encoding the same, and use thereof in preparation of antibody-drug conjugates, and further relates to antibody-drug conjugates containing the antibodies or antigen-binding fragments thereof and preparation method and use thereof.

41 Claims, 7 Drawing Sheets

Specification includes a Sequence Listing.

(56) References Cited

OTHER PUBLICATIONS

Chothia, Cyrus, and Arthur M. Lesk. Canonical Structures for the Hypervariable Regions of Immunoglobulins. Journal of Molecular Biology 196(4):901-917 (1987).
Chothia, Cyrus. et al. Conformations of Immunoglobulin Hypervariable Regions. Nature 342(6252):877-883 (1989).
Clark, Mike. Antibody humanization: a case of the 'Emperor's new clothes' ?. Immunology today 21(8):397-402 (2000).
ClinicalTrials.gov Identifier: NCT02222922. A Study of PF-06647020 for Adult Patients With Advanced Solid Tumors, Record created Aug. 21, 2014. pp. 1-40. [retrieved on Feb. 13, 2025]. Available at URL: https://clinicaltrials.gov/study/NCT02222922?cond=NCT02222922&rank=1.
ClinicalTrials.gov Identifier: NCT04189614. An Efficacy and Safety Study of Cofetuzumab Pelidotin in Participants With PTK7-Expressing, Recurrent Non-Small Cell Lung Cancer, Record created Dec. 5, 2019. pp. 1-11. [retrieved on Feb. 13, 2025]. Available at URL: https://clinicaltrials.gov/study/NCT04189614?cond=NCT04189614&limit=10&rank=1.
Cui, Nai-Peng. et al. Protein tyrosine kinase 7 regulates EGFR/Akt signaling pathway and correlates with malignant progression in triple-negative breast cancer. Frontiers in Oncology 11:699889, 1-13 (2021).
Damelin, Marc. et al. A PTK7-targeted antibody-drug conjugate reduces tumor-initiating cells and induces sustained tumor regressions. Science translational medicine 9(372):eaag2611, 1-11 (2017).
Duan, F. et al. Identification of PTK7 as a promising therapeutic target for thyroid cancer. European Review for Medical & Pharmacological Sciences 24(12):6809-6817 (2020).
Goding, James W. Production of monoclonal antibodies. In: Monoclonal Antibodies: Principles and Practice. London; New York: Academic Press 59-103 (1986).
Holliger, Philipp. et al. "Diabodies": Small Bivalent and Bispecific Antibody Fragments. Proceedings of the National Academy of Sciences of the United States of America 90(14):6444-6448 (1993).
Hu, S. et al. Minibody: a Novel Engineered Anti-carcinoembryonic Antigen Antibody Fragment (Single-chain Fv-CH3) Which Exhibits Rapid, High-level Targeting of Xenografts. Cancer Research 56(13):3055-3061 (1996).
Huston, James S. et al. Protein Engineering of Antibody Binding Sites: Recovery of Specific Activity in an Anti-digoxin Single-chain Fv Analogue Produced in *Escherichia coli*. PNAS USA 85(16):5879-5883 (1988).
Jones, Peter T. et al. Replacing The Complementarity-determining Regions in a Human Antibody With Those From A Mouse. Nature 321(6069):522-525 (1986).
Kabat, Elvin A. et al. Sequences of proteins of immunological interest. 5th Edition. Public Health Service, National Institutes of Health, Bethesda MD (1991).
Kipriyanov, Sergey M. et al. Bispecific tandem diabody for tumor therapy with improved antigen binding and pharmacokinetics. Journal of molecular biology 293:41-56 (1999).
Kobayashi, Hiroyuki. et al. Tryptophan H33 plays an important role in pyrimidine (6-4) pyrimidone photoproduct binding by a high-affinity antibody. Protein Engineering 12(10):879-884 (1999).
Kohler, G, and Milstein, C. Continuous Cultures of Fused Cells Secreting Antibody of Predefined Specificity. Nature 256(5517):495-497 (1975).
Kozbor, D. et al. A Human Hybrid Myeloma for Production of Human Monoclonal Antibodies. Journal of Immunology 133(6):3001-3005 (1984).

Lee, Seung-Taek. et al. A survey of protein tyrosine kinase mRNAs expressed in normal human melanocytes. Oncogene 8(12):3403-3410 (1993).
Lefranc, Marie-Paule. et al. IMGT Unique Numbering for Immunoglobulins and T-Cell Receptor Variable Domains and Ig Superfamily V-Like Domains. Developmental and Comparative Immunology 27(1):55-77 (2003).
Lhoumeau, Anne-Catherine. et al. Overexpression of the promigratory and prometastatic PTK7 receptor is associated with an adverse clinical outcome in colorectal cancer. PloS one 10(5):e0123768, 1-18 (2015).
Meyers, Eugene W, and Webb Miller. Optimal Alignments in Linear Space. Cabios 4(1):11-17 (1988).
Morris, Glenn E. Epitope Mapping Protocols. Methods in Molecular Biology 66:1-22 (1996).
Morrison, Sherie L. et al. Chimeric Human Antibody Molecules: Mouse Antigen-Binding Domains With Human Constant Region Domains. PNAS USA 81(21):6851-6855 (1984).
Mossie, Kevin. et al. Colon carcinoma kinase-4 defines a new subclass of the receptor tyrosine kinase family. Oncogene 11(10):2179-2184 (1995).
Munson, Peter et al. Ligand: a Versatile Computerized Approach for Characterization of Ligand-binding Systems. Analytical Biochemistry 107(1):220-239 (1980).
Needleman, Saul B, and Christian D. Wunsch. A General Method Applicable to the Search for Similarities in the Amino Acid Sequence of Two Proteins. Journal of Molecular Biology 48(3):443-453 (1970).
PCT/CN2024/084819 International Search Report and Written Opinion dated Jun. 24, 2024.
Poljak, Roberto J. Production and Structure of Diabodies. Structure 2(12):1121-1123 (1994).
Prebet, Thomas. et al. The cell polarity PTK7 receptor acts as a modulator of the chemotherapeutic response in acute myeloid leukemia and impairs clinical outcome. Blood, The Journal of the American Society of Hematology 116(13):2315-2323 (2010).
Presta, Leonard G. Antibody Engineering. Current Opinion in Structural Biology 2(4):593-596 (1992).
Qiu, L. et al. GenBank Accession No. NM_002821. Version No. NM_002821.5. *Homo sapiens* protein tyrosine kinase 7 (inactive) (PTK7), transcript variant PTK7-1, mRNA. pp. 1-6. Record created Nov. 23, 2018. Retrieved Feb. 13, 2025. Retrieved from: https://www.ncbi.nlm.nih.gov/nuccore/NM_002821.5.
Reichmann, Lutz. et al. Reshaping Human Antibodies for Therapy. Nature 332(6162):323-327 (1988).
Roovers, Rob C. et al. In vitro characterisation of a monovalent and bivalent form of a fully human anti Ep-CAM phage antibody. Cancer Immunology 50:51-59 (2001).
Sun, Jun-Jie. et al. The increased PTK7 expression is a malignant factor in cervical cancer. Disease Markers 2019(1):5380197, 1-10 (2019).
Ward, E Sally. et al. Binding Activities of a Repertoire of Single Immunoglobulin Variable Domains Secreted from *Escherichia coli*. Nature 341(6242):544-546 (1989).
Yu, Binbin. et al. Retracted Article: Periostin secreted by cancer-associated fibroblasts promotes cancer stemness in head and neck cancer by activating protein tyrosine kinase 7. Cell death & disease 9(11):1082, 1-18 (2018).
Shin et al., PTK7, a Catalytically Inactive Receptor Tyrosine Kinase, Increases Oncogenic Phenotypes in Xenograft Tumors of Esophageal Squamous Cell Carcinoma KYSE-30 Cells. Int. J. Mol. Sci. 23, 2391 (2022) 14 pages.

* cited by examiner

```
                              SEQUENCE LISTING

Sequence total quantity: 27
SEQ ID NO: 1            moltype = AA  length = 5
FEATURE                 Location/Qualifiers
source                  1..5
                        mol_type = protein
                        organism = synthetic construct
SEQUENCE: 1
DYGMH                                                                    5

SEQ ID NO: 2            moltype = AA  length = 17
FEATURE                 Location/Qualifiers
source                  1..17
                        mol_type = protein
                        organism = synthetic construct
SEQUENCE: 2
VISPYYGDVN YNQKFQG                                                       17

SEQ ID NO: 3            moltype = AA  length = 4
FEATURE                 Location/Qualifiers
source                  1..4
                        mol_type = protein
                        organism = synthetic construct
SEQUENCE: 3
GMGY                                                                     4

SEQ ID NO: 4            moltype = AA  length = 11
FEATURE                 Location/Qualifiers
source                  1..11
                        mol_type = protein
                        organism = synthetic construct
SEQUENCE: 4
RASQSISKYL A                                                             11

SEQ ID NO: 5            moltype = AA  length = 7
FEATURE                 Location/Qualifiers
source                  1..7
                        mol_type = protein
                        organism = synthetic construct
SEQUENCE: 5
SGSTLQS                                                                  7

SEQ ID NO: 6            moltype = AA  length = 9
FEATURE                 Location/Qualifiers
source                  1..9
                        mol_type = protein
                        organism = synthetic construct
SEQUENCE: 6
QQHNEYPWT                                                                9

SEQ ID NO: 7            moltype = AA  length = 7
FEATURE                 Location/Qualifiers
source                  1..7
                        mol_type = protein
                        organism = synthetic construct
SEQUENCE: 7
GYTFTDY                                                                  7

SEQ ID NO: 8            moltype = AA  length = 6
FEATURE                 Location/Qualifiers
source                  1..6
                        mol_type = protein
                        organism = synthetic construct
SEQUENCE: 8
SPYYGD                                                                   6

SEQ ID NO: 9            moltype =     length =
SEQUENCE: 9
000

SEQ ID NO: 10           moltype = AA  length = 11
FEATURE                 Location/Qualifiers
```

```
source                  1..11
                        mol_type = protein
                        organism = synthetic construct
SEQUENCE: 10
RASQSISKYL A                                                            11

SEQ ID NO: 11           moltype = AA  length = 7
FEATURE                 Location/Qualifiers
source                  1..7
                        mol_type = protein
                        organism = synthetic construct
SEQUENCE: 11
SGSTLQS                                                                 7

SEQ ID NO: 12           moltype = AA  length = 9
FEATURE                 Location/Qualifiers
source                  1..9
                        mol_type = protein
                        organism = synthetic construct
SEQUENCE: 12
QQHNEYPWT                                                               9

SEQ ID NO: 13           moltype = AA  length = 8
FEATURE                 Location/Qualifiers
source                  1..8
                        mol_type = protein
                        organism = synthetic construct
SEQUENCE: 13
GYTFTDYG                                                                8

SEQ ID NO: 14           moltype = AA  length = 8
FEATURE                 Location/Qualifiers
source                  1..8
                        mol_type = protein
                        organism = synthetic construct
SEQUENCE: 14
ISPYYGDV                                                                8

SEQ ID NO: 15           moltype = AA  length = 6
FEATURE                 Location/Qualifiers
source                  1..6
                        mol_type = protein
                        organism = synthetic construct
SEQUENCE: 15
ARGMGY                                                                  6

SEQ ID NO: 16           moltype = AA  length = 6
FEATURE                 Location/Qualifiers
source                  1..6
                        mol_type = protein
                        organism = synthetic construct
SEQUENCE: 16
QSISKY                                                                  6

SEQ ID NO: 17           moltype =     length =
SEQUENCE: 17
000

SEQ ID NO: 18           moltype = AA  length = 9
FEATURE                 Location/Qualifiers
source                  1..9
                        mol_type = protein
                        organism = synthetic construct
SEQUENCE: 18
QQHNEYPWT                                                               9

SEQ ID NO: 19           moltype = AA  length = 107
FEATURE                 Location/Qualifiers
source                  1..107
                        mol_type = protein
                        organism = synthetic construct
SEQUENCE: 19
DVQITQSPSY LAASPGETIT INCRASQSIS KYLAWYQEKP GKTNKLLIYS GSTLQSGIPS        60
RFSGSGSGTD FTLTISSLEP EDFAMYYCQQ HNEYPWTFGG GTKLEIK                     107

SEQ ID NO: 20           moltype = AA  length = 113
FEATURE                 Location/Qualifiers
```

```
source                  1..113
                        mol_type = protein
                        organism = synthetic construct
SEQUENCE: 20
QVQLQQSGAE LVRPGVSVKI SCKGSGYTFT DYGMHWLKQS HAKSLEWIGV ISPYYGDVTY    60
NQKFKGKATM TVDKSSSTAY MELARLTSED SAIYYCARGM GYWGQGTSVT VSS          113

SEQ ID NO: 21           moltype = AA  length = 113
FEATURE                 Location/Qualifiers
source                  1..113
                        mol_type = protein
                        organism = synthetic construct
SEQUENCE: 21
QVQLVQSGAE VKKPGASVKV SCKGSGYTFT DYGMHWLRQA PGQGLEWMGV ISPYYGDVNY    60
NQKFQGRVTM TRDKSISTAY MELSRLRSDD TVVYYCARGM GYWGQGTLVT VSS          113

SEQ ID NO: 22           moltype = AA  length = 113
FEATURE                 Location/Qualifiers
source                  1..113
                        mol_type = protein
                        organism = synthetic construct
SEQUENCE: 22
QVQLVQSGAE VKKPGASVKI SCKGSGYTFT DYGMHWLKQA PGQGLEWIGV ISPYYGDVNY    60
NQKFQGRATM TVDKSISTAY MELSRLRSDD TAVYYCARGM GYWGQGTLVT VSS          113

SEQ ID NO: 23           moltype = AA  length = 107
FEATURE                 Location/Qualifiers
source                  1..107
                        mol_type = protein
                        organism = synthetic construct
SEQUENCE: 23
DIQLTQSPSF LSASVGDRVT ITCRASQSIS KYLAWYQQKP GKAPKLLIYS GSTLQSGVPS    60
RFSGSGSGTE FTLTISSLQP EDFATYYCQQ HNEYPWTFGQ GTKVEIK                 107

SEQ ID NO: 24           moltype = AA  length = 107
FEATURE                 Location/Qualifiers
source                  1..107
                        mol_type = protein
                        organism = synthetic construct
SEQUENCE: 24
DVQITQSPSF LSASVGDRVT ITCRASQSIS KYLAWYQQKP GKAPKLLIYS GSTLQSGVPS    60
RFSGSGSGTE FTLTISSLQP EDFAMYYCQQ HNEYPWTFGQ GTKVEIK                 107

SEQ ID NO: 25           moltype = AA  length = 107
FEATURE                 Location/Qualifiers
source                  1..107
                        mol_type = protein
                        organism = synthetic construct
SEQUENCE: 25
DVQITQSPSY LSASPGDRIT ITCRASQSIS KYLAWYQQKP GKANKLLIYS GSTLQSGVPS    60
RFSGSGSGTE FTLTISSLQP EDFAMYYCQQ HNEYPWTFGQ GTKVEIK                 107

SEQ ID NO: 26           moltype = AA  length = 448
FEATURE                 Location/Qualifiers
source                  1..448
                        mol_type = protein
                        organism = synthetic construct
SEQUENCE: 26
QVQLVQSGPE VKKPGASVKV SCKASGYTFT DYAVHWVRQA PGKRLEWIGV ISTYNDYTYN    60
NQDFKGRVTM TRDTSASTAY MELSRLRSED TAVYYCARGN SYFYALDYWG QGTSVTVSSA   120
STKGPSVFPL APSSKSTSGG TAALGCLVKD YFPEPVTVSW NSGALTSGVH TFPAVLQSSG   180
LYSLSSVVTV PSSSLGTQTY ICNVNHKPSN TKVDKKVEPK SCDKTHTCPP CPAPELLGGP   240
SVFLFPPKPK DTLMISRTPE VTCVVVDVSH EDPEVKFNWY VDGVEVHNAK TKPREEQYNS   300
TYRVVSVLTV LHQDWLNGKE YKCKVSNKAL PAPIEKTISK AKGQPREPQV YTLPPSRDEL   360
TKNQVSLTCL VKGFYPSDIA VEWESNGQPE NNYKTTPPVL DSDGSFFLYS KLTVDKSRWQ   420
QGNVFSCSVM HEALHNHYTQ KSLSLSPG                                     448

SEQ ID NO: 27           moltype = AA  length = 218
FEATURE                 Location/Qualifiers
source                  1..218
                        mol_type = protein
                        organism = synthetic construct
SEQUENCE: 27
EIVLTQSPAT LSLSPGERAT LSCRASESVD SYGKSFMHWY QQKPGQAPRL LIYRASNLES    60
GIPARFSGSG SGTDFTLTIS SLEPEDFAVY YCQQSNEDPW TFGGGTKLEI KRTVAAPSVF   120
IFPPSDEQLK SGTASVVCLL NNFYPREAKV QWKVDNALQS GNSQESVTEQ DSKDSTYSLS   180
STLTLSKADY EKHKVYACEV THQGLSSPVT KSFNRGEC                          218
```

ANTI-PTK7 ANTIBODY AND USES THEREOF

The present application is based on and claims the priority of CN Application No. 202310466219.X, filed on Apr. 26, 2023, and PCT Application No. PCT/CN2024/084819 filed on Mar. 29, 2024, the disclosure of each of which is hereby incorporated into the present application in their entireties.

SEQUENCE LISTING

The instant application contains a Sequence Listing which has been submitted electronically in XML format and is hereby incorporated by reference in its entirety. Said XML copy, created on Nov. 19, 2024, is named 57841-733.301_SL.xml and is 24,354 bytes in size, and is incorporated by reference as if written herein in its entirety.

TECHNICAL FIELD

The present disclosure belongs to the field of pharmaceuticals, and specifically, the present disclosure relates to anti-PTK7 antibodies or antigen-binding fragments thereof, nucleic acid molecules encoding the same, and use thereof in preparation of antibody-drug conjugates. The present disclosure further relates to antibody-drug conjugates containing the antibodies or antigen-binding fragments thereof, and preparation method and use thereof.

BACKGROUND OF THE INVENTION

The description here provides only background information relevant to this disclosure and does not necessarily constitute the prior art.

Cancer is one of the leading causes of disease and death in the world, and as the population ages, the global cancer burden will continue to increase. It was reported from the AACR that by 2040, the total number of cancer patients worldwide will reach approximately 28 million, and it is estimated that approximately 16.2 million patients will die of it. 609,360 people in the U.S. died of cancer in 2022, which equates to nearly 1,700 deaths per day, among which approximately 350 people died of lung cancer per day, and China had the highest number of cancer deaths in the world with 3 million cancer deaths, accounting for 30% of all cancer deaths.

Protein tyrosine kinase 7 (PTK7, also known as colon carcinoma kinase-4, CCK4) was originally isolated from normal melanocytes and cloned by RT-PCR (Lee, Oncogene, 1993, 8:3403-10). Individually, the gene was also cloned from a human colon cancer-derived cell line and named as colon carcinoma kinase-4 (Mossie et al., Oncogene, 1995, 11:2179-84). PTK7 is a member of the receptor tyrosine (RTK) family. PTK7 plays an important role in classical and non-classical Wnt and vascular endothelial growth factor (VEGF) signaling. It lacks catalytic tyrosine kinase activity but retains signaling activity. High levels of PTK7 expression was first found in colon cancer and has been identified in a variety of tumors, including colorectal cancer, prostate cancer, gastric cancer, breast cancer, thyroid cancer, cervical cancer, lung cancer, and esophageal cancer, in which aberrant PTK7 expression has been found (Sci Transl Med 2017; 9:eaag2611; PLoS One 2015; 10:e0123768; Eur Rev Med Pharmacol Sci 2020; 24:6809-17; Dis Markers 2019; 2019:5380197; Front Oncol 2021; 11:699889; and Int J Mol Sci 2022; 23), and PTK7 expression has been observed in adult myeloid leukemia (AML) and acute lymphoblastic leukemia (ALL) cells (Blood 2010; 116:2315-23). In addition, PTK7 is significantly associated with the Wnt/0-Catenin pathway and aggressive clinicopathologic features in human head and neck squamous cell carcinoma (HNSCC), and animal experiments have demonstrated that PTK7 enhanced chemoresistance and lung metastasis of HNSCC in vivo (Cell Death Dis 2018; 9:1082).

Given the fact that PTK7 is highly expressed in a variety of cancers but not expressed or lowly expressed in normal tissues, drug developers have developed a variety of anti-tumor therapeutic strategies targeting PTK7, among which ADC drugs have the dual advantages of high targeting of monoclonal antibody-based drugs and high activity of cytotoxin in tumor tissues, so that they can efficiently kill tumor cells, have lower side effects than chemotherapeutic drugs and better curative effects than traditional antibody-based tumor drugs, and are called "biological missiles" in the field of tumor treatment.

No antibody-drug conjugates targeting PTK7 are currently on the market, and clinical-stage PTK7 ADC drugs include Cofetuzumab pelidotin (PF-06647020/PF-7020/ABBV-647/h6M24-vc0101), which is also the only ADC drug currently available for the target of PTK7, and is intended to be used for treating cancers including non-small cell lung cancer (NSCLC) and breast cancer. In the ADC drug, an anti-PTK7 monoclonal antibody cofetuzumab is linked to a microtubule inhibitor Aur0101 via a cleavable mc-VC-PAB linker, with a DAR value of approximately 4. A phase I trial targeting solid tumors (NCT02222922) was initiated in November 2014. A phase Ib trial (NCT04189614) was initiated in recurrent NSCLC expressing PTK7 in January 2020. The phase I trial of cofetuzumab pelidotin in patients with refractory ovarian cancer expressing PTK7, triple-negative breast cancer, and NSCLC showed objective response rates (ORRs) of 27% (17/63 patients), 21% (6/29 patients), and 19% (6/31 patients), respectively. NCT02222922 clinical results showed the most common treatment-related adverse events (AEs) were nausea, alopecia, fatigue, headache, neutropenia, and vomiting (45%-25%) when dosed every 3 weeks. Two patients experienced a dose-limiting toxicity (grade 3 headache and fatigue) at the highest dose assessed every 3 weeks. In addition, the developments of both PF-06804103 (HER2) and PF-06664178 (TROP2), the Aur0101-based ADC drugs developed by Pfizer, have been discontinued due to safety and efficacy concerns.

ADC drugs have entered the harvest period with rapid growth in the number of approvals. By December 2022, a total of 15 ADC drugs have been approved and marketed worldwide. The world's first ADC drug, Mylotarg, was approved and marketed in 2000, but was withdrawn from the market in 2010 due to fatal liver injury and was re-launched in 2017 after optimizing the dosing regimen to improve the efficacy and safety. Between 2001 and 2010, there were no ADC drugs approved and marketed worldwide, and the development of the industry entered into a trough period. With the continuous progress of technology, ADC drugs ushered in a period of concentrated launch, with a cumulative total of 10 approved so far. Although the new generation of ADCs represented by Enhertu has achieved great success, there is still much room for improvement.

Therefore, there is an urgent need in the art to provide more suitable novel antibody-drug conjugates targeting PTK7, which, on the one hand, can achieve efficient, simple, and practical chemical preparation and conjugating, and improve the pharmaceutical properties and efficacy of the existing antibody-drug conjugates targeting PTK7, such as comprehensively improve the stability, the half-life, the antitumor drug-resistance properties, and the therapeutic window of the ADC molecule.

SUMMARY OF THE INVENTION

To address problems in the prior art, a first aspect of the present disclosure provides an antibody or an antigen-binding fragment thereof capable of specifically binding to PTK7, comprising:
(a) 3 heavy chain variable region (VH) complementary determining regions (CDRs) as follows:
(i) a VH CDR1 having a sequence of CDR1 contained in a VH as set forth in SEQ ID NOs: 20, 21, or 22, or a sequence having one or more amino acid substitutions, deletions, or additions (e.g., 1 or 2 amino acid substitutions, deletions, or additions) compared to the sequence of CDR1 contained in the VH;
(ii) a VH CDR2 having a sequence of CDR2 contained in the VH as set forth in SEQ ID NOs: 20, 21, or 22, or a sequence having one or more amino acid substitutions, deletions, or additions (e.g., 1 or 2 amino acid substitutions, deletions, or additions) compared to the sequence of CDR2 contained in the VH; and
(iii) a VH CDR3 having a sequence of CDR3 contained in the VH as set forth in SEQ ID NOs: 20, 21, or 22, or a sequence having one or more amino acid substitutions, deletions, or additions (e.g., 1 amino acid substitution, deletion, or addition) compared to the sequence of CDR3 contained in the VH;
and/or
(b) 3 light chain variable region (VL) CDRs as follows:
(iv) a VL CDR1 having a sequence of CDR1 contained in a VL as set forth in SEQ ID NOs: 19, 23, 24, or 25, or a sequence having one or more amino acid substitutions, deletions, or additions (e.g., 1 or 2 amino acid substitutions, deletions, or additions) compared to the sequence of CDR1 contained in the VL;
(v) a VL CDR2 having a sequence of CDR2 contained in the VL as set forth in SEQ ID NOs: 19, 23, 24, or 25, or a sequence having one or more amino acid substitutions, deletions, or additions (e.g., 1 or 2 amino acid substitutions, deletions, or additions) compared to the sequence of CDR2 contained in the VL; and
(vi) a VL CDR3 having a sequence of CDR3 contained in the VL as set forth in SEQ ID NOs: 19, 23, 24, or 25, or a sequence having one or more amino acid substitutions, deletions, or additions (e.g., 1 or 2 amino acid substitutions, deletions, or additions) compared to the sequence of CDR3 contained in the VL.

In certain embodiments, the substitution in any one of (i)-(vi) as described above is a conservative substitution.

In certain embodiments, the CDR1, CDR2, and CDR3 contained in the heavy chain variable region (VH), and/or the CDR1, CDR2, and CDR3 contained in the light chain variable region (VL) are defined by a Kabat, Chothia, or IMGT numbering system.

In certain embodiments, the antibody or an antigen-binding fragment thereof comprises:
(a) a heavy chain variable region (VH), comprising 3 heavy chain variable region (VH) complementary decision regions (CDRs) as follows:
(i) a VH CDR1 having a sequence of CDR1 contained in a VH as set forth in SEQ ID NOs: 20, 21, or 22, or a sequence having one or more amino acid substitutions, deletions, or additions (e.g., 1 or 2 amino acid substitutions, deletions, or additions) compared to the sequence of CDR1 contained in the VH;
(ii) a VH CDR2 having a sequence of CDR2 contained in the VH as set forth in SEQ ID NOs: 20, 21, or 22, or a sequence having one or more amino acid substitutions, deletions, or additions (e.g., 1 or 2 amino acid substitutions, deletions, or additions) compared to the sequence of CDR2 contained in the VH; and
(iii) a VH CDR3 having a sequence of CDR3 contained in the VH as set forth in SEQ ID NOs: 20, 21, or 22, or a sequence having one or more amino acid substitutions, deletions, or additions (e.g., 1 amino acid substitution, deletion, or addition) compared to the sequence of CDR3 contained in the VH;
and/or
(b) a light chain variable region (VL) comprising 3 light chain variable region (VL) CDRs as follows:
(iv) a VL CDR1 having a sequence of CDR1 contained in a VL as set forth in SEQ ID NOs: 19, 23, 24, or 25, or a sequence having one or more amino acid substitutions, deletions, or additions (e.g., 1 or 2 amino acid substitutions, deletions, or additions) compared to the sequence of CDR1 contained in the VL;
(v) a VL CDR2 having a sequence of CDR2 contained in the VL as set forth in SEQ ID NOs: 19, 23, 24, or 25, or a sequence having one or more amino acid substitutions, deletions, or additions (e.g., 1 or 2 amino acid substitutions, deletions, or additions) compared to the sequence of CDR2 contained in the VL; and
(vi) a VL CDR3 having a sequence of CDR3 contained in the VL as set forth in SEQ ID NOs: 19, 23, 24, or 25, or a sequence having one or more amino acid substitutions, deletions, or additions (e.g., 1 or 2 amino acid substitutions, deletions, or additions) compared to the sequence of CDR3 contained in the VL.

In certain embodiments, the antibody or an antigen-binding fragment thereof comprises: sequences of CDR1, CDR2, and CDR3 contained in the VH as set forth in SEQ ID NOs: 20, 21, or 22; and/or sequences of CDR1, CDR2, and CDR3 contained in the VL as set forth in SEQ ID NOs: 19, 23, 24, or 25. In certain embodiments, the substitution as described in any one of (i)-(vi) is a conservative substitution. In certain embodiments, the CDR1, CDR2, and CDR3 contained in the heavy chain variable region (VH), and/or the CDR1, CDR2, and CDR3 contained in the light chain variable region (VL) are defined by a Kabat, Chothia, or IMGT numbering system.

In certain embodiments, the antibody or an antigen-binding fragment thereof comprises:
(a) 3 heavy chain variable region (VH) CDRs as follows:
(i) a VH CDR1 consisting of a sequence as set forth in SEQ ID NO: 1, or a sequence having one or more amino acid substitutions, deletions, or additions (e.g., 1 or 2 amino acid substitutions, deletions, or additions) compared to SEQ ID NO: 1;
(ii) a VH CDR2 consisting of a sequence as set forth in SEQ ID NO: 2, or a sequence having one or more amino acid substitutions, deletions, or additions (e.g., 1 or 2 amino acid substitutions, deletions, or additions) compared to SEQ ID NO: 2; and
(iii) a VH CDR3 consisting of a sequence as set forth in SEQ ID NO: 3, or a sequence having one or more amino acid substitutions, deletions, or additions (e.g., 1 amino acid substitution, deletion, or addition) compared to SEQ ID NO: 3;

and/or (b) 3 light chain variable region (VL) CDRs as follows:

(iv) a VL CDR1 consisting of a sequence as set forth in SEQ ID NO: 4, or a sequence having one or more amino acid substitutions, deletions, or additions (e.g., 1 or 2 amino acid substitutions, deletions, or additions) compared to SEQ ID NO: 4;

(v) a VL CDR2 consisting of a sequence as set forth in SEQ ID NO: 5, or a sequence having one or more amino acid substitutions, deletions, or additions (e.g., 1 or 2 amino acid substitutions, deletions, or additions) compared to SEQ ID NO: 5; and (vi) a VL CDR3 consisting of a sequence as set forth in SEQ ID NO: 6, or a sequence having one or more amino acid substitutions, deletions, or additions (e.g., 1 or 2 amino acid substitutions, deletions, or additions) compared to SEQ ID NO: 6.

In certain embodiments, the substitution as described in any one of (i)-(vi) is a conservative substitution.

In certain embodiments, the VH of the antibody or an antigen-binding fragment thereof comprises: a VH CDR1 as set forth in SEQ ID NO: 1; a VH CDR2 as set forth in SEQ ID NO: 2; and a VH CDR3 as set forth in SEQ ID NO: 3; and/or the VL of the antibody or an antigen-binding fragment thereof comprises: a VL CDR1 as set forth in SEQ ID NO: 4; a VL CDR2 as set forth in SEQ ID NO: 5; and a VL CDR3 as set forth in SEQ ID NO: 6.

In certain embodiments, the VH of the antibody or an antigen-binding fragment thereof comprises: a VH CDR1 as set forth in SEQ ID NO: 1; a VH CDR2 as set forth in SEQ ID NO: 2; and a VH CDR3 as set forth in SEQ ID NO: 3; and the VL of the antibody or an antigen-binding fragment thereof comprises: a VL CDR1 as set forth in SEQ ID NO: 4; a VL CDR2 as set forth in SEQ ID NO: 5; and a VL CDR3 as set forth in SEQ ID NO: 6.

In certain embodiments, the antibody or an antigen-binding fragment thereof comprises:

(a) 3 heavy chain variable region (VH) CDRs as follows:

(i) a VH CDR1 consisting of a sequence as set forth in SEQ ID NO: 7, or a sequence having one or more amino acid substitutions, deletions, or additions (e.g., 1 or 2 amino acid substitutions, deletions, or additions) compared to SEQ ID NO: 7;

(ii) a VH CDR2 consisting of a sequence as set forth in SEQ ID NO: 8, or a sequence having one or more amino acid substitutions, deletions, or additions (e.g., 1 or 2 amino acid substitutions, deletions, or additions) compared to SEQ ID NO: 8; and (iii) a VH CDR3 consisting of a sequence of MG, or a sequence having one or more amino acid substitutions, deletions, or additions (e.g., 1 amino acid substitution, deletion, or addition) compared to the sequence of MG;

and/or (b) 3 light chain variable region (VL) CDRs as follows:

(iv) a VL CDR1 consisting of a sequence as set forth in SEQ ID NO: 10, or a sequence having one or more amino acid substitutions, deletions, or additions (e.g., 1 or 2 amino acid substitutions, deletions, or additions) compared to SEQ ID NO: 10;

(v) a VL CDR2 consisting of a sequence as set forth in SEQ ID NO: 11, or a sequence having one or more amino acid substitutions, deletions, or additions (e.g., 1 or 2 amino acid substitutions, deletions, or additions) compared to SEQ ID NO: 11; and (vi) a VL CDR3 consisting of a sequence as set forth in SEQ ID NO: 12, or a sequence having one or more amino acid substitutions, deletions, or additions (e.g., 1 or 2 amino acid substitutions, deletions, or additions) compared to SEQ ID NO: 12.

In certain embodiments, the substitution as described in any one of (i)-(vi) is a conservative substitution.

In certain embodiments, the VH of the antibody or an antigen-binding fragment thereof comprises: a VH CDR1 as set forth in SEQ ID NO: 7; a VH CDR2 as set forth in SEQ ID NO: 8; and a VH CDR3 of MG; and/or the VL of the antibody or an antigen-binding fragment thereof comprises: a VL CDR1 as set forth in SEQ ID NO: 10; a VL CDR2 as set forth in SEQ ID NO: 11; and a VL CDR3 as set forth in SEQ ID NO: 12.

In certain embodiments, the VH of the antibody or an antigen-binding fragment thereof comprises: a VH CDR1 as set forth in SEQ ID NO: 7; a VH CDR2 as set forth in SEQ ID NO: 8; and a VH CDR3 as set forth of MG; and the VL of the antibody or an antigen-binding fragment thereof comprises: a VL CDR1 as set forth in SEQ ID NO: 10; a VL CDR2 as set forth in SEQ ID NO: 11; and a VL CDR3 as set forth in SEQ ID NO: 12.

In certain embodiments, the antibody or an antigen-binding fragment thereof comprises:

(a) 3 heavy chain variable region (VH) CDRs as follows:

(i) a VH CDR1 consisting of a sequence as set forth in SEQ ID NO: 13, or a sequence having one or more amino acid substitutions, deletions, or additions (e.g., 1 or 2 amino acid substitutions, deletions, or additions) compared to SEQ ID NO: 13;

(ii) a VH CDR2 consisting of a sequence as set forth in SEQ ID NO: 14, or a sequence having one or more amino acid substitutions, deletions, or additions (e.g., 1 or 2 amino acid substitutions, deletions, or additions) compared to SEQ ID NO: 14; and (iii) a VH CDR3 consisting of a sequence as set forth in SEQ ID NO: 15, or a sequence having one or more amino acid substitutions, deletions, or additions (e.g., 1 amino acid substitution, deletion, or addition) compared to SEQ ID NO: 15;

and/or (b) 3 light chain variable region (VL) CDRs as follows:

(iv) a VL CDR1 consisting of a sequence as set forth in SEQ ID NO: 16, or a sequence having one or more amino acid substitutions, deletions, or additions (e.g., 1 or 2 amino acid substitutions, deletions, or additions) compared to SEQ ID NO: 16;

(v) a VL CDR2 consisting of a sequence of SGS, or a sequence having one or more amino acid substitutions, deletions, or additions (e.g., 1 or 2 amino acid substitutions, deletions, or additions) compared to the sequence of SGS; and (vi) a VL CDR3 consisting of a sequence as set forth in SEQ ID NO: 18, or a sequence having one or more amino acid substitutions, deletions, or additions (e.g., 1 or 2 amino acid substitutions, deletions, or additions) compared to SEQ ID NO: 18.

In certain embodiments, the substitution as described in any one of (i)-(vi) is a conservative substitution.

In certain embodiments, the VH of the antibody or an antigen-binding fragment thereof comprises: a VH CDR1 as set forth in SEQ ID NO: 13; a VH CDR2 as set forth in SEQ ID NO: 14; and a VH CDR3 as set forth in SEQ ID NO: 15; and/or the VL of the antibody or an antigen-binding fragment thereof comprises: a VL CDR1 as set forth in SEQ ID NO: 16; a VL CDR2 of SGS; and a VL CDR3 as set forth in SEQ ID NO: 18.

In certain embodiments, the VH of the antibody or an antigen-binding fragment thereof comprises: a VH CDR1 as set forth in SEQ ID NO: 13; a VH CDR2 as set forth in SEQ ID NO: 14; and a VH CDR3 as set forth in SEQ ID NO: 15; and the VL of the antibody or an antigen-binding fragment thereof comprises: a VL CDR1 as set forth in SEQ ID NO: 16; a VL CDR2 of SGS; and a VL CDR3 as set forth in SEQ ID NO: 18.

In certain embodiments, the antibody or an antigen-binding fragment thereof comprises:
(a) a heavy chain variable region (VH) comprising an amino acid sequence selected from:
  (i) a sequence as set forth in SEQ ID NO: 20;
  (ii) a sequence having one or more amino acid substitutions, deletions, or additions (e.g., 1, 2, 3, 4, or 5 amino acid substitutions, deletions, or additions) compared to the sequence as set forth in SEQ ID NO: 20; or
  (iii) a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 20;
and
(b) a light chain variable region (VL) comprising an amino acid sequence selected from:
  (iv) a sequence as set forth in SEQ ID NO: 19;
  (v) a sequence having one or more amino acid substitutions, deletions, or additions (e.g., 1, 2, 3, 4, or 5 amino acid substitutions, deletions, or additions) compared to the sequence as set forth in SEQ ID NO: 19; or
  (vi) a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 19.

In certain embodiments, the substitution as described in (ii) or (v) is a conservative substitution.

In certain embodiments, the antibody or an antigen-binding fragment thereof comprises: a heavy chain variable region (VH) comprising a sequence as set forth in SEQ ID NO: 20, or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 20, and a light chain variable region (VL) comprising a sequence as set forth in SEQ ID NO: 19 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO:19.

In certain embodiments, the antibody or an antigen-binding fragment thereof comprises: a VH having a sequence as set forth in SEQ ID NO: 20 and a VL having a sequence as set forth in SEQ ID NO:19.

In certain embodiments, the antibody or an antigen-binding fragment thereof is humanized. In certain embodiments, the antibody or an antigen-binding fragment thereof further comprises a framework region of a human immunoglobulin. In certain embodiments, the antibody or an antigen-binding fragment thereof further comprises a heavy chain framework region of a human immunoglobulin (e.g., a heavy chain framework region contained in an amino acid sequence encoded by a human heavy chain germline antibody gene), and/or a light chain framework region of a human immunoglobulin (e.g., a light chain framework region contained in an amino acid sequence encoded by a human light chain germline antibody gene). In certain embodiments, the heavy chain framework region and/or light chain framework region optionally comprises one or more (e.g., 1, 2, 3, 4, 5, 6, 7, 8, 9, or 10) back mutations from human-derived residues to murine-derived residues.

In certain embodiments, the antibody or an antigen-binding fragment thereof comprises: (1) a heavy chain variable region (VH) comprising a sequence as set forth in SEQ ID NO: 21 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 21, and a light chain variable region (VL) comprising a sequence as set forth in SEQ ID NO: 23 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 23;

(2) a heavy chain variable region (VH) comprising a sequence as set forth in SEQ ID NO: 21 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 21, and a light chain variable region (VL) comprising a sequence as set forth in SEQ ID NO: 24 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 24;

(3) a heavy chain variable region (VH) comprising a sequence as set forth in SEQ ID NO: 22 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 22, and a light chain variable region (VL) comprising a sequence as set forth in SEQ ID NO: 23 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 23;

(4) a heavy chain variable region (VH) comprising a sequence as set forth in SEQ ID NO: 22 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 22, and a light chain variable region (VL) comprising a sequence as set forth in SEQ ID NO: 24 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 24; or (5) a heavy chain variable region (VH) comprising a sequence as set forth in SEQ ID NO: 22 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 22, and a light chain variable region (VL) comprising a sequence as set forth in SEQ ID NO: 25 or a sequence having at least 80%, at least 85%, at least 90%, at least 91%, at least 92%, at least 93%, at least 94%, at least 95%, at least 96%, at least 97%, at least 98%, at least 99%, or 100% sequence identity to the sequence as set forth in SEQ ID NO: 25.

In certain embodiments, the antibody or an antigen-binding fragment thereof comprises:
(1) a VH having a sequence as set forth in SEQ ID NO: 21 and a VL having a sequence as set forth in SEQ ID NO: 23;
(2) a VH having a sequence as set forth in SEQ ID NO: 21 and a VL having a sequence as set forth in SEQ ID NO: 24;
(3) a VH having a sequence as set forth in SEQ ID NO: 22 and a VL having a sequence as set forth in SEQ ID NO: 23;
(4) a VH having a sequence as set forth in SEQ ID NO: 22 and a VL having a sequence as set forth in SEQ ID NO: 24; or
(5) a VH having a sequence as set forth in SEQ ID NO: 22 and a VL having a sequence as set forth in SEQ ID NO: 25.

In certain embodiments, the antibody or an antigen-binding fragment thereof further comprises a constant region derived from a human immunoglobulin. In certain embodiments, a heavy chain of the antibody or an antigen-binding fragment thereof comprises a heavy chain constant region derived from a human immunoglobulin (e.g., IgG1, IgG2, IgG3, or IgG4). In certain embodiments, a light chain of the antibody or an antigen-binding fragment thereof comprises a light chain constant region derived from a human immunoglobulin (e.g., κ or λ).

In certain embodiments, the antibody or an antigen-binding fragment thereof is selected from a monoclonal antibody, a mouse antibody, a rabbit antibody, a humanized antibody, a fully human antibody, a chimeric antibody (e.g., a human-murine chimeric antibody), a bispecific antibody, a polyspecific antibody, a single-chain antibody, dAb, a fragment of a complementary determining region, Fv, single-chain Fv (scFv), Fd, Fab, Fab', and F(ab')$_2$.

In certain embodiments, the monoclonal antibody comprises a non-CDR region, and the non-CDR region is from a species that is not murine, for example from a human antibody.

In certain embodiments, the antibody or an antigen-binding fragment thereof binds to a human or monkey PTK7 at a $K_D$ less than or equal to $1.0 \times 10^{-8}$ M.

In certain embodiments, the antibody or an antigen-binding fragment thereof does not cross-react with a mouse PTK7.

A second aspect of the present disclosure provides an isolated nucleic acid molecule comprising a nucleic acid sequence encoding the antibody or an antigen-binding fragment thereof, the heavy chain and/or light chain thereof, or the heavy chain variable region and/or light chain variable region thereof. In certain embodiments, the isolated nucleic acid molecule encodes the antibody or an antigen-binding fragment thereof, the heavy chain and/or light chain thereof, or the heavy chain variable region and/or light chain variable region thereof. In certain embodiments, the isolated nucleic acid molecule comprises a nucleic acid sequence encoding a heavy chain variable region and/or a light chain variable region of the antibody.

A third aspect of the present disclosure provides a vector comprising the isolated nucleic acid molecule. In certain embodiments, the vector is a cloning vector or an expression vector.

A fourth aspect of the present disclosure provides a host cell comprising the isolated nucleic acid molecule or the vector.

A fifth aspect of the present disclosure provides use of the antibody or an antigen-binding fragment thereof in preparation of an antibody-drug conjugate, or in preparation of a kit for diagnosis of a disease, particularly a PTK7-mediated disease or disorder, or in preparation of a medicament for treatment of a disease, particularly a PTK7-mediated disease or disorder.

The present disclosure also provides the antibody or an antigen-binding fragment thereof for use as an antibody-drug conjugate, or for use in diagnosis, prophylaxis and/or treatment of a diseases, particularly a PTK7-mediated disease or disorder.

The present disclosure also provides a method for diagnosis, prophylaxis and/or treatment of a disease, particularly a PTK7-mediated disease or disorder, comprising administering an effective amount of the antibody or an antigen-binding fragment thereof to an individual in need thereof.

A sixth aspect of the present disclosure provides a composition comprising the antibody or an antigen-binding fragment thereof, the isolated nucleic acid molecule, the vector, or the host cell. In certain embodiments, the composition is a pharmaceutical composition. In certain embodiments, the composition comprises the antibody or an antigen-binding fragment thereof, and optionally other antibodies, e.g., anti-PD-1 antibodies, anti-PDL-1 antibodies, and/or anti-CTLA-4 antibodies. In certain embodiments, the compositions are for use in diagnosis, prophylaxis, and/or treatment of a disease or disorder, particularly a PTK7-mediated disease or disorder. In certain embodiments, the composition comprises a diagnostically, prophylactically, and/or therapeutically effective amount of the antibody or an antigen-binding fragment thereof, the isolated nucleic acid molecule, the vector, or the host cell.

A seventh aspect of the present disclosure provides an antibody-drug conjugate as shown in formula (I) or a pharmaceutically acceptable salt thereof,

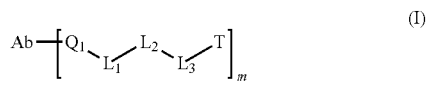

(I)

wherein
$Q_1$-$L_1$-$L_2$-$L_3$ is a linker,
Ab is the antibody or an antigen-binding fragment thereof and coupled to $Q_1$ in the linker via an S atom in the antibody or an antigen-binding fragment thereof,
T is a drug unit or a diagnostic reagent unit and coupled to $L_3$ in the linker via an N atom or an O atom in the drug unit or the diagnostic reagent unit,
m is a number between 1 and 12, e.g., m is a number between 3 and 9, e.g., about 4, or about 8,
$Q_1$ is selected from:

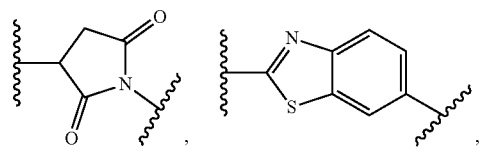

-continued

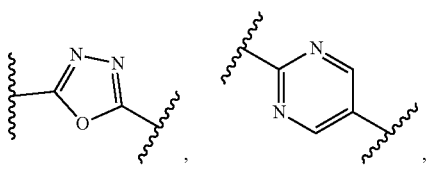

substituted

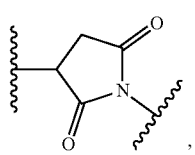 [SMILES: *C1CC(=O)N(*)C1=O]

substituted

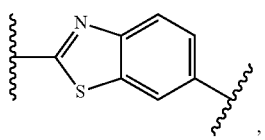 [SMILES: *c1ccc2nc(*)sc2c1]

substituted

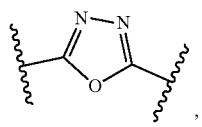

and substituted

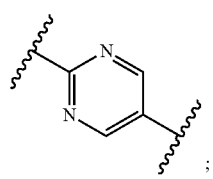 [SMILES: *c1cnc(*)nc1]

;

L$_1$ is -L$_{1a}$-C(=O)—, wherein L$_{1a}$ is selected from: alkylene, polyethylene glycol group, alkenylene, PGP-alkynylene, alicylidene, aliphatic heterocyclylene, arylene, heteroarylene, substituted alkylene, substituted polyethylene glycol group, substituted alkenylene, substituted alkynylene, substituted alicylidene, substituted aliphatic heterocyclylene, substituted arylene, and substituted heteroarylene;

L$_2$ is a polypeptide residue or a substituted polypeptide residue, and

L$_3$ is

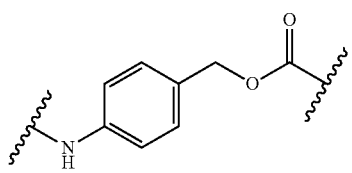 [SMILES: *Nc1ccc(COC(*)=O)cc1]

or substituted

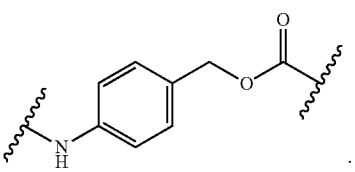 [SMILES: *Nc1ccc(COC(*)=O)cc1]

In certain embodiments, L$_2$ and/or L$_3$ may be substituted with a polysarcosine residue, a glycosylated polyethylene glycol fragment, a substituted polysarcosine residue, or a substituted glycosylated polyethylene glycol fragment.

In certain embodiments, the polypeptide residue comprises an amino acid selected from: phenylalanine, isoleucine, leucine, tryptophan, valine, methionine, tyrosine, alanine, threonine, histidine, serine, glutamine, arginine, lysine, asparagine, glutamic acid, proline, citrulline, aspartic acid, and glycine.

In certain embodiments, the polypeptide residue is selected from: phenylalanine-lysine (Phe-Lys), valine-alanine (Val-Ala), valine-citrulline (Val-Cit), glutamic acid-valine-alanine (Glu-Val-Ala), glutamic acid-valine-citrulline (Glu-Val-Cit), valine-lysine (Val-Lys), alanine-alanine-alanine (Ala-Ala-Ala), alanine-alanine-asparagine (Ala-Ala-Asn), and glycine-glycine-phenylalanine-glycine (Gly-Gly-Phe-Gly).

In certain embodiments, Lia is —(CH$_2$)$_{n1}$—, n1 is a number between 1 and 10, e.g., a number between 1 and 8, a number between 1 and 6, a number between 1 and 4, e.g., 1, 2, 3, 4, 5, 6, 7, 8.

In certain embodiments, L$_3$ is

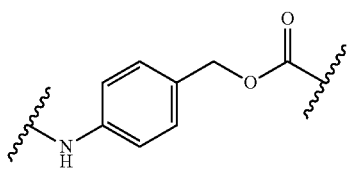 [SMILES: *Nc1ccc(COC(*)=O)cc1]

substituted with a polysarcosine residue, a glycosylated polyethylene glycol fragment, a substituted polysarcosine residue, or a substituted glycosylated polyethylene glycol fragment, wherein the polysarcosine residue is linked to a benzene ring via a structural unit —X—.

The structural unit —X— is

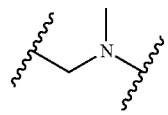

or substituted

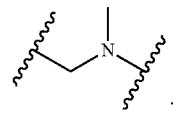

The substituted polysarcosine residue is

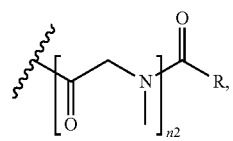

wherein n2 is a number between 4 and 18, e.g., a number between 4 and 12, e.g., 4, 5, 6, 7, 8, 9, 10, 11, 12, and R is selected from: $C_1$-$C_6$ alkyl, $C_1$-$C_6$ cycloalkyl, and $C_1$-$C_6$ alkoxy.

The substituted glycosylated polyethylene glycol fragment is

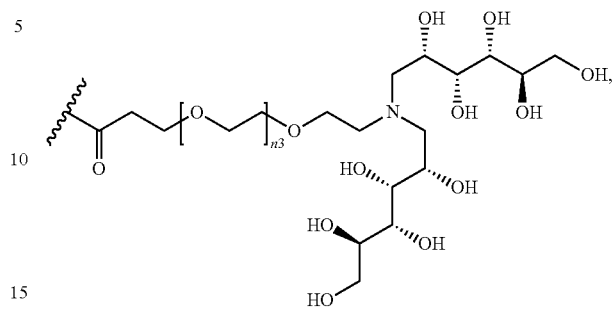

wherein n3 is a number between 4 and 18, e.g., a number between 4 and 12, e.g., 4, 5, 6, 7, 8, 9, 10, 11, 12.

In certain embodiments, the drug unit is selected from:
(i) a microtubule protein inhibitor, such as monomethyl auristatin E (MMAE), monomethyl auristatin F (MMAF), tubulysin or analogs thereof (e.g., tubulysin A, tubulysin B, tubulysin D, tubulysin H, tubulysin U, and tubulysin V), Eribulin or analogs thereof, vinblastine or analogs thereof (e.g., vincristine, vindesine, vinblastinum, and DAVLBH), and Aur0101;
(ii) a camptothecin topoisomerase inhibitor, such as SN38, Exatecan, and Belotecan; and
(iii) an immune activator, such as a TLR7/8 agonist and a STING agonist.

In certain embodiments, $Q_1$-$L_1$-$L_2$-$L_3$-T in the antibody-drug conjugate is selected from:

L-D-1

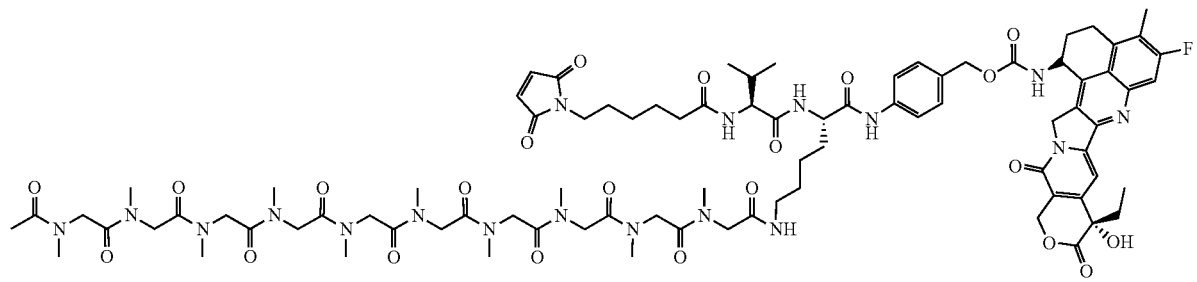

L-D-2

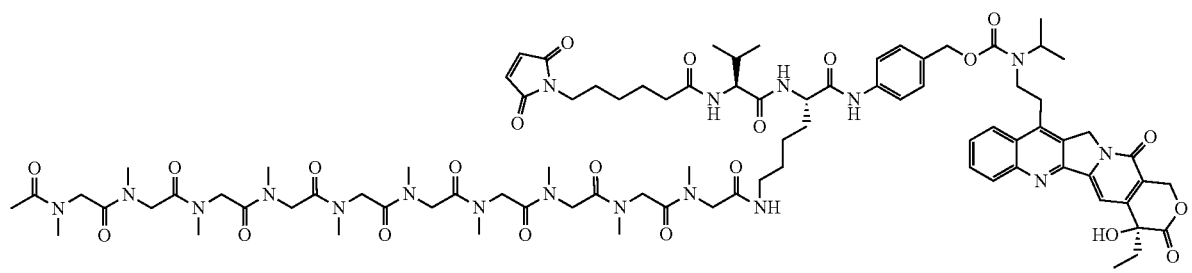

-continued
L-D-3
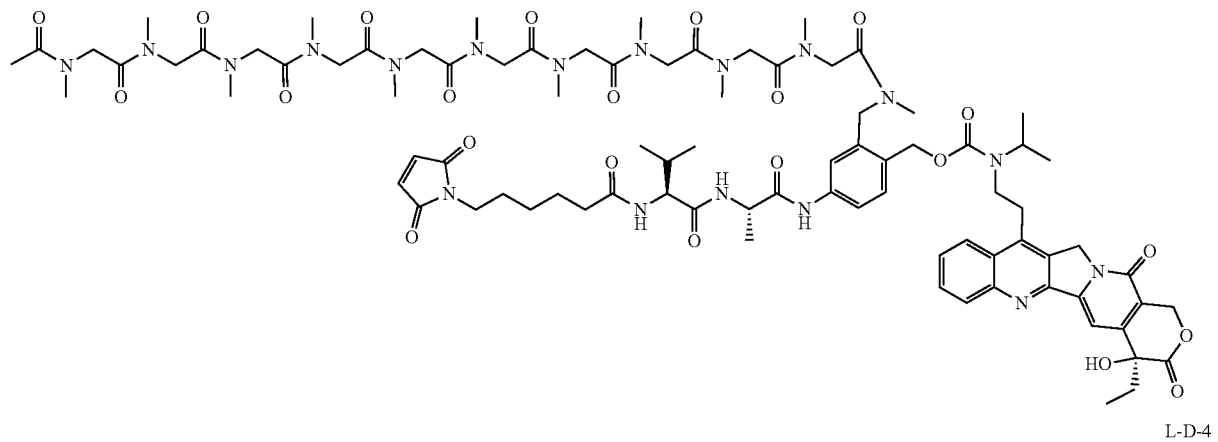
L-D-4
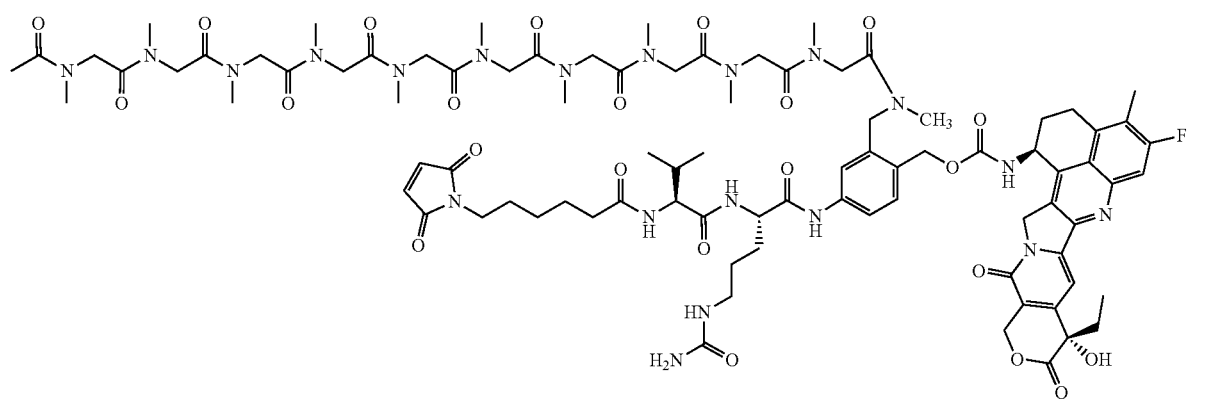
L-D-5
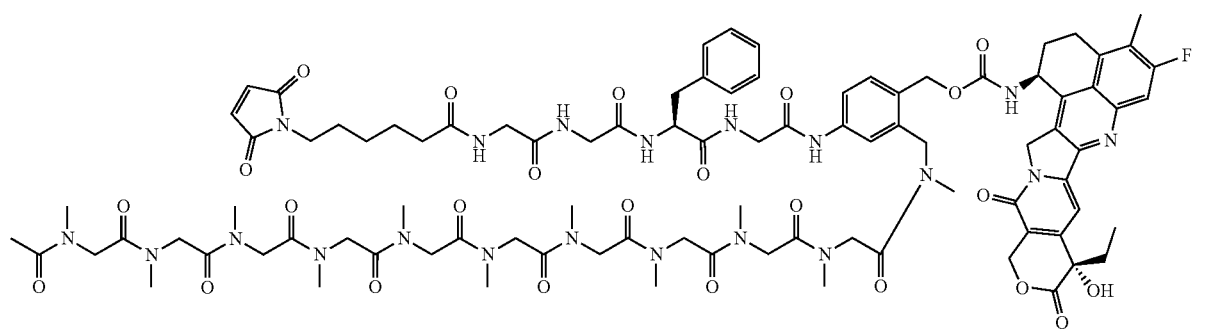
L-D-6
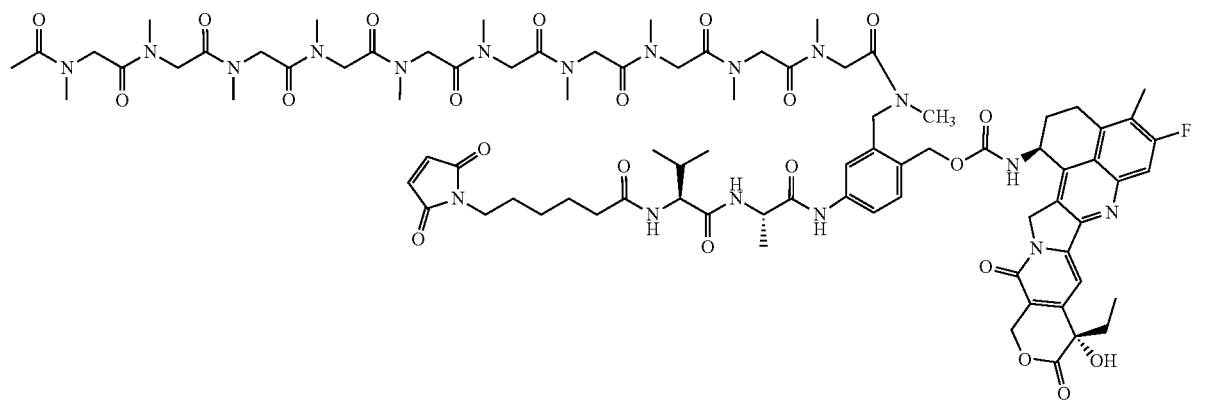

-continued
L-D-7
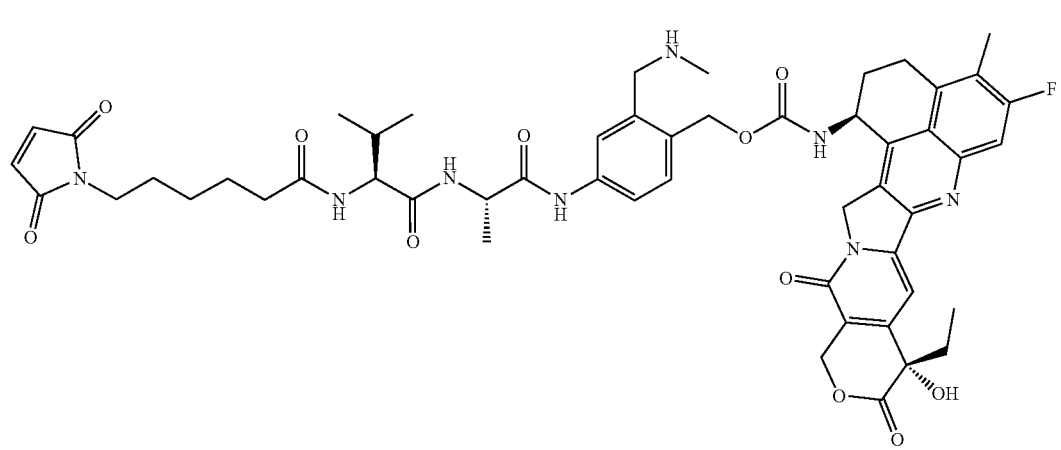
L-D-8
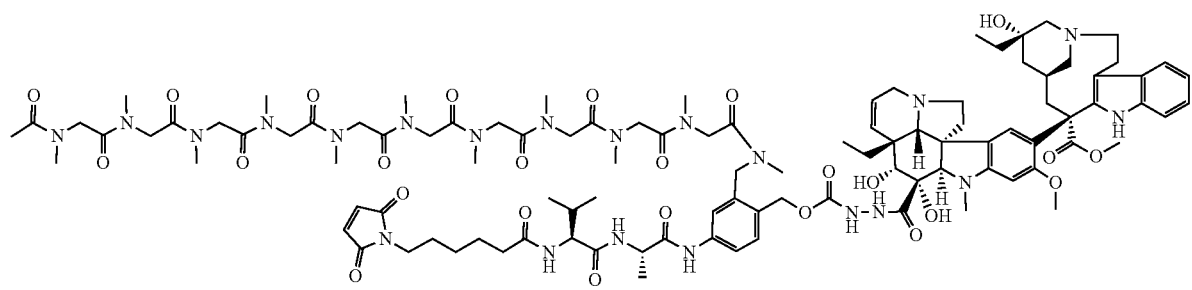
L-D-9
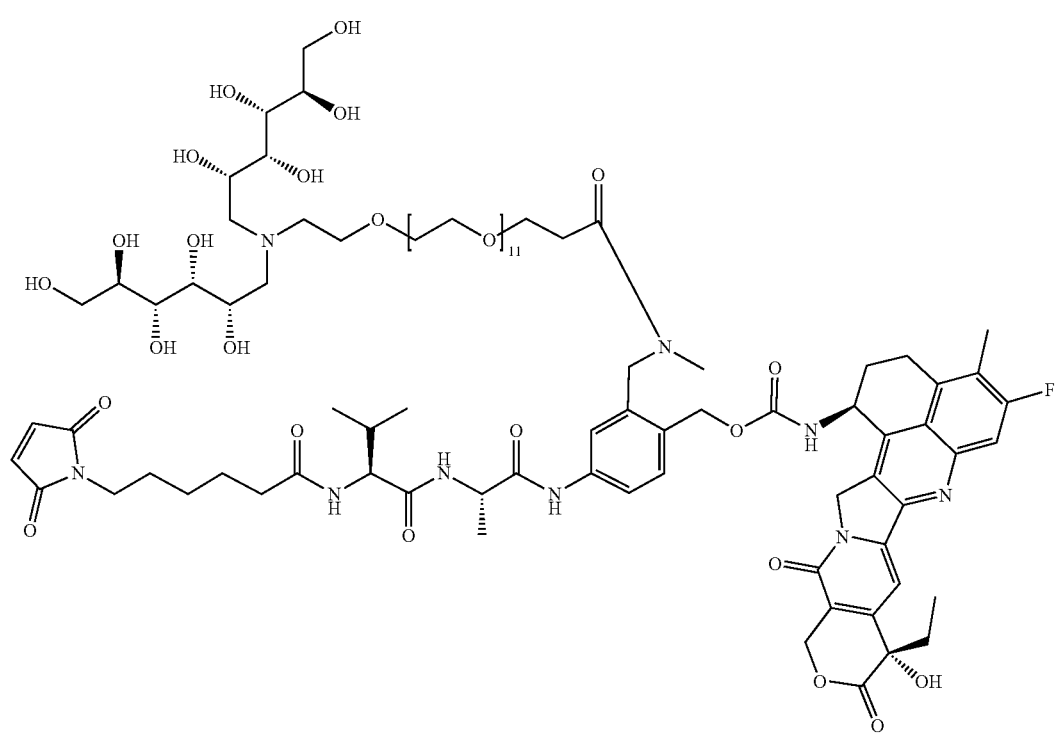

-continued
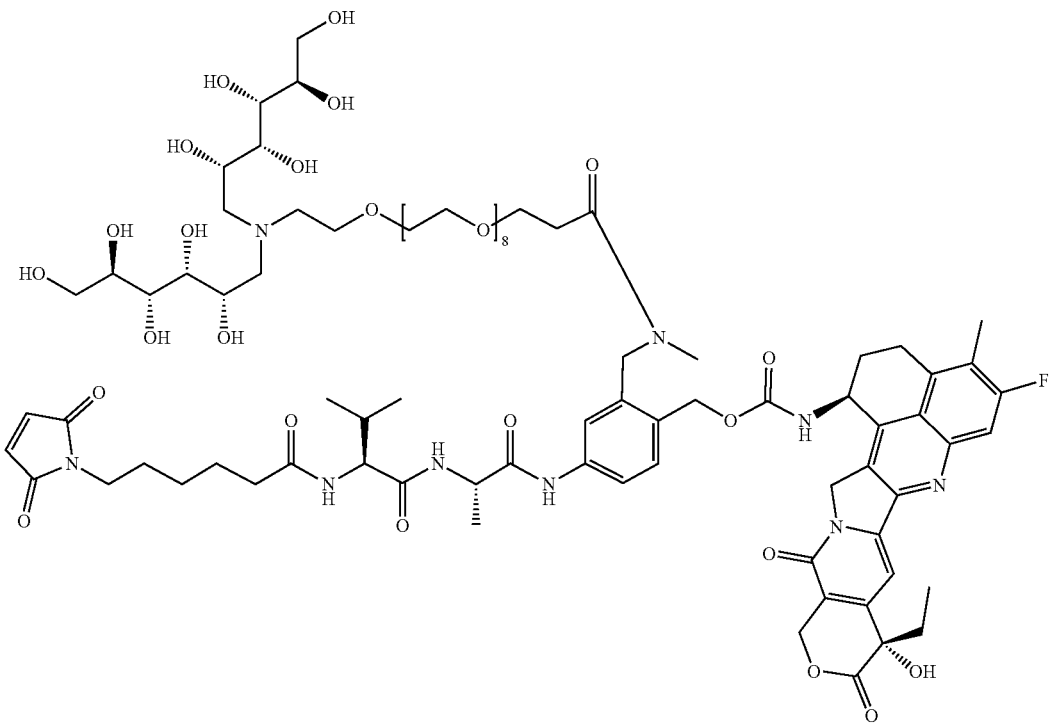
L-D-10
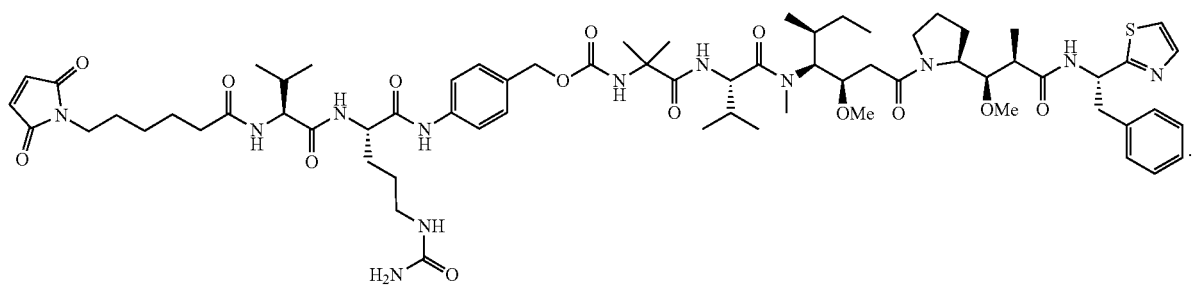
L-D-11
In certain embodiments, -Q₁-L₁-L₂-L₃-T in the antibody-drug conjugate is selected from:
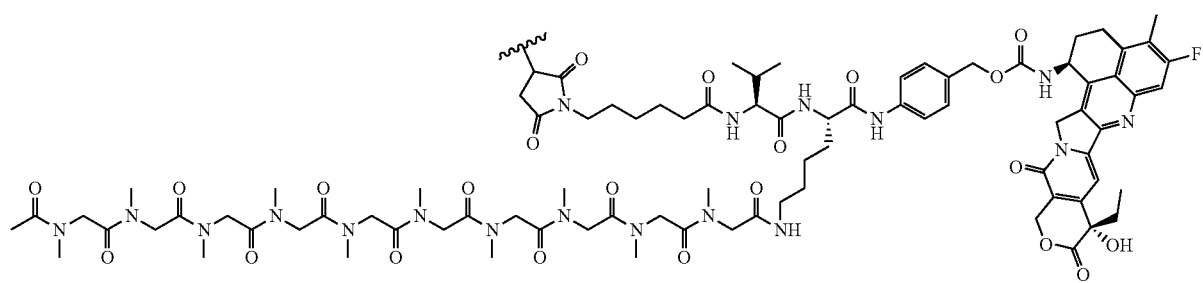
L-D-1′

L-D-2'
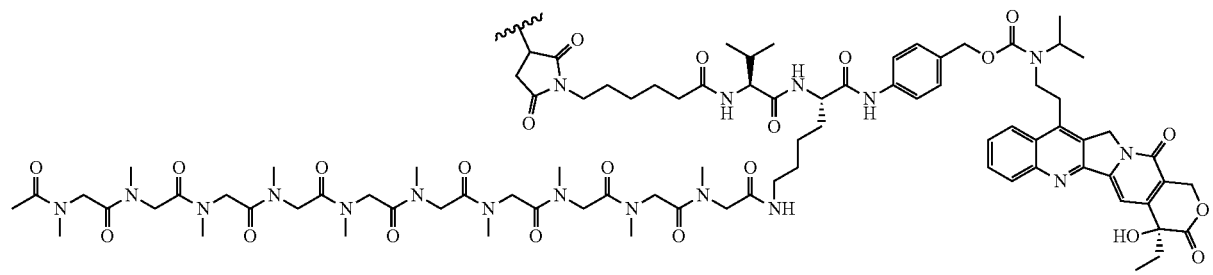
L-D-3'
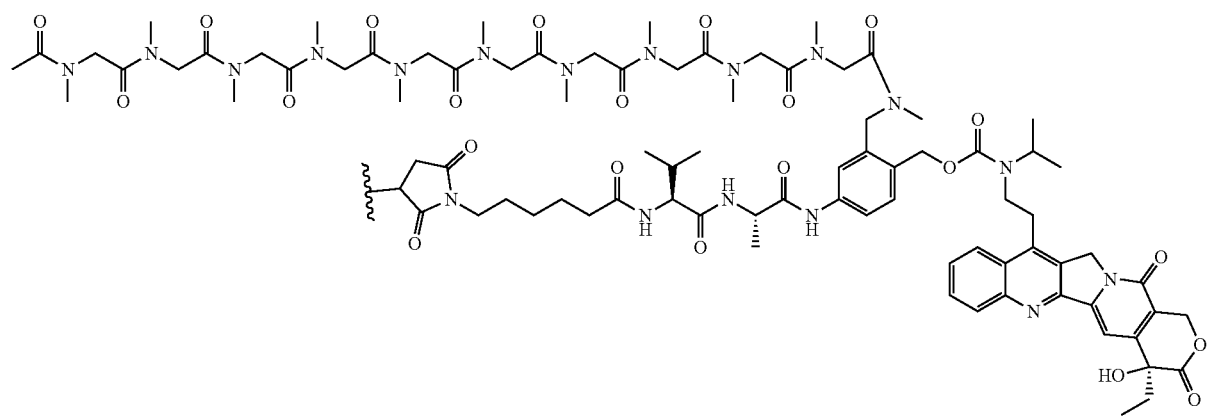
L-D-4'
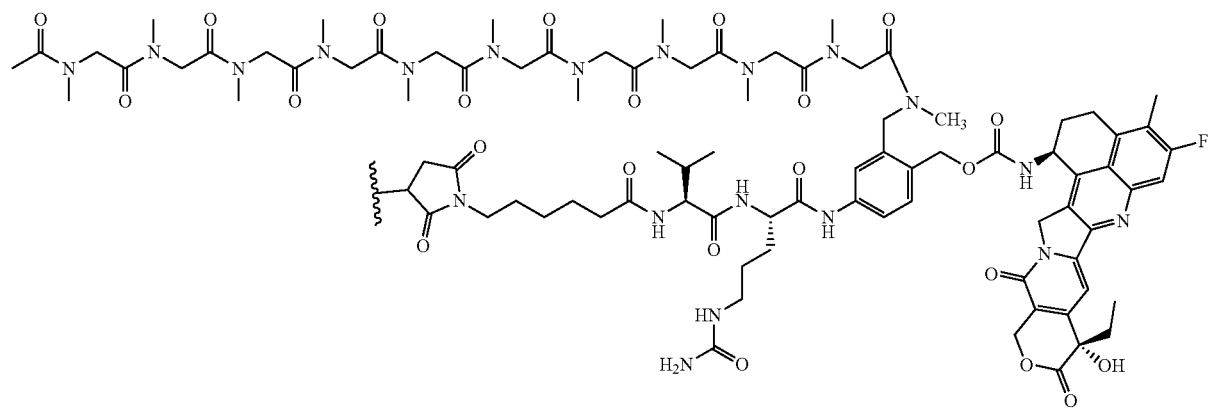
L-D-5'
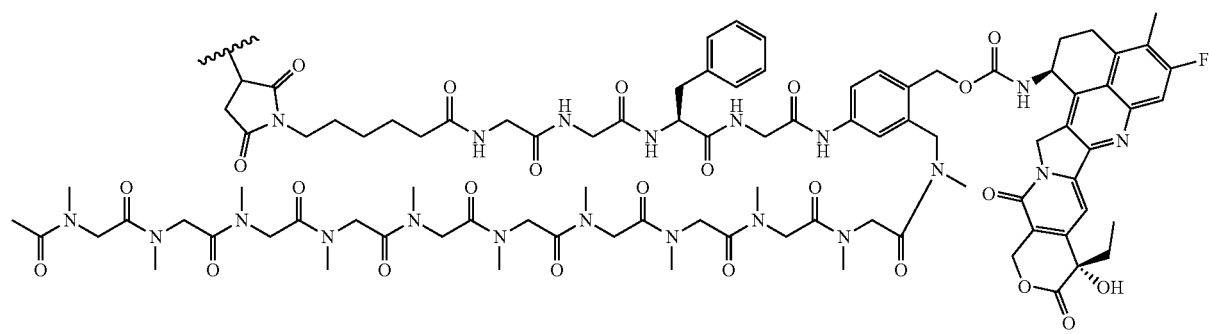

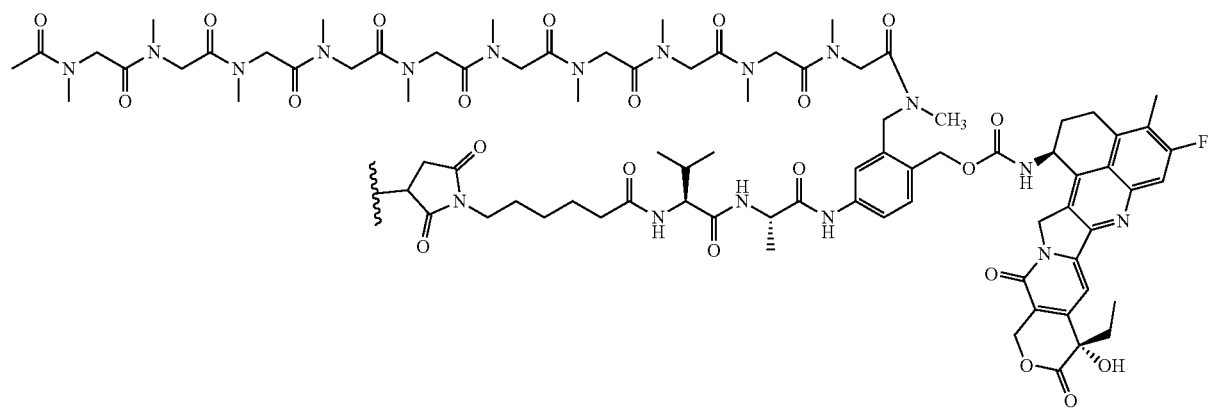
L-D-6′
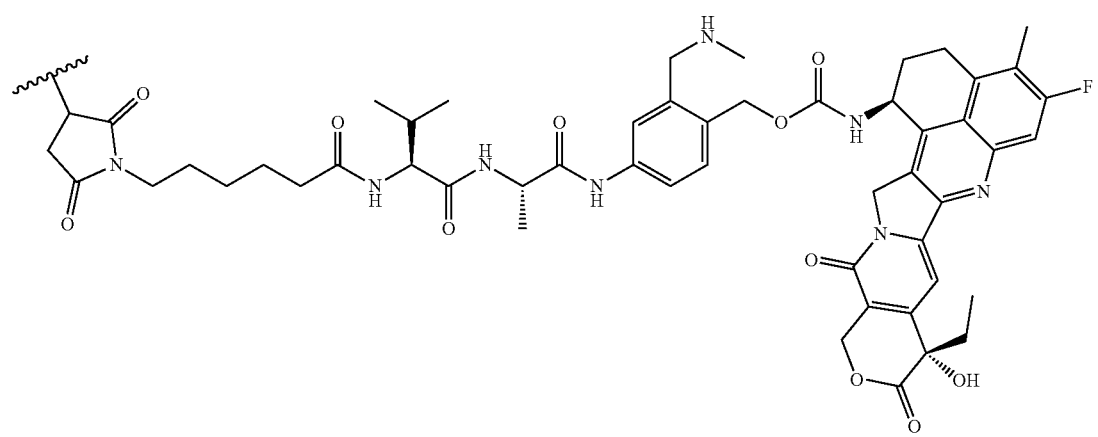
L-D-7′
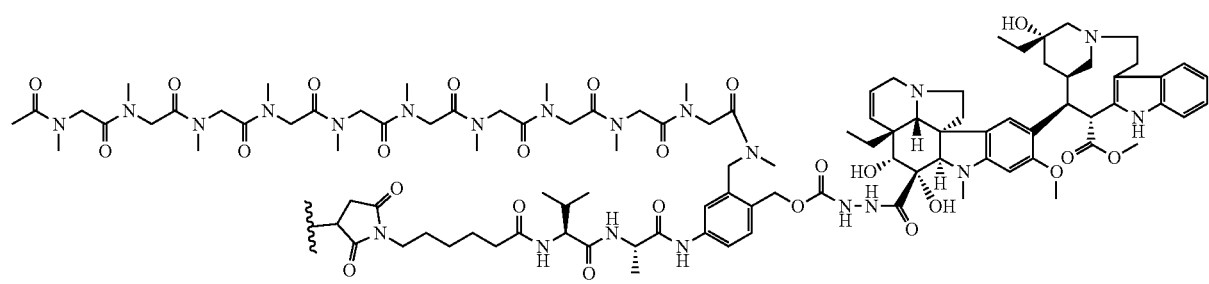
L-D-8′

-continued
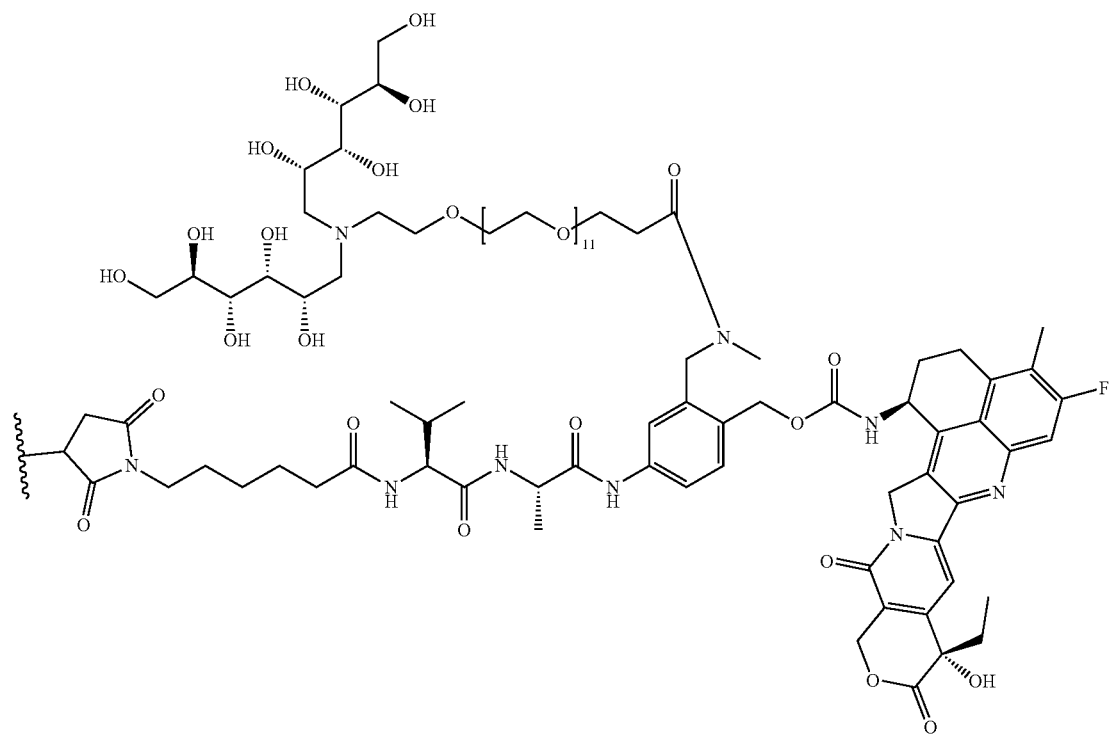
L-D-9'
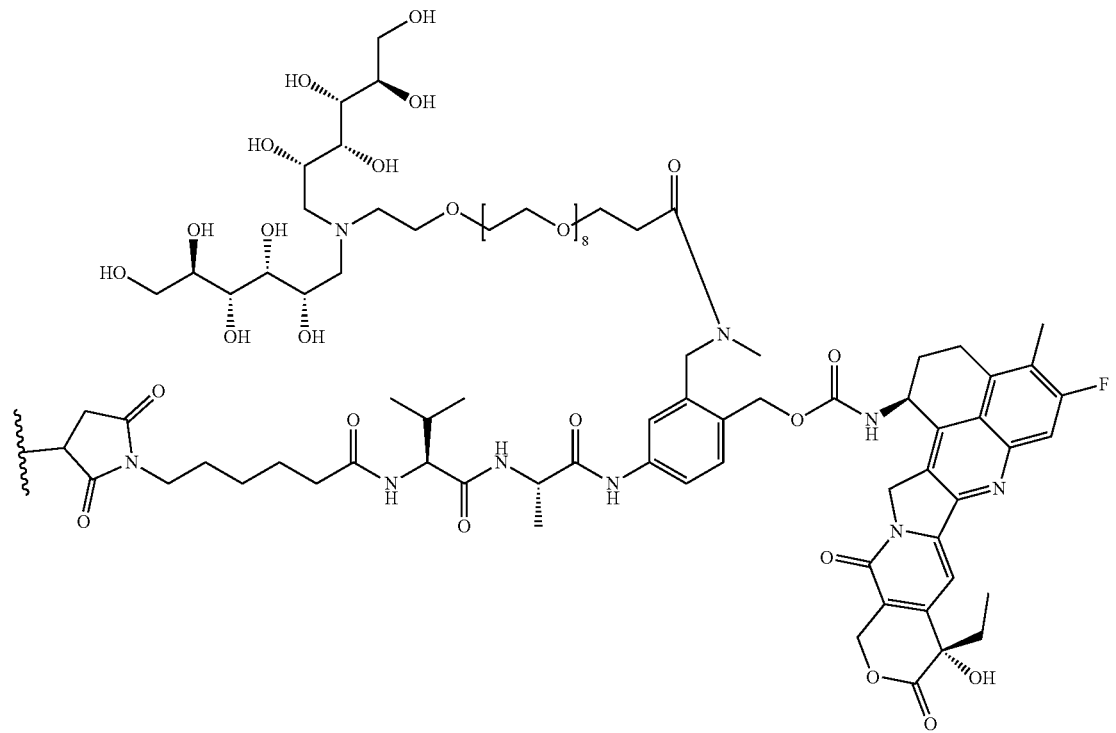
L-D-10'

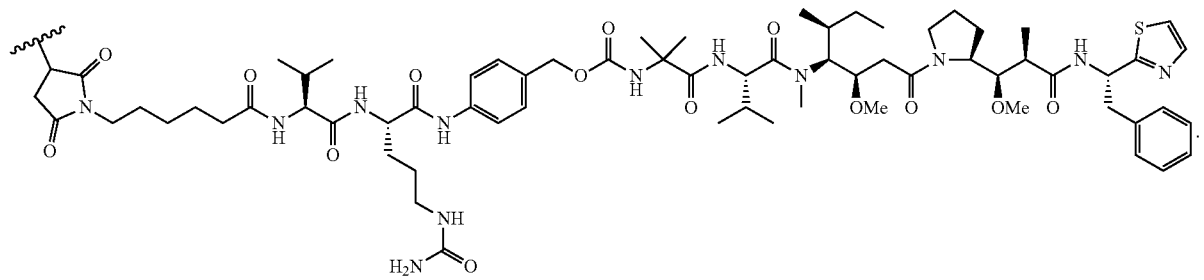
L-D-11'
In certain embodiments, the antibody-drug conjugate is selected from:

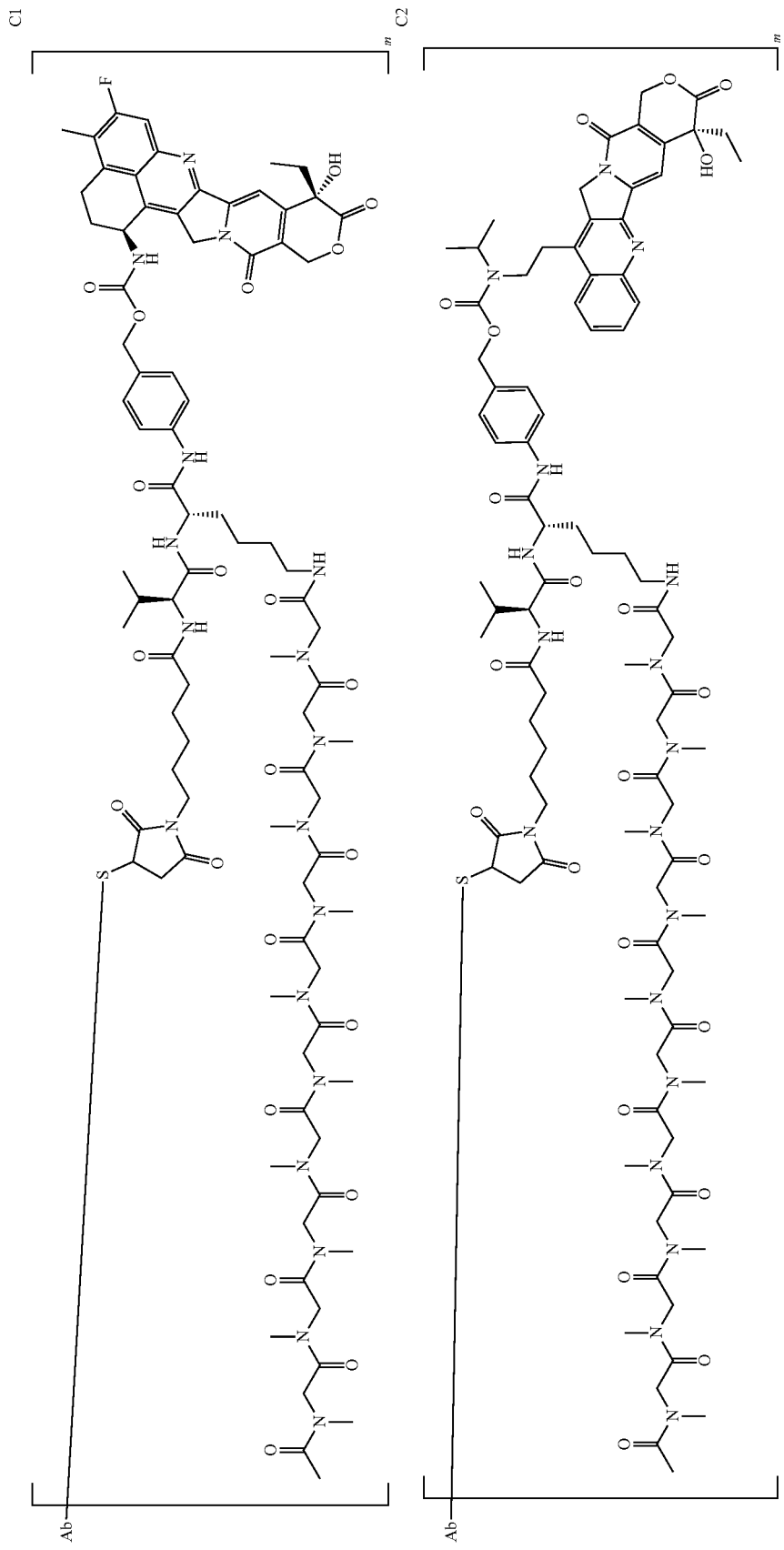

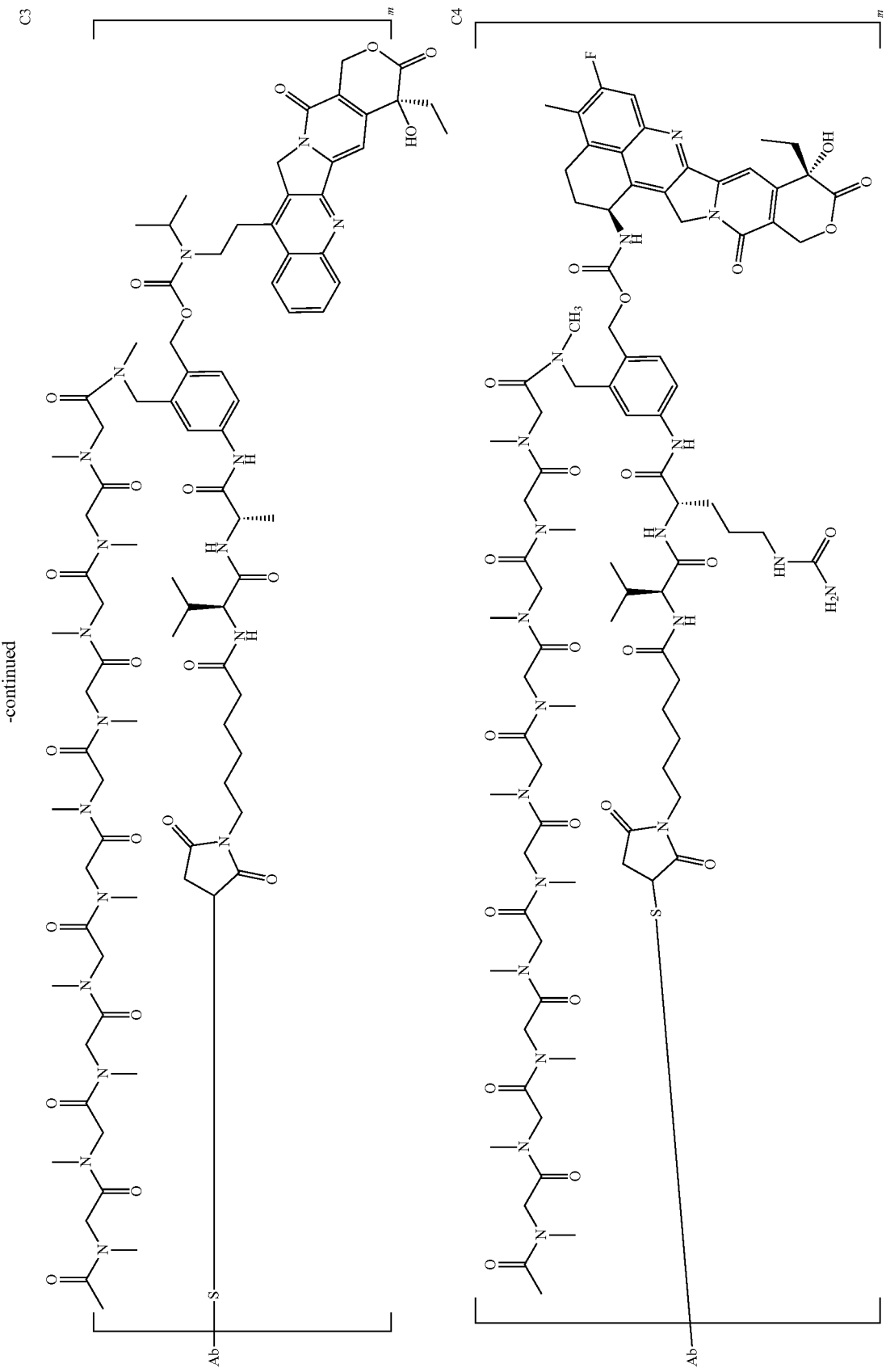

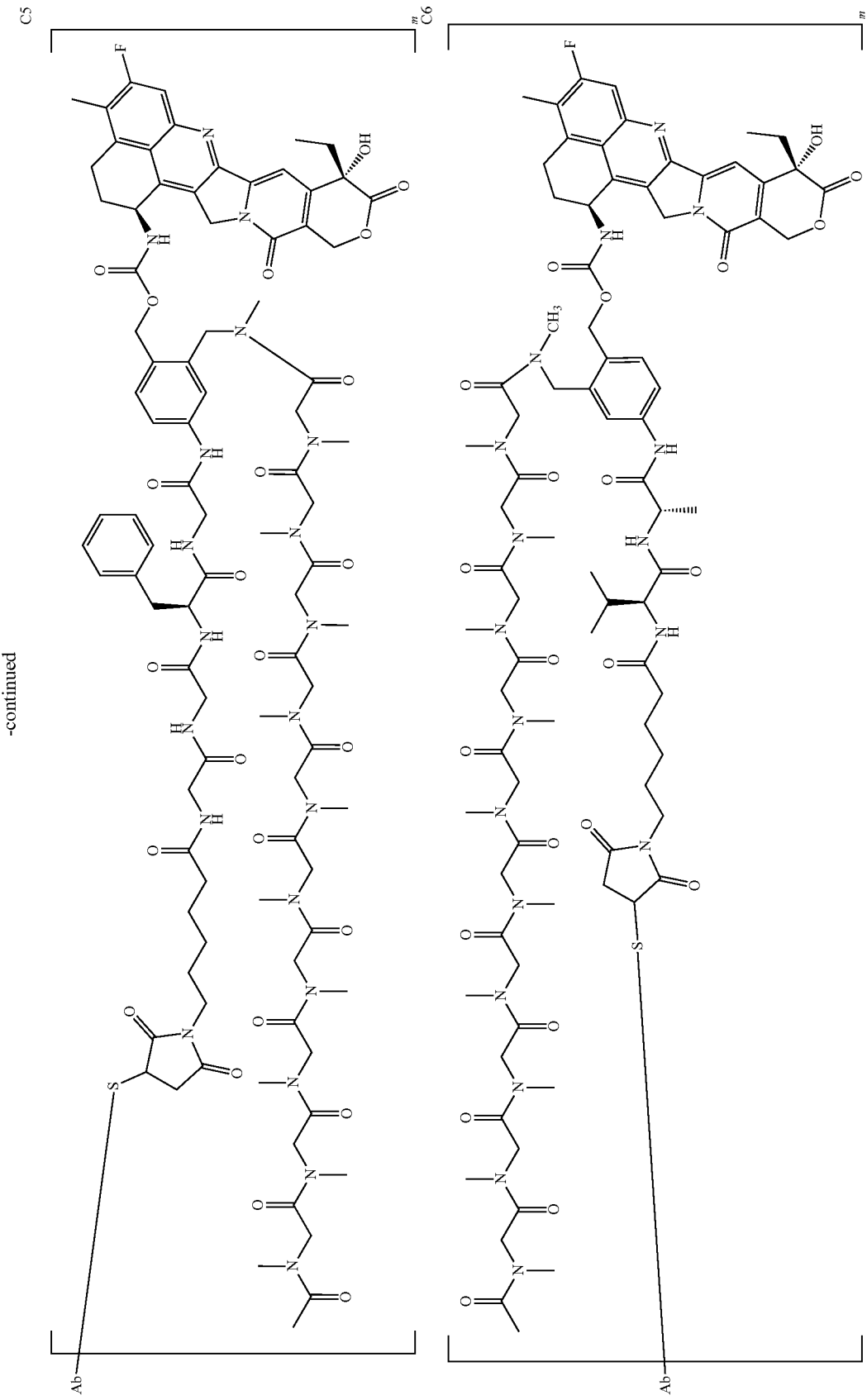

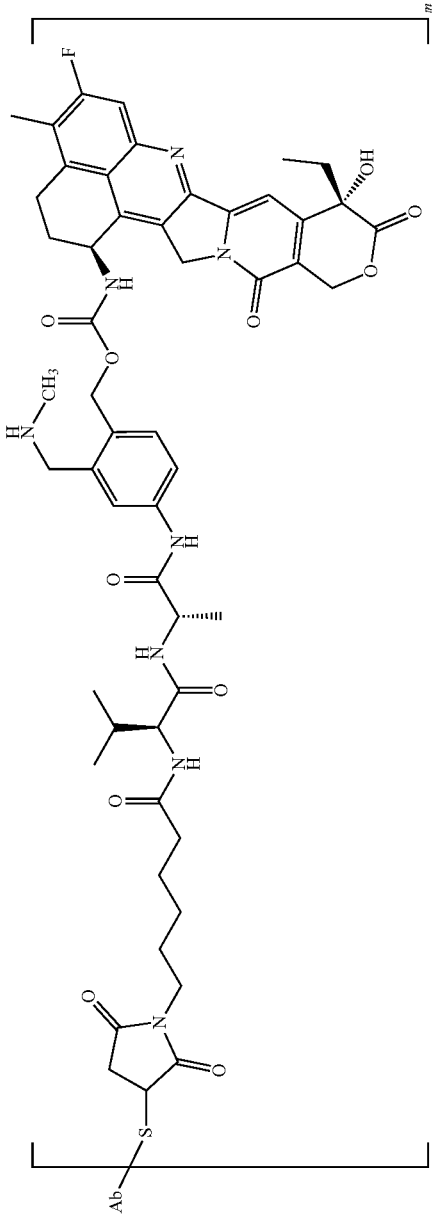
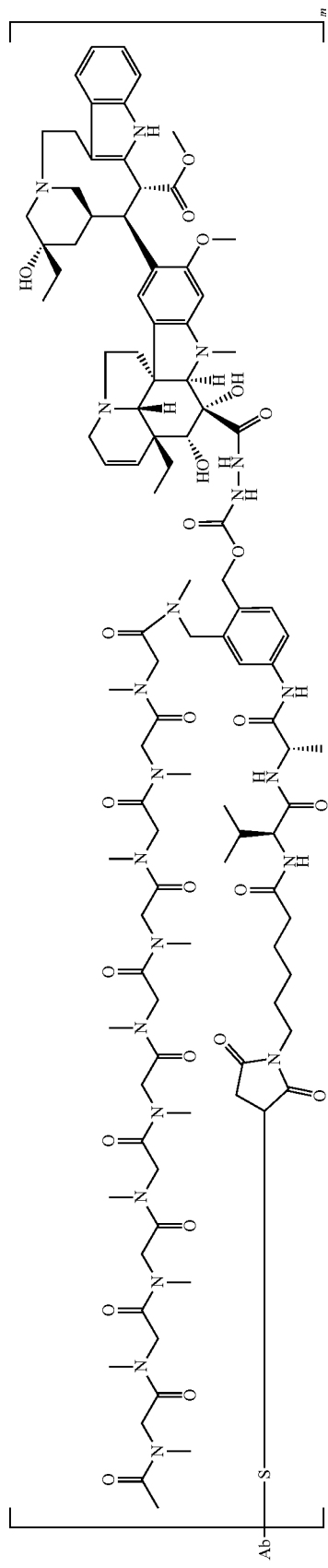

-continued
C-9
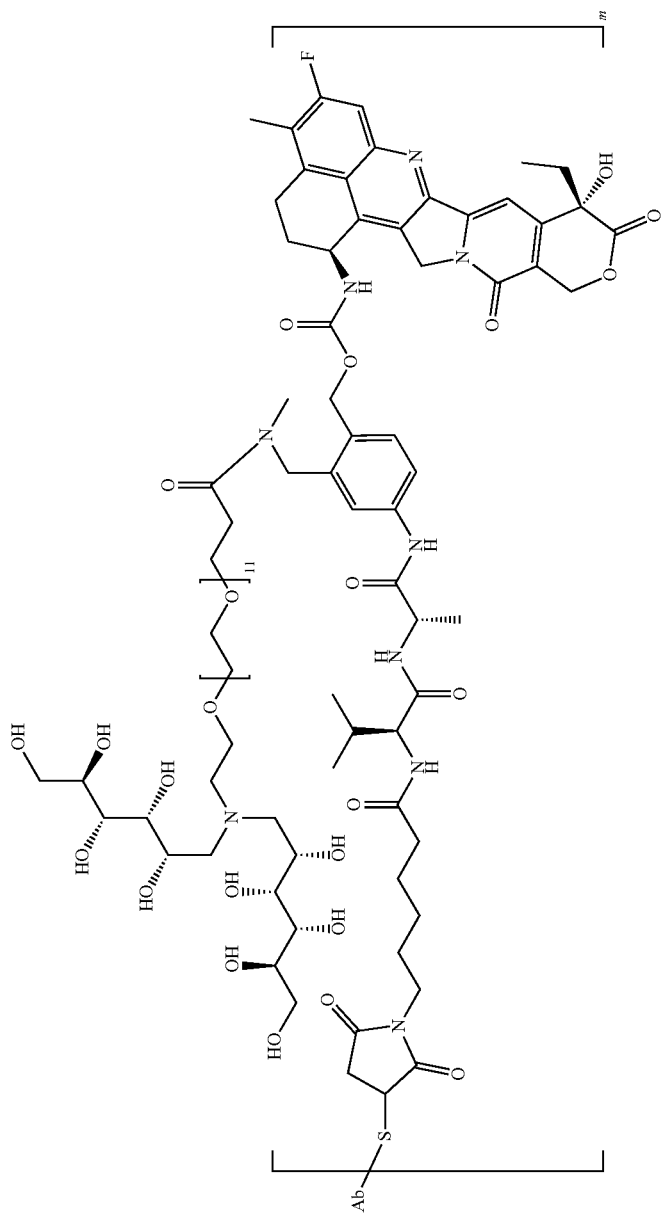

C-10
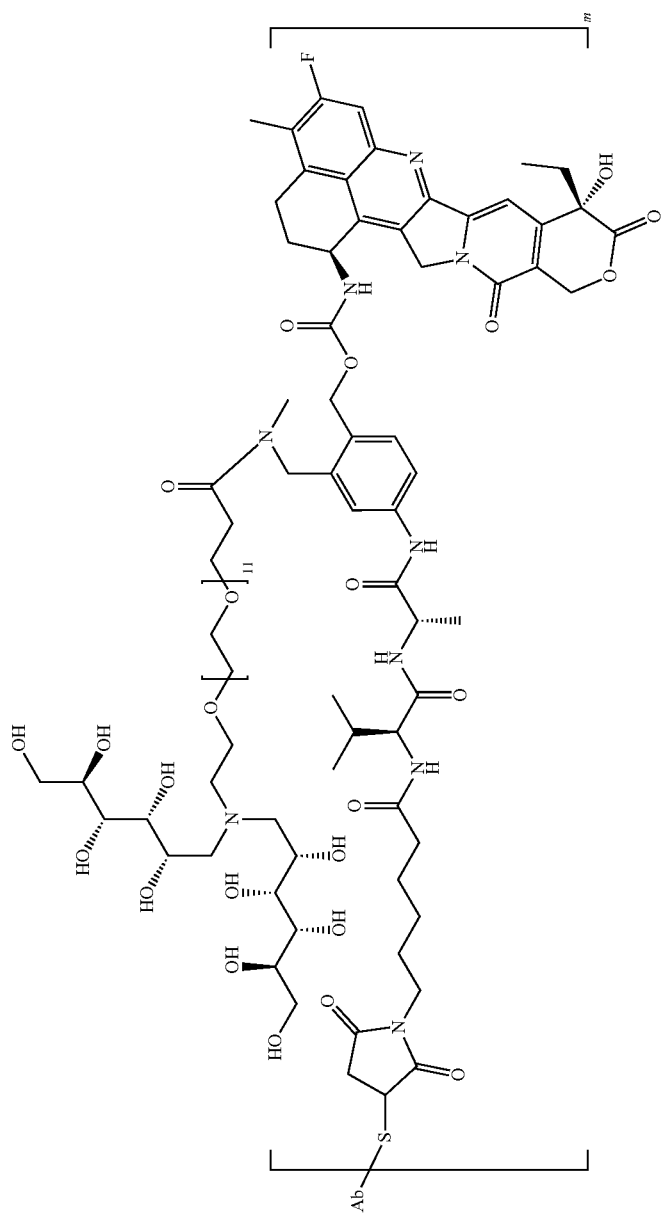
C-11
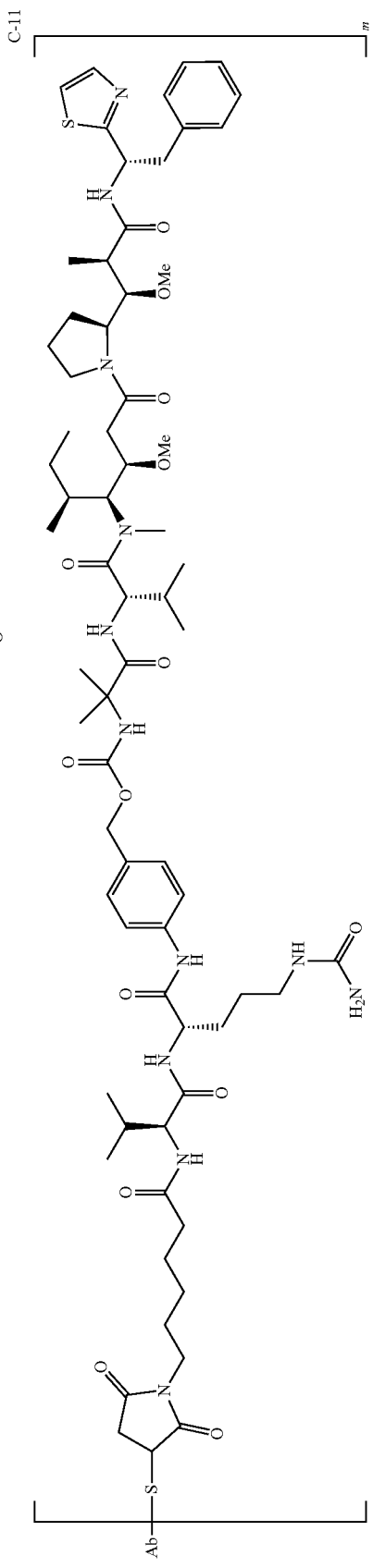

wherein m and Ab are as defined in the present disclosure.

An eighth aspect of the present disclosure provides a method of preparing the antibody-drug conjugate or a pharmaceutically acceptable salt thereof, comprising:

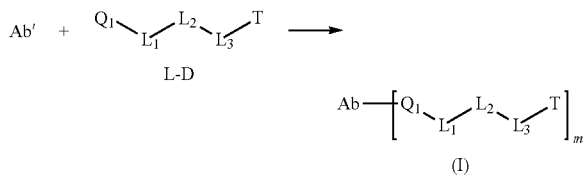

reducing Ab to obtain Ab'; and
coupling Ab' with a compound as shown in formula L-D to obtain an antibody-drug conjugate as shown in formula (I),
wherein Ab, $Q_1$, $L_1$, $L_2$, $L_3$, T, and m are as defined in the present disclosure.

In certain embodiments, the compound as shown in formula L-D is selected from compounds L-D-1 to L-D-11.

A typical preparation method includes diluting an antibody stock solution to 2-10 mg/mL with a reaction buffer, adding 140-200 times molar excess of dithiothreitol (DTT), or adding 6.0-20 times molar excess of tris(2-carboxyethyl) phosphine hydrochloride (TCEP), and stirring the reaction solution at 10-35° C. for 2-48 hours. The above reaction buffer can be a buffer prepared in the following ratios: 50 mM potassium dihydrogen phosphate-sodium hydroxide ($KH_2PO_4$—NaOH)/150 mM sodium chloride (NaCl)/1 mM diethylene triaminepentaacetic acid (DTPA), pH 6-9; 50 mM disodium hydrogen phosphate-citric acid/150 mM sodium chloride (NaCl)/1 mM diethylene triaminepentaacetic acid (DTPA), pH 6-9; 50 mM boric acid-borax/150 mM sodium chloride (NaCl)/1 mM diethylene triaminepentaacetic acid (DTPA), pH 6-9; 50 mM histidine-sodium hydroxide/150 mM sodium chloride (NaCl)/1 mM diethylene triaminepentaacetic acid (DTPA), pH 6-9; and PBS/1 mM diethylene triaminepentaacetic acid (DTPA), pH 6-9.

The above reaction solution is cooled to 0-10° C. If DTT reduction is adopted, it is necessary to remove the excess DTT through desalting column or ultrafiltration after the completion of the reduction reaction. Afterwards, a substituted maleimide compound (which is dissolved in acetonitrile (ACN), dimethyl sulfoxide (DMSO), dimethylformamide (DMF), or diethylacetamide (DMA) at a concentration of 10 mg/ml in advance) is added to ensure that the volume percentage of an organic solvent in the total reaction solution does not exceed 15%, and the coupling reaction is stirred at 0-37° C. for 2-4 h. If TCEP reduction is adopted, the coupling is carried out by adding the substituted maleimide compound directly without removing the remaining TCEP.

The coupling reaction mixture is purified by filtration with sodium succinate/NaCl buffer or histidine-acetate/sucrose gel using a desalting column, and peaked samples are collected according to the UV absorption value at 280 nm, or the coupling reaction mixture is ultrafiltered for several times. The product is then filtered to remove bacteria and the resulting product is stored at low temperature. The preferred temperature is −100° C. to −20° C., and the pore size of the filtration device is preferably 0.15-0.3 micrometers.

The DAR values of the resulting antibody-drug conjugates are relatively homogeneous. When differently substituted maleimide linkers (linker fragments) of the present disclosure are employed, the homogeneity of the ADC product is very high (typically the DAR-dominant product (e.g., a DAR value of about 4) accounts for at least 60%, at least 70%, at least 80%, at least 90%, or higher of all ADCs). For ADCs with certain difference in DAR, if there is a need to obtain a sample with better homogeneity, separation and purification can be further carried out using, but not limited to, the following methods: hydrophobic interaction chromatography (HIC), molecular exclusion chromatography (SEC), and ion exchange chromatography (IEC).

A ninth aspect of the present disclosure provides a pharmaceutical composition comprising the antibody-drug conjugate or a pharmaceutically acceptable salt thereof, and one or more pharmaceutically acceptable carriers and/or excipients.

In certain embodiments, the antibody-drug conjugate is present in the pharmaceutical composition in an effective amount for treating a disease. The antibody-drug conjugate may be administered as a single pharmaceutical active ingredient or in combination with other drugs, e.g., other anti-cancer drugs. In some embodiments, the pharmaceutical composition further contains other drugs, e.g., other anti-cancer drugs. The other anti-cancer drugs include, but are not limited to, anti-PD-1 antibodies, anti-PDL-1 antibodies, and/or anti-CTLA-4 antibodies.

In certain embodiments, the antibody-drug conjugate or the pharmaceutical composition comprising the same is administered in an effective amount or at an effective dose, e.g., in the range of 1 ng/kg of body weight to about 20-100 mg/kg of body weight per day, and may be administered once, twice, three times, or more times per day for 1-4 weeks or longer.

The antibody-drug conjugate or the pharmaceutical composition comprising the same may be administered by any one of conventional routes, such as intravenously, intraarterially, intramuscularly, and intraperitoneally, etc.

A tenth aspect of the present disclosure provides use of the antibody-drug conjugate or a pharmaceutically acceptable salt thereof or the pharmaceutical composition in preparation of a medicament for prophylaxis and/or treatment of a disease, particularly a PTK7-mediated disease or disorder, or in preparation of a medicament for treatment and/or prophylaxis of a tumor, or in preparation of a kit for diagnosis of a disease, particularly a PTK7-mediated disease or disorder.

The present disclosure also provides the antibody-drug conjugate or a pharmaceutically acceptable salt thereof or the pharmaceutical composition for use in diagnosis, prophylaxis and/or treatment of a disease, particularly a PTK7-mediated disease or disorder, or for use in treatment and/or prophylaxis of a tumor.

The present disclosure also provides a method for diagnosis, prophylaxis and/or treatment of a disease, particularly a PTK7-mediated disease or disorder, or a method for treatment and/or prophylaxis of a tumor, comprising administering to an individual in need thereof an effective amount of the antibody-drug conjugate or a pharmaceutically acceptable salt thereof or the pharmaceutical composition.

In certain embodiments, the PTK7-mediated disease or disorder is a cancer with high expression of PTK7.

In certain embodiments, the tumor is selected from lung cancer, urethral cancer, large intestine cancer, prostate cancer, ovarian cancer, pancreatic cancer, breast cancer, bladder cancer, gastric cancer, gastrointestinal stromal tumor, cervical cancer, esophageal cancer, squamous cell carcinoma, peritoneal cancer, liver cancer, hepatocellular cancer, colon cancer, rectal cancer, colorectal cancer, endometrial cancer, uterine cancer, salivary gland cancer, renal cancer, vulvar cancer, thyroid cancer, penile cancer, leukemia, malignant lymphoma, plasmacytoma, myeloma, and sarcoma.

In certain embodiments, the tumor is selected from lung cancer, breast cancer, colorectal cancer, esophageal cancer, cervical cancer, squamous carcinoma of head or neck, and ovarian cancer.

In certain embodiments, the PTK7-mediated disease or disorder includes lung cancer, urethral cancer, large intestine cancer, prostate cancer, ovarian cancer, pancreatic cancer, breast cancer, bladder cancer, gastric cancer, gastrointestinal stromal tumor, cervical cancer, esophageal cancer, squamous cell carcinoma, peritoneal cancer, liver cancer, hepatocellular cancer, colon cancer, rectal cancer, colorectal cancer, endometrial cancer, uterine cancer, salivary gland cancer, renal cancer, vulvar cancer, thyroid cancer, penile cancer, leukemia, malignant lymphoma, plasmacytoma, myeloma, and sarcoma. In certain embodiments, the PTK7-mediated disease or disorder is selected from lung cancer, breast cancer, colorectal cancer, esophageal cancer, cervical cancer, squamous carcinoma of head or neck, and ovarian cancer.

An eleventh aspect of the present disclosure provides a kit comprising the antibody or an antigen-binding fragment thereof, the isolated nucleic acid molecule, the vector, the host cell, the antibody-drug conjugate or a pharmaceutically acceptable salt thereof, or the pharmaceutical composition.

In certain embodiments, the kit comprises the anti-PTK7 antibody or an antigen-binding fragment thereof, and an instruction for use. The kit may be used for diagnosing a disease, in particular a PTK7-mediated disease or disorder.

Such a kit may, for example, comprises a disposable test device, and the test device is configured to produce a detectable signal related to the presence or amount of PTK7 in a biological sample. Alternatively, such a kit may be formulated to perform an assay in a clinical analyzer that does not utilize a disposable test device. Preferably, the kit is an in vitro diagnostic agent. As used herein, the term "in vitro diagnostic" refers to a medical device which is a reagent, a reagent product, a calibrator, a control material, a kit, an instrument, an equipment, an apparatus or a system, whether used alone or in combination, intended by the manufacturer to be used in vitro for the examination of specimens, including blood and tissue donations, derived from a human body, specifically or principally designed for providing information concerning a physiological or pathological state or concerning a congenital abnormality, or for determining the safety and compatibility with potential recipients, or for monitoring therapeutic measures.

A twelfth aspect of the present disclosure provides a method for prophylaxis and/or treatment of a disease, in particular a PTK7-mediated disease or disorder, comprising administering to a subject a therapeutically effective amount of the antibody or an antigen-binding fragment thereof or the antibody-drug conjugate or the pharmaceutical composition.

A thirteenth aspect of the present disclosure provides a method for diagnosis or prognosis of a disease, particularly a PTK7-mediated disease or disorder, comprising:
collecting a tissue sample of interest from a subject, and
contacting the tissue sample with the antibody or an antigen-binding fragment thereof.

If an amount of PTK7 is detected, the subject may be diagnosed with a cancer. Further, if an increase/decrease in PTK7 expression is detected, it indicates a cancer progression/improvement.

Other features and advantages of the present disclosure will be set forth in the subsequent specification and, in part, will become apparent from the specification or will be understood by practicing the present disclosure. Other advantages of the present disclosure may be realized and obtained by the embodiments described in the specification. The contents of all references, Genbank entries, patents and published patent applications cited throughout the present disclosure are expressly incorporated herein by reference.

Definition of Terms

In the present disclosure, scientific and technical terms as used herein have the meanings commonly understood by those skilled in the art, unless otherwise indicated. Moreover, the cell culture, molecular genetics, nucleic acid chemistry, and immunology laboratory procedures as used herein are routine steps widely used in respective fields. Also, for a better understanding of the present disclosure, definitions and explanations of relevant terms are provided below.

As used herein, the term "and/or" should be considered to be a specific disclosure of each of two or more specified features or elements, with or without other features or elements. Accordingly, the term "and/or" as used in a phrase, for example, "A and/or B" herein, is intended to include "A and B", "A or B", "A" (alone), and "B" (alone).

It should be understood that wherever the word "include" or "comprise" is used to describe aspects, similar aspects described by terms "consist of" and/or "consist essentially of" are also provided.

As used herein, the term "about" means a quantity, level, value, number, frequency, percentage, dimension, size, amount, weight, or length that varies at an acceptable level in the art. In some embodiments, such variation may be as much as 30%, 25%, 20%, 15%, 10%, 9%, 8%, 7%, 6%, 5%, 4%, 3%, 2%, or 1% of the referenced quantity, level, value, number, frequency, percentage, dimension, size, amount, weight, or length. When the term "about" is used in conjunction with a numerical range, it modifies the range by extending the upper and lower boundaries of the numerical value.

As used herein, the term "PTK7" refers to protein tyrosine kinase-7 (PTK7), also known as colon carcinoma kinase-4 (CCK4), which is a catalytically active receptor tyrosine kinase encoded by the PTK7 gene in humans and includes seven extracellular immunoglobulin-like domains, one transmembrane region, one juxtamembrane region, and one catalytically inert cytoplasmic tyrosine kinase domain. PTK7 has a wide range of biological functions, including embryogenic tube generation and pluripotent stem cell function as well as functions and roles in malignant tumorigenesis and development. The term "PTK7" includes variants, isotypes, homologs, orthologs and paralogs. For example, in certain instances, an antibody specific to a human PTK7 protein may cross-react with a PTK7 protein from a non-human species (e.g., *Macaca fascicularis*). In other embodiments, an antibody specific to a human PTK7 protein may be completely specific to the human PTK7 protein and exhibit no cross-reactivity with other species or other types or may cross-react with PTK7 from some but not all other species.

Moderate to high expression of PTK7 is usually determined by comparing the expression levels thereof in cancer tissues and normal tissues. Typically, this is determined by using a variety of experimental techniques such as immunohistochemistry (IHC), immunoblotting (Western blotting), fluorescent quantitative PCR (qPCR), and gene chip. In general, for a certain tumor antigen, its expression level above a certain threshold can be considered as moderate to high expression. The specific threshold may vary depending on factors such as the purpose of the study, the experimental technique, and the context of the study. In clinical studies, researchers usually determine thresholds based on the analysis of large sample data to determine whether the expression level of tumor antigens is higher than normal level. It is notable that moderate to high expression of tumor antigens may vary among cancer types and may also vary among patients.

As used herein, the term "antibody" refers to an immunoglobulin molecule which is usually composed of two pairs of polypeptide chains (each pair has a "light" (L) chain and a "heavy" (H) chain). The light chains of the antibody may be classified as κ and λ light chains. The heavy chains may be classified as μ, δ, γ, α, or ε, and isotypes of the antibody are defined as IgM, IgD, IgG, IgA, and IgE, respectively. Within the light chains and the heavy chains, a variable region and a constant region are linked by a "J" region of about 12 or more amino acids, and the heavy chains further comprise a "D" region of about 3 or more amino acids. Each heavy chain consists of a heavy chain variable region ($V_H$) and a heavy chain constant region ($C_H$). The heavy chain constant region consists of 3 domains ($C_H1$, $C_H2$, and $C_H3$). Each light chain consists of a light chain variable region ($V_L$) and a light chain constant region ($C_L$). The light chain constant region consists of one domain $C_L$. The constant regions of the antibody can mediate binding of immunoglobulins to host tissues or factors, including various cells of the immune system (e.g., effector cells) and a first component (C1q) of the classical complement system. The $V_H$ and $V_L$ regions can also be subdivided into regions with a high degree of variability (called as complementary determining regions (CDRs)), with more conserved regions called frame regions (FRs) distributed therebetween. Each $V_H$ and $V_L$ consists of 3 CDRs and 4 FRs arranged from the amino terminal to the carboxy terminal in the following order: FR1, CDR1, FR2, CDR2, FR3, CDR3, and FR4. The variable regions ($V_H$ and $V_L$) of each heavy chain/light chain pair form the antibody binding site, respectively. The distribution of amino acids to various regions or domains is in accordance with that defined in Kabat Sequences of Proteins of Immunological Interest (National Institutes of Health, Bethesda, Md. (1987 and 1991)), or Chothia & Lesk (1987) J. Mol. Biol. 196:901-917; Chothia et al. (1989) Nature 342:878-883. The term "antibody" is not limited to any particular method for producing antibodies. For example, the antibody particularly includes recombinant antibodies, monoclonal antibodies, and polyclonal antibodies. The antibody may be different isotypes of antibodies, for example, IgG (e.g., IgG1, IgG2, IgG3, or IgG4 subtypes), IgA1, IgA2, IgD, IgE, or IgM antibodies.

As used herein, the term "complementary determining region" or "CDR" refers to the amino acid residue in the variable region of an antibody that is responsible for antigen binding. The precise boundaries of these amino acid residues can be defined according to various numbering systems known in the art, for example, can be defined according to the Kabat numbering system (Kabat et al., Sequences of Proteins of Immunological Interest, 5th Ed. Public Health Service, National Institutes of Health, Bethesda, Md., 1991), the Chothia numbering system (Chothia & Lesk (1987) J. Mol. Biol. 196: 901-917; Chothia et al. (1989) Nature 342: 878-883), or the IMGT numbering system (Lefrancetal., Dev. Comparat. Immunol. 27: 55-77, 2003). For a given antibody, those skilled in the art will readily identify the CDRs defined by the respective numbering systems, and the correspondence among the different numbering systems is well known to those skilled in the art (see, e.g., Lefranc et al., Dev. Comparat. Immunol. 27:55-77, 2003).

The CDRs contained in the antibodies or antigen-binding fragments thereof of the present disclosure may be determined according to various numbering systems known in the art. In certain embodiments, the CDRs contained in the antibodies or antigen-binding fragments thereof of the present disclosure are preferably determined by a Kabat, Chothia, or IMGT numbering system.

As used herein, the term "antigen-binding fragment" of an antibody refers to a polypeptide containing a fragment of a full-length antibody that maintains the ability to specifically bind to a same antigen to which the full-length antibody binds, and/or competes with the full-length antibody for specific binding to the antigen, which is also called an "antigen-binding portion". Usually, reference is made to Fundamental Immunology, Ch. 7 (Paul, W., ed., 2nd Edition, Raven Press, N.Y. (1989), the full text of which is incorporated herein by reference for all purposes. The antigen-binding fragment of an antibody may be produced by a recombinant DNA technology or by enzymatic or chemical cleavage of an intact antibody. In some instances, the antigen-binding fragment includes Fab, Fab', F(ab')$_2$, Fd, Fv, dAb and complementary determining region (CDR) fragments, single-chain antibodies (e.g., scFv), chimeric antibodies, diabodies, and such polypeptides which contain at least a portion of an antibody that is sufficient to endow the polypeptides with the ability to specifically bind to antigens.

As used herein, the term "Fd fragment" means an antibody fragment consisting of the VH and CHi domains; the term "Fv fragment" means an antibody fragment consisting of the VL and VH domains in a single arm of an antibody; the term "dAb fragment" means an antibody fragment consisting of the VH domains (Ward et al., Nature 341:544 546 (1989)); the term "Fab fragment" means an antibody fragment consisting of the VL, VH, CL, and CHi domains; the term "F(ab')$_2$ fragment" means an antibody fragment comprising two Fab fragments linked by a disulfide bridge in the hinge region; the term "Fab' fragment" means one of 2 Fab' fragments formed by breaking the disulfide bond in the hinge region of F(ab')$_2$ through the reduction of the F(ab')$_2$ fragment.

In some instances, the antigen-binding fragment of an antibody is single-chain antibodies (e.g., scFv), where the VL and VH domains form univalent molecules by pairing with a linker that can produce a single polypeptide chain (see, for example, Bird et al., Science 242:423 426 (1988) and Huston et al., Proc. Natl. Acad. Sci. USA 85:5879 5883 (1988)). Such scFv molecules may have a general structure: NH2-VL-linker-VH—COOH or NH2-VH-linker-VL-COOH. A suitable linker in the prior art is composed of a repeated GGGGS amino acid sequence or a variant thereof. For example, a linker with an amino acid sequence (GGGGS)4 may be used, but a variant thereof may also be used (Holliger et al. (1993), Proc. Natl. Acad. Sci. USA 90:6444-6448). Other linkers that may be used in the present disclosure are described by Alfthan et al. (1995), Protein Eng. 8:725-731, Choi et al. (2001), Eur. J. Immunol. 31:94-106, Hu et al. (1996), Cancer Res. 56:3055-3061, Kipriyanov et al. (1999), J. Mol. Biol. 293:41-56, and Roovers et al. (2001), Cancer Immunol.

In some instances, an antigen-binding fragment of an antibody is a diabody, i.e., a bivalent antibody, which is a small antibody fragment having two antigen-binding sites, where the fragment comprises a heavy chain variable domain (VH) and a light chain variable domain (VL) linked thereto in the same polypeptide chain (VH-VL or VL-VH), wherein the VH and VL domains are expressed in a single polypeptide chain using a linker that is too short to allow pairing between the two domains of the same chain, thereby forcing the domain to pair with the complementary domain of the other chain and creating two antigen-binding sites (see, e.g., Holliger P. et al, Proc. Natl. Acad. Sci. USA 90:6444 6448 (1993) and Poljak R. J. et al, Structure 2:1121 1123 (1994)).

An antigen-binding fragment of an antibody (e.g., the antibody fragment described above) can be obtained from a given antibody (e.g., monoclonal antibodies ch13, Hu13H2L0, Hu13H2L$_3$, Hu13H3L0, Hu13H3L3, and Hu13H3L5 as provided in the present disclosure) using conventional techniques known to those skilled in the art (e.g., recombinant DNA techniques or enzymatic or chemical cleavage methods), and the antigen-binding fragment of the antibody is screened for specificity in the same manner as used for intact antibodies.

Herein, unless otherwise explicitly indicated in the context, the term "antibody" not only includes an intact antibody, but also includes an antigen-binding fragment of the antibody when referred to.

As used herein, the terms "McAb" and "monoclonal antibody" refer to an antibody or a fragment thereof from a group of highly homologous antibody molecules, i.e., a group of identical antibody molecules, except for natural mutations that may occur spontaneously. The monoclonal antibody is highly specific for a single epitope on an antigen. A polyclonal antibody is contrasted with the monoclonal antibody, which typically contains at least 2 or more different antibodies that typically recognize different epitopes on the antigen. The monoclonal antibody can usually be obtained by the hybridoma technique first reported by Kohler et al. (Nature, 256:495, 1975), but can also be obtained by recombinant DNA techniques (see, e.g., U.S. Pat. No. 4,816,567).

For example, the monoclonal antibody can be prepared as follows. Mice or other suitable host animals are first immunized with an immunogen (and adjuvant if necessary). The immunogen or adjuvant is typically injected by subcutaneous multipoint injection or intraperitoneal injection. The immunogen may be pre-coupled to certain known proteins, such as serum albumin or soybean trypsin inhibitor, to enhance the immunogenicity of the antigen within the host. The adjuvant may be Freund's adjuvant or MPL-TDM, etc. Upon immunization, the animal will produce lymphocytes that secrete antibodies that specifically bind to the immunogen in the body. In addition, lymphocytes can also be obtained using in vitro immunization. Target lymphocytes are collected and fused with myeloma cells using a suitable fusion agent, such as PEG, to obtain hybridoma cells (Goding, Monoclonal Antibodies: Principles and Practice, pp. 59-103, Academic Press, 1996). The hybridoma cells prepared as described above may be inoculated into a suitable culture solution for growth, and the culture solution preferably contains one or more substances capable of inhibiting the growth of unfused maternal myeloma cells. For example, for maternal myeloma cells deficient in hypoxanthine guanine phosphoribosyl transferase (HGPRT or HPRT), the addition of substances such as hypoxanthine, aminopterin, and thymine to the culture solution (HAT medium) will inhibit the growth of HGPRT-deficient cells. The preferred myeloma cells should be characterized by a high fusion rate, a stable antibody secretion capacity, sensitivity to the HAT culture solution, and the like. Among them, the murine-derived myeloma are preferred myeloma cells, such as MOP-21 or MC-11 mouse tumor-derived lines (THE Salk Institute Cell Distribution Center, San Diego, Calif. USA), and SP-2/0 or X63-Ag8-653 cell lines (American Type Culture Collection, Rockville, Md. USA). Studies have also reported that the human myeloma and human-murine hybrid myeloma cell lines are used for the preparation of human monoclonal antibodies (Kozbor, J. Immunol., 133: 3001 (1984); Brodeur et al., Monoclonal Antibody Production Techniques and Applications, pp. 51-63, Marcel Dekker, Inc., New York, 1987). The culture solution for growing the hybridoma cells is used for detecting the production of monoclonal antibodies against specific antigens. Methods for determining the binding specificity of the monoclonal antibody produced from the hybridoma cell include, for example, immunoprecipitation or in vitro binding assay such as radioimmunoassay (RIA) and enzyme-linked immunosorbent assay (ELISA). For example, the affinity of the monoclonal antibody can be determined using the Scatchard assay described by Munson et al. in Anal. Biochem. 107: 220 (1980). When the specificity, affinity, and reactivity of the antibody produced from the hybridoma have been determined, the target cell line can be subjected to subcloning according to the standard limited dilution method described in (Goding, Monoclonal Antibodies: Principles and Practice, pp. 59-103, Academic Press, 1996). Suitable culture solution may be DMEM or RPMI-1640, etc. In addition, the hybridoma cells can be grown in animals as ascites tumors. The monoclonal antibody secreted by the subclonal cells can be isolated from the cell culture solution, ascites or serum using conventional immunoglobulin purification methods such as protein A agarose gels, hydroxyapatite chromatography, gel electrophoresis, dialysis or affinity chromatography.

The monoclonal antibody can also be obtained by genetically engineered recombinant techniques. DNA molecules encoding the heavy chain and light chain genes of a monoclonal antibody can be isolated from hybridoma cells by PCR amplification using nucleic acid primers that specifically bind to the heavy chain and light chain genes of the monoclonal antibody. Insertion of the resulting DNA molecules into an expression vector, followed by transfection of host cells (such as E. coli cells, COS cells, CHO cells, or other myeloma cells that do not produce immunoglobulins) and culture under suitable conditions can result in a recombinantly expressed target antibody.

As used herein, the term "chimeric antibody" refers to an antibody in which a portion of the light chain or/and heavy chain is derived from one antibody (which may be derived from a particular species or belong to a particular antibody class or subclass) and another portion of the light chain or/and heavy chain is derived from another antibody (which may be derived from the same or a different species or belong to the same or a different antibody class or subclass), and in any case, the binding activity to the target antigen is retained (U.S. Pat. No. 4,816,567 to Cabilly et al.; Morrison et al., Proc. Natl. Acad. Sci. USA, 81:6851 6855 (1984)).

As used herein, the term "humanized antibody" refers to an antibody or antibody fragment obtained by replacing all or part of the CDR region of a human immunoglobulin (recipient antibody) with the CDR region of a non-human antibody (donor antibody), wherein the donor antibody may be a non-human (e.g., mouse, rat, or rabbit) antibody having the desired specificity, affinity, or reactivity. In addition, some amino acid residues in the frame region (FR) of the acceptor antibody may be replaced by amino acid residues of a corresponding non-human antibody, or by amino acid residues of other antibodies to further refine or optimize the properties of the antibody. For more details on humanized antibodies, see, for example, Jones et al., Nature, 321:522 525 (1986); Reichmann et al., Nature, 332:323 329 (1988); Presta, Curr. Op. Struct. Biol. 2:593 596 (1992); and Clark, Immunol. Today 21: 397 402 (2000).

As used herein, the term "isolated" or "being isolated" refers to artificially obtained from a natural state. If a certain "isolated" substance or constituent occurs in nature, it may be the result of a change in the natural environment in which it occurs, or it may be isolated from the natural environment, or both. For example, a certain unisolated polynucleotide or polypeptide is naturally present in a living animal, and highly pure and identical polynucleotides or polypeptides isolated from this natural state are called as isolated. The term "isolated" or "being isolated" does not exclude the incorporation of artificial or synthetic substances or the presence of other impure substances which do not affect the activity of the substance.

As used herein, the term "multispecific antibody" refers to an antibody having binding specificity for at least two different epitopes on the same antigen or different antigens. A multispecific antibody may be a full-length antibody or a fragment thereof. The term "bispecific antibody" refers to an antibody with binding specificity for two different antigens or two different epitopes capable of recognizing one antigen.

As used herein, the term "human antibody" or "fully human antibody" includes an antibody having variable and constant regions, if present, derived from a human germline immunoglobulin sequence. The human antibody may include amino acid residues that are not encoded by the human germline immunoglobulin sequence (e.g., mutations introduced by random or site-specific mutagenesis in vitro or by somatic mutation in vivo). However, the term "human antibody" does not include an antibody (i.e., humanized antibody) in which a CDR sequence derived from another mammalian lineage (e.g., mouse) is grafted onto a human framework sequence. A fully human antibody or human antibody may be derived from a transgenic mouse carrying a human antibody gene or derived from human cells.

As used herein, the terms "specific binding", "specificity", or "specific for" refer to a non-random binding reaction between two molecules, such as a reaction between an antibody and an antigen against which it is directed. In certain embodiments, an antibody that specifically binds to an antigen (or an antibody specific for the antigen) refers to that the antibody binds to the antigen with an affinity ($K_D$) of less than about $10^{-5}$ M, e.g., less than about $10^{-6}$ M, $10^{-7}$ M, $10^{-8}$ M, $10^{-9}$ M, or $10^{-10}$ M or less.

As used herein, the term "$K_D$" refers to a dissociation equilibrium constant for a given antibody-antigen interaction, which is used for describing the binding affinity between an antibody and an antigen. The smaller the equilibrium dissociation constant, the tighter the antibody-antigen binding and the higher the affinity between the antibody and the antigen. Typically, an antibody (e.g., the monoclonal antibodies ch13, Hu13H2L0, Hu13H2L3, Hu13H3L0, Hu13H3L3, and Hu13H3L5 of the present disclosure) binds to an antigen (e.g., protein tyrosine kinase 7 (PTK7)) at a dissociation equilibrium constant ($K_D$) that is less than about $10^{-5}$ M, e.g., less than about $10^{-6}$ M, 10-7 M, $10^{-8}$ M, $10^{-9}$ M, or $10^{-10}$ M or less, e.g., as determined in a BIACORE instrument using surface plasmon resonance (SPR).

As used herein, the terms "monoclonal antibody" and "McAb" have the same meaning and are used interchangeably; the terms "polyclonal antibody" and "PcAb" have the same meaning and are used interchangeably; and the terms "polypeptide" and "protein" have the same meaning and are used interchangeably. Moreover, in the present disclosure, amino acids are generally denoted by one-letter and three-letter abbreviations that are well known in the art. For example, alanine may be denoted by A or Ala.

As used herein, the term "cross-reactivity" refers to the ability of the antibodies described herein to bind to PTK7 from different species. For example, an antibody that binds to human PTK7 as described herein can also bind to PTK7 from monkey but has no cross-reactivity with mouse PTK7. Cross-reactivity can be measured by detecting the specific reactivity with purified antigens in binding assays (e.g., SPR, ELISA), or the binding with cells physiologically expressing PTK7 or otherwise functional interaction with the cells physiologically expressing PTK7. Examples of analyses known in the art for determining binding affinity include surface plasmon resonance (e.g., Biacore) or similar techniques (e.g., KinExa or OCTET).

As used herein, the term "nucleic acid molecule" is intended to include DNA molecules and RNA molecules. The nucleic acid molecule can be single stranded or double stranded and can be cDNA.

As used herein, the term "polypeptide" refers to a chain comprising at least two consecutively linked amino acid residues, with no upper limit on the length of the chain. One or more amino acid residues in a polypeptide may contain modifications, for example, but not limited to, optionally substituted polysarcosine residue modifications, optionally substituted glycosylated polyethylene glycol modifications, glycosylation modifications, phosphorylation modifications, or disulfide bond modifications. "Protein" may comprise one or more polypeptides.

As used herein, the terms "anti-PTK7 antibody", "anti-PTK7", "PTK7 antibody", "PTK7 monoclonal antibody", and "antibody binding to PTK7" have the same meaning and refer to an antibody that is capable of binding to the PTK7 protein or a fragment thereof with sufficient affinity such that the antibody can be used as a diagnostic agent and/or therapeutic agent targeting PTK7.

As used herein, the term "epitope" refers to a site on an antigen that is specifically bound by an immunoglobulin or antibody. An "epitope" is also referred to as an "antigenic determinant" in the art. The epitope or antigenic determinant typically consists of chemically active surface groups of a molecule, such as amino acids or carbohydrates or sugar side chains, and typically have specific three-dimensional structural features as well as specific charge features. For example, epitopes typically include at least 3, 4, 5, 6, 7, 8, 9, 10, 11, 12, 13, 14, or 15 contiguous or non-contiguous amino acids in a unique spatial conformation, which may be "linear" or "conformational". See, e.g., Epitope Mapping Protocols in Methods in Molecular Biology, Vol. 66, G. E. Morris, Ed. (1996). In a linear epitope, all sites of interaction between a protein and an interacting molecule (e.g., an antibody) exist linearly along the primary amino acid sequence of the protein. In conformational epitopes, the sites of interaction exist across amino acid residues of the protein that are separate from each other.

As used herein, the term "vector" refers to a nucleic acid carrier into which a polynucleotide may be inserted. When the vector enables expression of a protein encoded by the inserted polynucleotide, the vector is called an expression vector. The vector may be introduced into a host cell by transformation, transduction, or transfection, so that genetic material elements carried by the vector are expressed in the host cell. Vectors are well known to those skilled in the art and include, but are not limited to: plasmids; phages; Coase plasmids; artificial chromosomes such as yeast artificial chromosomes (YAC), bacterial artificial chromosomes (BAC), or P1-derived artificial chromosomes (PAC); phages such as λ phages or M13 phages and animal viruses. An animal virus that can be used as a vector includes, but is not limited to, retrovirus (including lentivirus), adenovirus, adeno-associated virus, herpesvirus (such as herpes simplex virus), poxvirus, baculovirus, papillomavirus, and papovavirus (such as SV40). A vector may include a variety of elements that control expression, including, but not limited to, a promoter sequence, a transcription initiation sequence, an enhancer sequence, a selection element, and a reporter gene. In addition, the vector may also contain a replication initiation site.

As used herein, the term "host cell" refers to cells into which a vector can be introduced, including, but not limited to, prokaryotic cells such as *Escherichia coli* or *Bacillus subtilis*, fungal cells such as yeast cells or Aspergillus, insect cells such as S2 Drosophila cells or Sf9, or animal cells such as fibroblasts, CHO cells, COS cells, NSO cells, HeLa cells, BHK cells, HEK293 cells, or human cells.

As used herein, the term "identity" is used for referring to the matching of sequences between two polypeptides or between two nucleic acids. When both positions in two sequences being compared is occupied by the same base or amino acid monomer subunit (e.g., a position in each of two DNA molecules is occupied by an adenine, or a position in each of two polypeptides is occupied by a lysine), then the molecules are identical at that position. The "percent identity" between two sequences is a function of the number of matching positions shared by the two sequences divided by the number of positions being compared×100. For example, if 6 out of 10 positions in two sequences match, then the two sequences share 60% identity. For example, the DNA sequences CTGACT and CAGGTT share 50% identity (3 out of a total of 6 positions match). Typically, a comparison is made when two sequences are aligned to produce maximum identity. Such alignments may be accomplished by using, for example, the method of Needleman et al. (1970) *J. Mol. Biol.* 48:443-453 which can be conveniently performed by a computer program such as an Align program (DNAstar, Inc.). The algorithm of E. Meyers and W. Miller (Comput. Appl Biosci., 4:11-17 (1988)), which has been integrated into the ALIGN program (version 2.0), can also be used for determining the percent identity between two amino acid sequences with a PAM120 weight residue table, a gap length penalty of 12, and a gap penalty of 4. In addition, the algorithm of Needleman and Wunsch (J Mol Biol. 48:444-453 (1970)), which has been integrated into the GAP program of GCG software package (available at www.gcg.com), can be used for determining the percent identity between two amino acid sequences with a Blossum 62 matrix or a PAM250 matrix, a gap weight of 16, 14, 12, 10, 8, 6, or 4 and a length weight of 1, 2, 3, 4, 5, or 6.

As used herein, the term "conservative substitution" means an amino acid substitution that does not adversely affect or alter the essential properties of the protein/polypeptide comprising the amino acid sequence. The conservative substitution can be introduced, for example, by standard techniques known in the art such as directed mutagenesis and PCR-mediated mutagenesis. The conservative amino acid substitution includes a substitution in which an amino acid residue is replaced with an amino acid residue having a similar side chain, such as a substitution with a residue that is physically or functionally similar (e.g., having a similar size, shape, charge, chemical properties including the ability to form covalent or hydrogen bonds, etc.) to the corresponding amino acid residue. Families of amino acid residues with similar side chains have been defined in the art. These families include amino acids having basic side chains (e.g., lysine, arginine, and histidine), acidic side chains (e.g., aspartic acid and glutamic acid), uncharged polar side chains (e.g., glycine, asparagine, glutamine, serine, threonine, tyrosine, cysteine, and tryptophan), non-polar side chains (e.g., alanine, valine, leucine, isoleucine, proline, phenylalanine, and methionine), β-branched side chains (e.g., threonine, valine, and isoleucine) and aromatic side chains (e.g., tyrosine, phenylalanine, tryptophan, and histidine). Thus, it is preferred to replace the corresponding amino acid residue with another amino acid residue from the same side chain family. Methods for identifying conservative amino acid substitutions are well known in the art (see, e.g., Brummell et al. Biochem. 32:1180-1187 (1993); Kobayashi et al. Protein Eng. 12(10):879-884 (1999); and Burks et al. Proc. Natl Acad. Set USA 94:412-417 (1997), which are incorporated herein by reference).

As used herein, the term "pharmaceutically acceptable carrier and/or excipient" refers to a carrier and/or excipient that is pharmacologically and/or physiologically compatible with the subject and the active ingredient, as is well known in the art (see, e.g., Remington's Pharmaceutical Sciences. Edited by Gennaro A R, 19th ed. Pennsylvania: Mack Publishing Company, 1995). The pharmaceutically acceptable carriers and/or excipients include, but are not limited to pH regulators, surfactants, ionic strength enhancers, diluents, osmolarity maintaining agents, absorption delay agents, preservatives, stabilizers. For example, the pH regulators include, but are not limited to, phosphate buffers. The surfactants include, but are not limited to, cationic, anionic, or nonionic surfactants, e.g., Tween-80. The ionic strength enhancers include, but are not limited to, sodium chloride. The preservatives include, but are not limited to, various anti-bacterial reagents and anti-fungal reagents, e.g., p-hydroxybenzoate, chloretone, phenol, sorbic acid, and the like. The osmolarity maintaining agents include, but are not limited to, sugar, NaCl and its analogs. The absorption delay agents include, but are not limited to, monostearate and gelatin. The diluents include, but are not limited to, water, aqueous buffers (e.g., buffered saline), alcohols and polyols (e.g., glycerol), and the like. The preservatives include, but are not limited to, various anti-bacterial reagents and anti-fungal reagents, e.g., thimerosal, 2-phenoxyethanol, p-hydroxybenzoate, chloretone, phenol, sorbic acid, and the like. The stabilizers have the meaning commonly understood by those skilled in the art, which can stabilize the desired activity of an active ingredient in a drug product and include, but not limited to, sodium glutamate, gelatin, SPGA, sugars (e.g., sorbitol, mannitol, starch, sucrose, lactose, dextran, or glucose), amino acids (e.g., glutamic acid, glycine), proteins (e.g., dried whey, albumin, or casein) or degradation products thereof (e.g., lactalbumin hydrolysate), etc.

As used herein, the term "effective amount" refers to an amount sufficient to obtain, or at least partially obtain, the desired effect. For example, a prophylactically effective amount refers to an amount sufficient for the prophylaxis, prevention, or delay of the onset of a disease; a therapeutically effective amount refers to an amount sufficient to cure, or at least partially prevent, a disease and complications thereof in a patient who is already suffering from the disease. The determination of such effective amounts is well within the competence of those skilled in the art. For example, the amount effective for therapeutic use will depend on the severity of the disease to be treated, the general state of the patient's own immune system, the general condition of the patient such as age, weight, and gender, the manner in which the drug is administered, and other treatments administered concurrently, etc.

As used herein, the term "prophylaxis" refers to a method which is carried out to prevent or delay the onset of a disease or disorder or symptom (e.g., a tumor or an infection) in a subject or to minimize its effect if it occurs. As used herein, the term "treatment" refers to a method which is carried out to obtain a beneficial or desired clinical outcome. Beneficial or desired clinical outcomes include, but are not limited to, a reduction in the rate of disease progression, an improvement or alleviation of a disease state, and an abatement or improvement in prognosis, whether detectable or non-detectable. The amount of therapeutic agent effective to relieve any particular disease symptom may vary depending on factors such as the patient's disease state, age and weight, as well as the ability of the drug to elicit a desired response in the subject. Whether a disease symptom is relieved can be assessed by any clinical measure that is typically used by a physician or other skilled healthcare provider to assess the severity or progression of that symptom.

As used herein, the terms "patient" and "subject," "individual," and "object" refer to any human or non-human animal, especially a human, undergoing prophylactic or therapeutic treatment. For example, the antibodies, methods, and compositions as described herein can be used for treating a subject suffering from cancer. The term "non-human animal" includes all vertebrates, e.g., mammals and non-mammals, e.g., non-human primates, sheep, dogs, cows, horses, cats, chickens, mice, rats, amphibians, reptiles, and the like.

As used herein, the term "$IC_{50}$ (half maximal inhibitory concentration)" refers to the half inhibitory concentration of the antagonist as measured. It is indicative of the half amount by which a drug or substance (inhibitor) inhibits some biological process (or some substances included in that process, such as an enzyme, a cell receptor or a microorganism). The $IC_{50}$ can be a measure of the sensitivity of an antibody, with the lower the $IC_{50}$, the higher the sensitivity of the antibody.

As used herein, the term "$EC_{50}$ (concentration for 50% of maximal effect)" refers to a concentration that causes 50% of the maximum effect.

As used herein, the term "antibody-drug conjugate (ADC)" is also referred to as an antibody-drug coupler, or an antibody drug conjugate. An antibody-drug conjugate is formed by linking a monoclonal antibody targeting a specific antigen with a small molecule cytotoxic drug via a linker, which combines the potent killing effect of traditional small molecule chemotherapy with the tumor-targeting properties of an antibody drug. An ADC consists of three main components: an antibody responsible for selectively recognizing the antigen on the surface of the cancer cell, a drug payload responsible for killing the cancer cell, and a linker connecting the antibody and the payload.

Beneficial Technical Effects

Experiments have shown that the main advantages of the present disclosure lie in one or more of the following aspects.

1) The antibodies capable of specifically binding to PTK7 according to the present disclosure, in particular Ab13, have superior druggabilities such as hydrophilicity and stability compared to the clinical antibody h6M24, and superior efficacy can be obtained when coupled to an equivalent drug.

2) The antibody-drug conjugates according to the present disclosure have higher drug loading, better homogeneity and higher stability compared to the clinical molecule h6M24-vc0101.

3) The antibody-drug conjugates according to the present disclosure, in particular the plurality of antibody-drug conjugates comprising Ab13, all have improved druggabilities such as anti-tumor biological activity and safety over the control drug, have better buffer and plasma stability in vitro, and have better drug-metabolizing properties in vivo, including longer half-life, lower free small molecule toxins and the like.

BRIEF DESCRIPTION OF THE DRAWINGS

The accompanying drawings are used for providing an understanding of the technical solutions of the present disclosure and form a part of the specification, which are used in conjunction with examples of the present disclosure to explain the technical solutions of the present disclosure and do not constitute a limitation of the technical solutions of the present disclosure.

SEQUENCE INFORMATION

Figure 1:
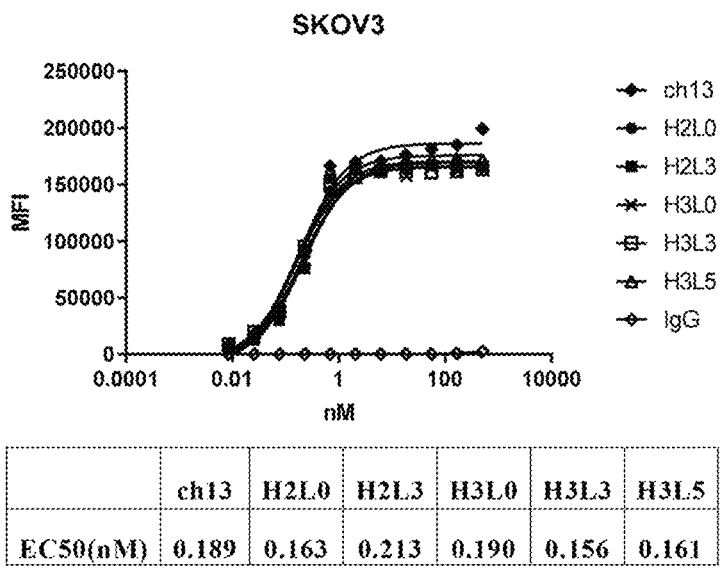
FIG. 1 shows affinity assay data for anti-PTK7 antibodies ch13, Hu13H2L0, Hu13H2L3, Hu13H3L0, Hu13H3L3, and Hu13H3L5 as prepared in Example 2 of the present disclosure in the SK-OV-3 cell line by flow cytometry.

Information about some of the sequences encompassed by the present disclosure is shown in Table 1 below.

TABLE 1

Information about some of the sequences

| SEQ ID NO: | Sequence Description | | Sequence Information |
|---|---|---|---|
| 1 | Kabat | VH CDR1 | DYGMH |
| 2 | numbering | VH CDR2 | VISPYYGDVNYNQKFQG |
| 3 | rule | VH CDR3 | GMGY |
| 4 | | VL CDR1 | RASQSISKYLA |
| 5 | | VL CDR2 | SGSTLQS |
| 6 | | VL CDR3 | QQHNEYPWT |
| 7 | Chothia | VH CDR1 | GYTFTDY |
| 8 | numbering | VH CDR2 | SPYYGD |
| 9 | rule | VH CDR3 | MG |
| 10 | | VL CDR1 | RASQSISKYLA |
| 11 | | VL CDR2 | SGSTLQS |
| 12 | | VL CDR3 | QQHNEYPWT |
| 13 | IMGT | VH CDR1 | GYTFTDYG |
| 14 | numbering | VH CDR2 | ISPYYGDV |
| 15 | rule | VH CDR3 | ARGMGY |
| 16 | | VL CDR1 | QSISKY |
| 17 | | VL CDR2 | SGS |
| 18 | | VL CDR3 | QQHNEYPWT |
| 19 | ch13 VL | | DVQITQSPSYLAASPGETITINCRASQSISKYLAWYQEKPGKTNKLLIYSGSTLQSGIPSRFSGSGSGTDFTLTISSLEPEDFAMYYCQQHNEYPWTFGGGTKLEIK |
| 20 | ch13 VH | | QVQLQQSGAELVRPGVSVKISCKGSGYTFTDYGMHWLKQSHAKSLEWIGVISPYYGDVTYNQKFKGKATMTVDKSSSTAYMELARLTSEDSAIYYCARGMGYWGQGTSVTVSS |
| 21 | H2 | | QVQLVQSGAEVKKPGASVKVSCKGSGYTFTDYGMHWLRQAPGQGLEWMGVISPYYGDVNYNQKFQGRVTMTRDKSISTAYMELSRLRSDDTVVYYCARGMGYWGQGTLVTVSS |
| 22 | H3 | | QVQLVQSGAEVKKPGASVKISCKGSGYTFTDYGMHWLKQAPGQGLEWIGVISPYYGDVNYNQKFQGRATMTVDKSISTAYMELSRLRSDDTAVYYCARGMGYWGQGTLVTVSS |
| 23 | L0 | | DIQLTQSPSFLSASVGDRVTITCRASQSISKYLAWYQQKPGKAPKLLIYSGSTLQSGVPSRFSGSGSGTEFTLTISSLQPEDFATYYCQQHNEYPWTFGQGTKVEIK |
| 24 | L3 | | DVQITQSPSFLSASVGDRVTITCRASQSISKYLAWYQQKPGKAPKLLIYSGSTLQSGVPSRFSGSGSGTEFTLTISSLQPEDFAMYYCQQHNEYPWTFGQGTKVEIK |

TABLE 1-continued

Information about some of the sequences

| SEQ ID NO: | Sequence Description | Sequence Information |
|---|---|---|
| 25 | L5 | DVQITQSPSYLSASPGDRITITCRASQSISKYLAWYQ QKPGKANKLLIYSGSTLQSGVPSRFSGSGSGTEFTL TISSLQPEDFAMYYCQQHNEYPWTFGQGTKVEIK |
| 26 | h6M24 heavy chain | QVQLVQSGPEVKKPGASVKVSCKASGYTFTDYAVH WVRQAPGKRLEWIGVISTYNDYTYNNQDFKGRVT MTRDTSASTAYMELSRLRSEDTAVYYCARGNSYFY ALDYWGQGTSVTVSSASTKGPSVFPLAPSSKSTSGG TAALGCLVKDYFPEPVTVSWNSGALTSGVHTFPAV LQSSGLYSLSSVVTVPSSSLGTQTYICNVNHKPSNTK VDKKVEPKSCDKTHTCPPCPAPELLGGPSVFLFPPK PKDTLMISRTPEVTCVVVDVSHEDPEVKFNWYVDG VEVHNAKTKPREEQYNSTYRVVSVLTVLHQDWLN GKEYKCKVSNKALPAPIEKTISKAKGQPREPQVYT LPPSRDELTKNQVSLTCLVKGFYPSDIAVEWESNGQ PENNYKTTPPVLDSDGSFFLYSKLTVDKSRWQQGN VFSCSVMHEALHNHYTQKSLSLSPG |
| 27 | h6M24 light chain | EIVLTQSPATLSLSPGERATLSCRASESVDSYGKSFM HWYQQKPGQAPRLLIYRASNLESGIPARFSGSGSGT DFTLTISSLEPEDFAVYYCQQSNEDPWTFGGGTKLE IKRTVAAPSVFIFPPSDEQLKSGTASVVCLLNNFYPR EAKVQWKVDNALQSGNSQESVTEQDSKDSTYSLSS TLTLSKADYEKHKVYACEVTHQGLSSPVTKSFNRG EC |

The CDR region sequences in Table 1 above are defined using the Chothia, Kabat, and IMGT numbering systems, respectively, and any other CDR region sequence determination methodology known in the art can also be used to identify amino acid residues in the CDR region within the variable region.

DETAILED DESCRIPTION

Example 1: Synthesis of Toxin Linkers

I). Synthesis of Compound L-D-6

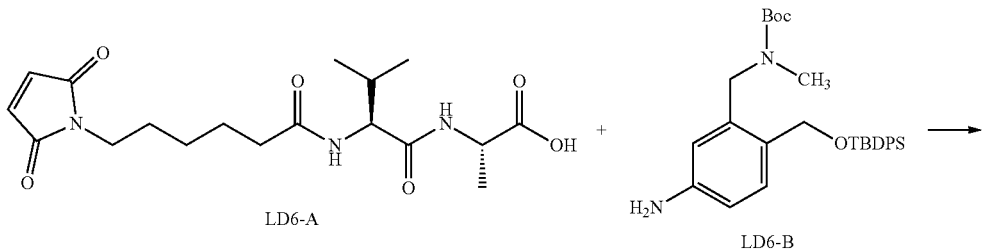

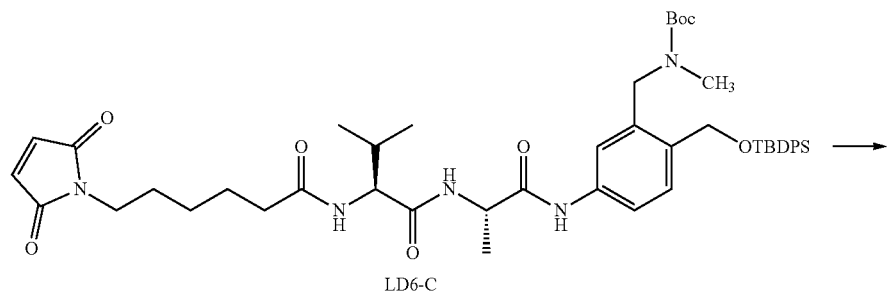

-continued
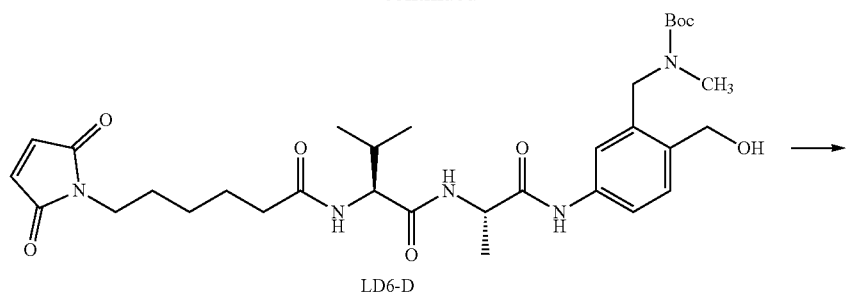
LD6-D
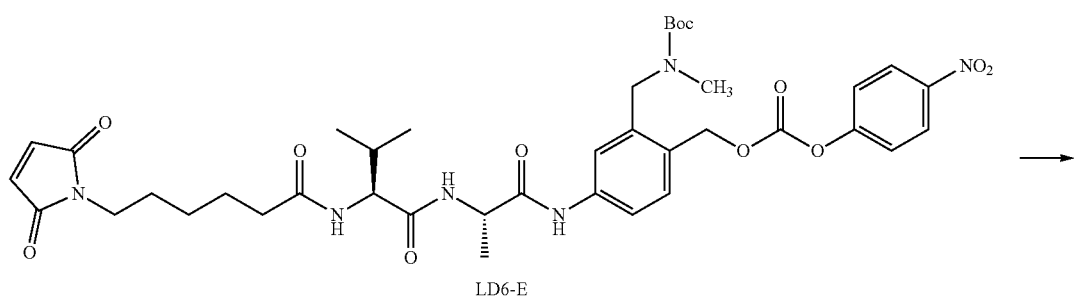
LD6-E
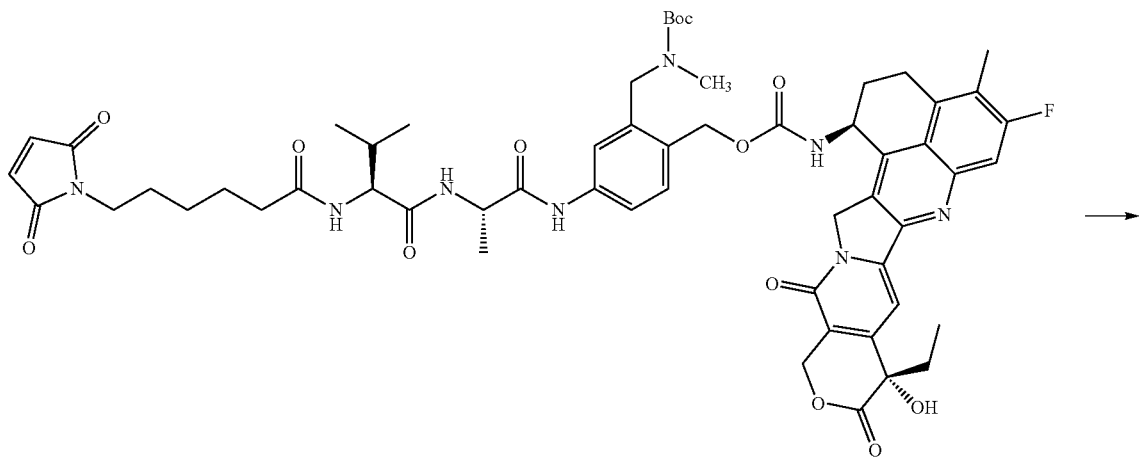
LD6-F
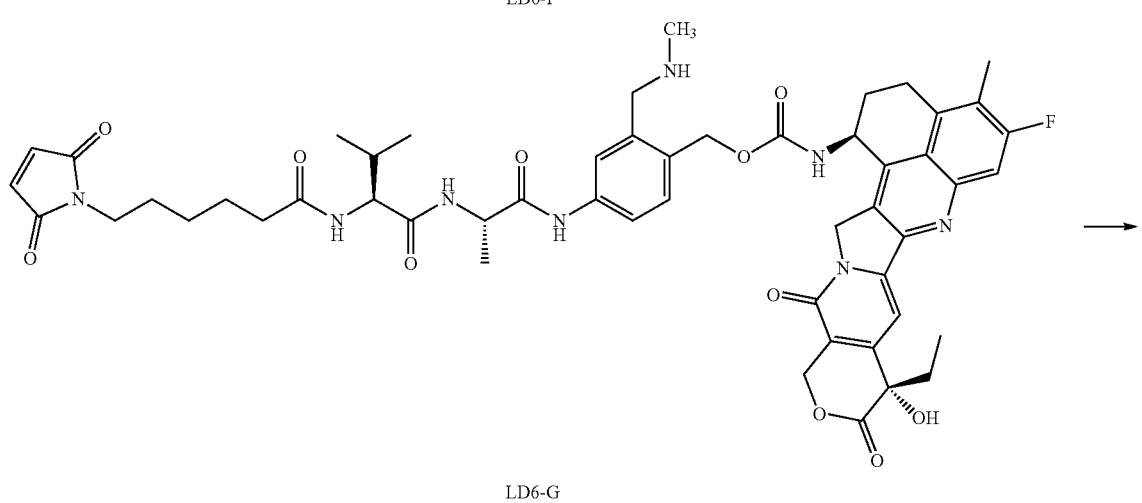
LD6-G

-continued

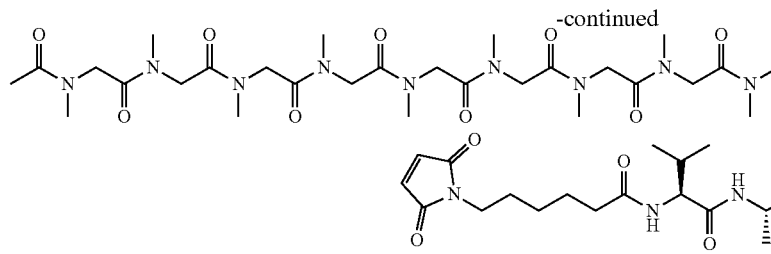 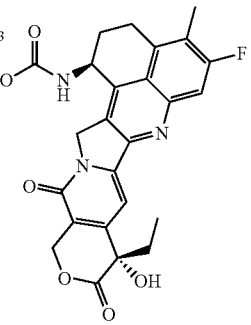

L-D-6

1. Synthesis of Intermediate L-136-C

Intermediates LD6-A (Mc-Val-Ala-OH, purchased from Shanghai Haoyuan Chemexpress Co. Ltd., 2.4 g, 6.29 mmol) and LD6-B (3.18 g, 6.29 mmol) were dissolved in a solvent mixture of dichloromethane and methanol (v:v=2:1, 90 mL). EEDQ (2-Ethoxy-1-ethoxycarbonyl-1,2-dihydroquinoline, 1.86 g, 7.55 mmol) was added at room temperature. The reaction solution was stirred at room temperature for 24 h. The reaction solution was evaporated under reduced pressure and LD6-C (3.9 g, 71% yield) was obtained by column chromatography. LC-MS (ESI, m/z) Calculated: 867.46, Found: 868.49 (M+H).

2. Synthesis of Intermediate LD6-D

The intermediate LD6-C (2 g, 2.3 mmol) was dissolved in 50 ml of anhydrous tetrahydrofuran and cooled in an ice bath under argon atmosphere. Hydrogen fluoride-pyridine complex (4.6 g, 46 mmol) was added, and the reaction solution was stirred for 2 h at 0° C. The reaction was quenched by the addition of water and extracted with dichloromethane. The organic layer was separated and dried with anhydrous sodium sulfate, and the intermediate LD6-D (1.1 g, 76% yield) was obtained by column chromatography. LC-MS (ESI, m/z) Calculated: 629.34, Found: 630.31 (M+H).

3. Synthesis of Intermediate LD6-E

The intermediate LD6-D (700 mg, 1.11 mmol) was dissolved in 4 ml of anhydrous DMF, and DIPEA (0.39 ml, 2.23 mmol) and bis(4-nitrophenyl) carbonate (406 mg, 1.33 mmol) were added respectively at room temperature. The reaction was stirred at room temperature under argon overnight. The solvent was evaporated under reduced pressure, then methyl tert-butyl ether was added and stirred until the solid precipitated. The mixture was filtered, the solid was washed with diethyl ether for multiple times and dried to obtain the intermediate LD6-E, which was directly used in the next step reaction. LC-MS (ESI, m/z) Calculated: 794.35, Found: 795.41 (M+H).

4. Synthesis of Intermediate LD6-F

The intermediate LD6-E (300 mg, 0.44 mmol) was dissolved in 400 μL of anhydrous DMF, 100 μL of anhydrous pyridine was added, followed by exatecan methanesulfonate (purchased from Shanghai Haoyuan Chemexpress Co. Ltd., 234 mg, 0.44 mmol) and HOBt (60 mg, 0.44 mmol). The reaction solution was stirred under argon at room temperature overnight and purified by reversed-phase HPLC to obtain the intermediate LD6-F (230 mg, 48% yield). LC-MS (ESI, m/z) Calculated: 1090.48, Found: 1091.53 (M+H).

5. Synthesis of Intermediate LD6-G

The intermediate LD6-F (200 mg, 0.183 mmol) was dissolved in 1 mL of anhydrous dichloromethane, 300 μL of trifluoroacetic acid was added in an ice bath and then returned to room temperature and stirred for 30 min. The solvent was removed under reduced pressure and the final product was obtained as the trifluoroacetate salt of the intermediate LD6-G, which was directly used in the next step reaction without further purification. LC-MS (ESI, m/z) Calculated: 990.43, Found: 991.47 (M+H).

6. Synthesis of Compound (L-D-6)

The compound LD6-G (120 mg, 0.109 mmol) was dissolved in 1 mL of anhydrous DMF, acetylated-10 polysarcosine (Ac-Sar10-COOH, 84 mg, 0.109 mmol), HATU (50 mg, 0.130 mmol), and DIPEA (38 μL, 0.22 mmol) were added, respectively, and then stirred at room temperature overnight. The solvent was removed under reduced pressure to obtain the final product, which was purified by reversed-phase HPLC to obtain the compound (L-D-6) (74 mg, 38% yield). LC-MS (ESI, m/z) Calculated: 1742.81, Found: 1743.85 (M+H).

II). Synthesis of Compound L-D-8

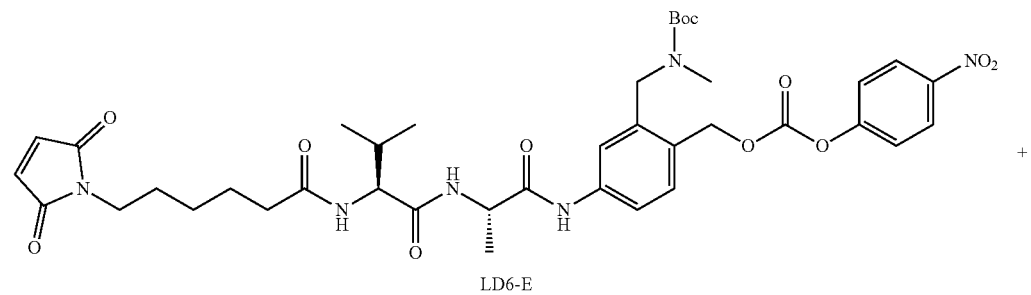

LD6-E

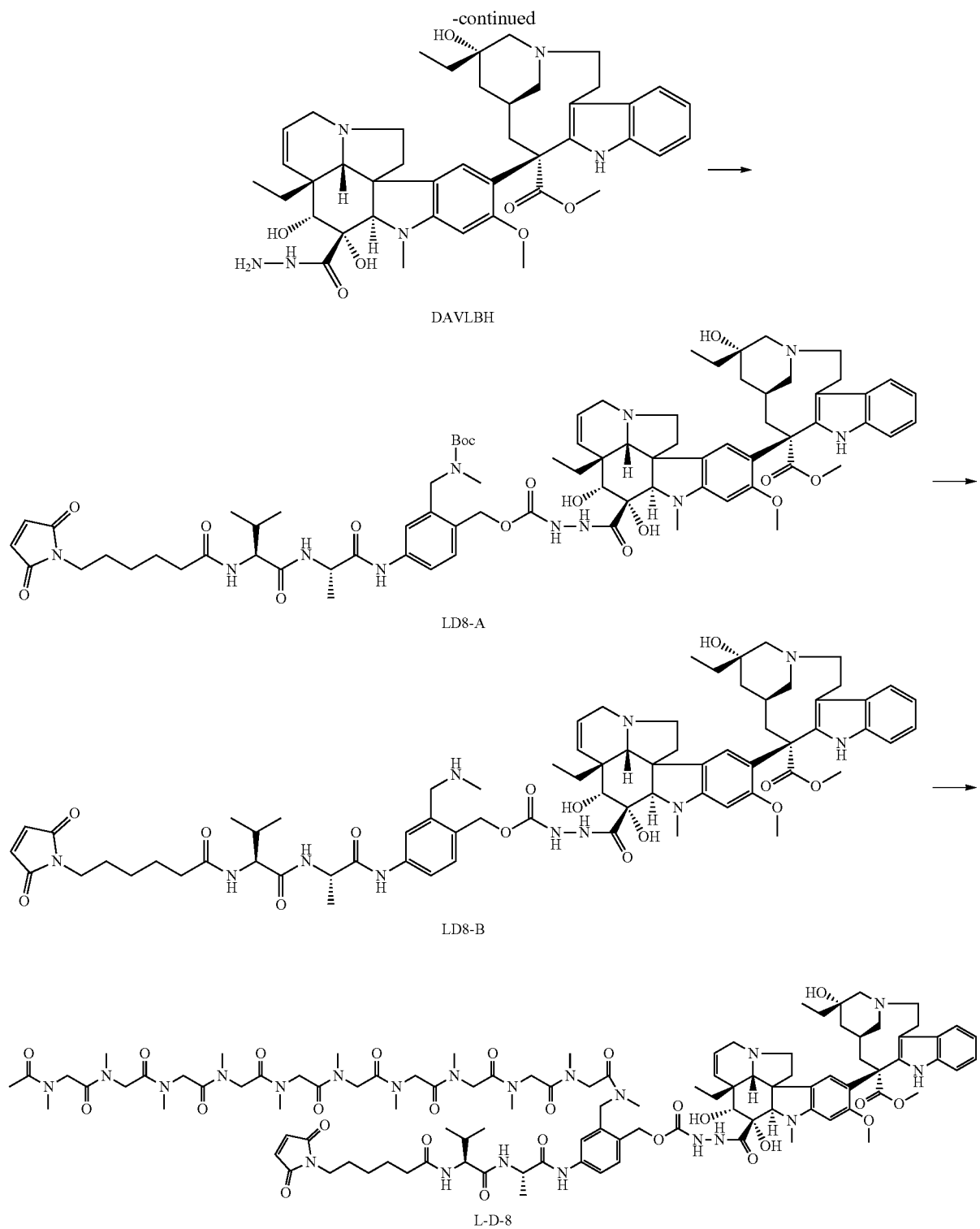
The synthesis of compound L-D-8 was carried out in the same synthesis steps and conditions as that of the compound L-D-6, except that the raw material compound exatecan methanesulfonate in step 4 was replaced by DAVLBH (deacetylvinblastine hydrazide, purchased from Shanghai Haoyuan Chemexpress Co. Ltd.). LC-MS (ESI, m/z) Calculated. 2076.07, Found: 2077.65 (M+H).

III). Synthesis of Compound L-D-9
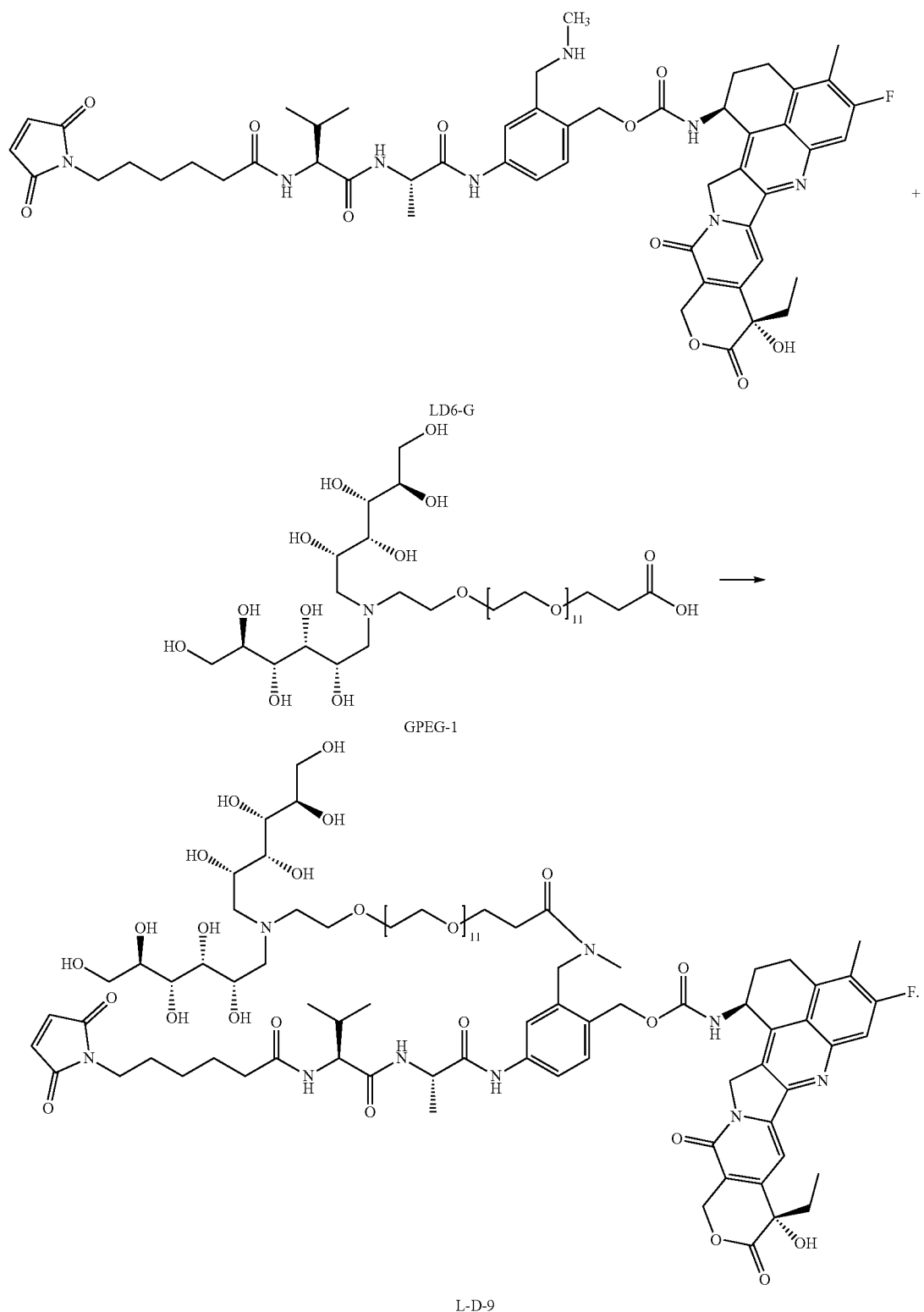
The synthesis of compound L-D-9 was carried out in the same synthesis steps and conditions as that of the compoutn L-D-6, except that the raw material acetylated-10 polysarcosine in the last step was replaced with GPEG-1 (synthesized with reference to the relevant method in documents CN107109405A and CN110214141A). LC-MS (ESI, m/z) Calculated: 1903.90, Found: 1904.73 (M+H).

IV). Synthesis of Compounds L-D3-1, L-D-2, L-D-3, L-D-4, L-D-5, L-D-7, and L-D-10

With reference to the synthesis method of the compound L-D-6, compounds L-D-1, L-D-2, L-D-3, L-D-4, L-D-5, L-D-7, and L-D-10 were synthesized, and their structural formulas are as follows:

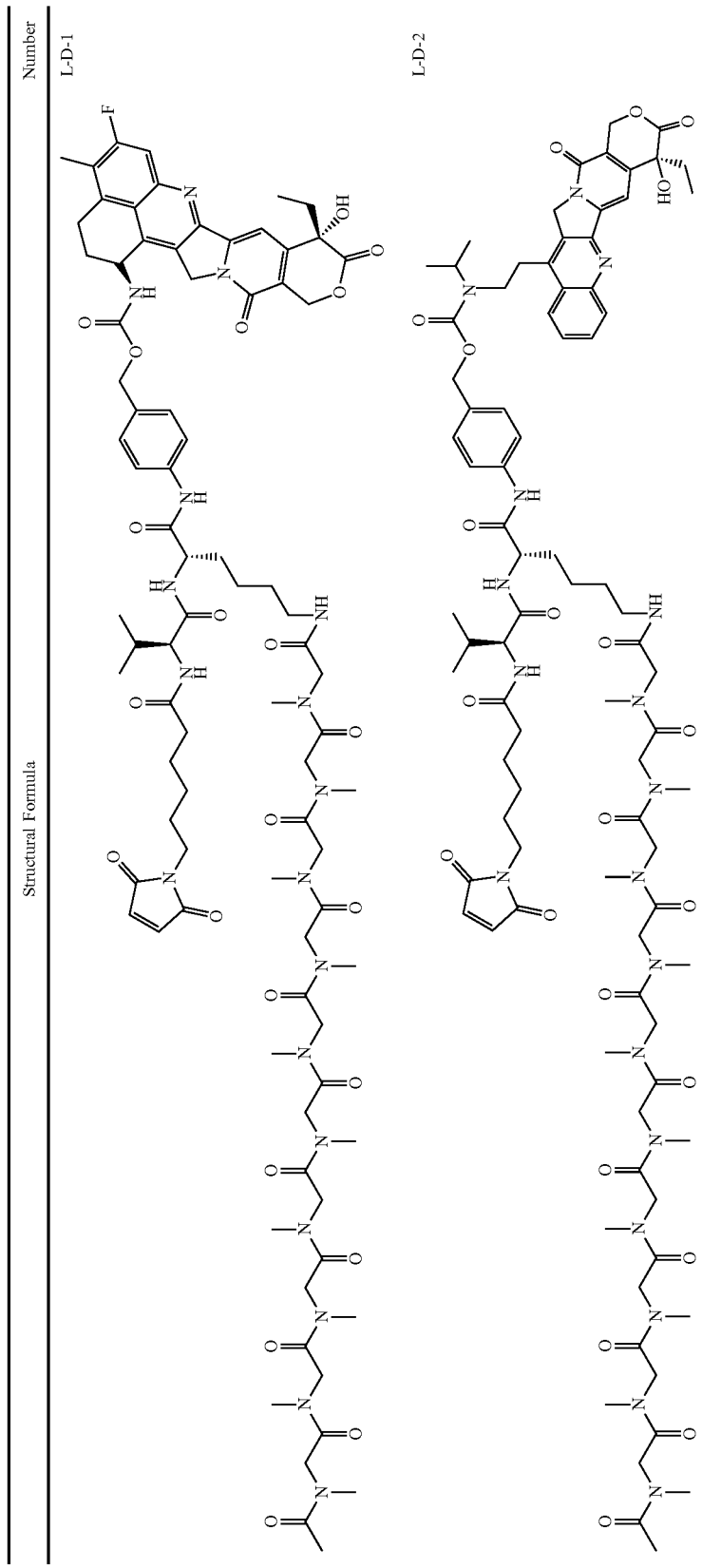

| Number | Structural Formula |
|---|---|
| L-D-3 | 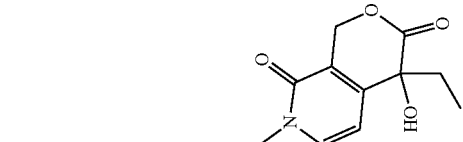 |
| L-D-4 | 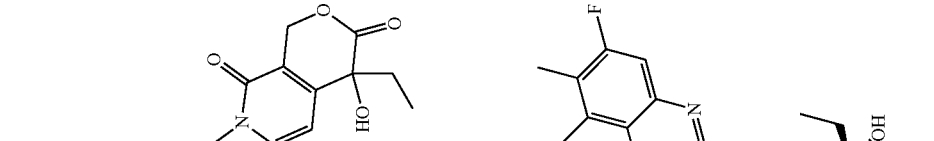 |

| Number | Structural Formula |
|---|---|
| L-D-5 | 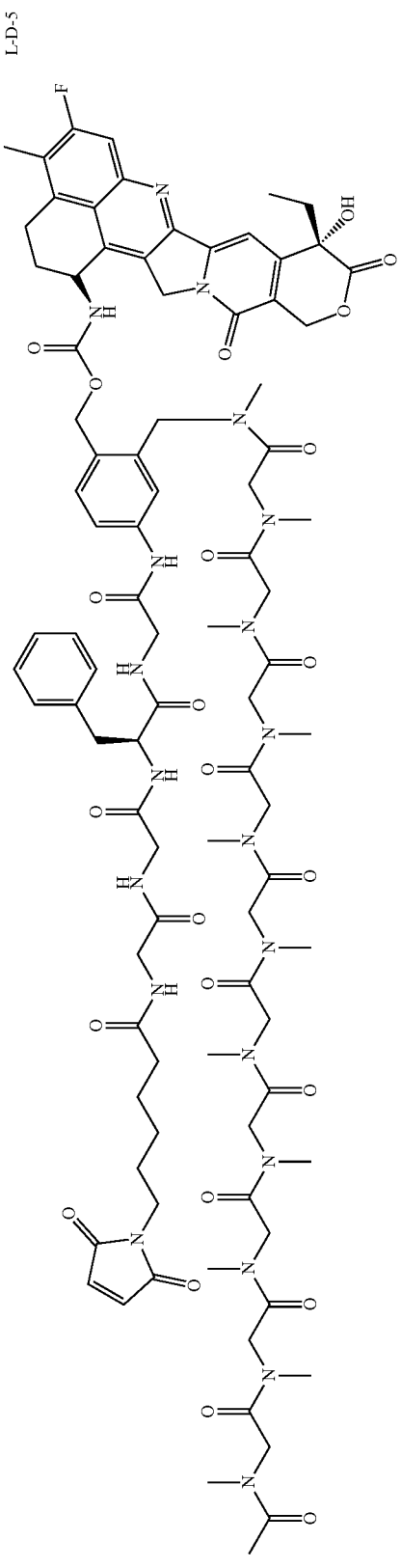 |
| L-D-7 | 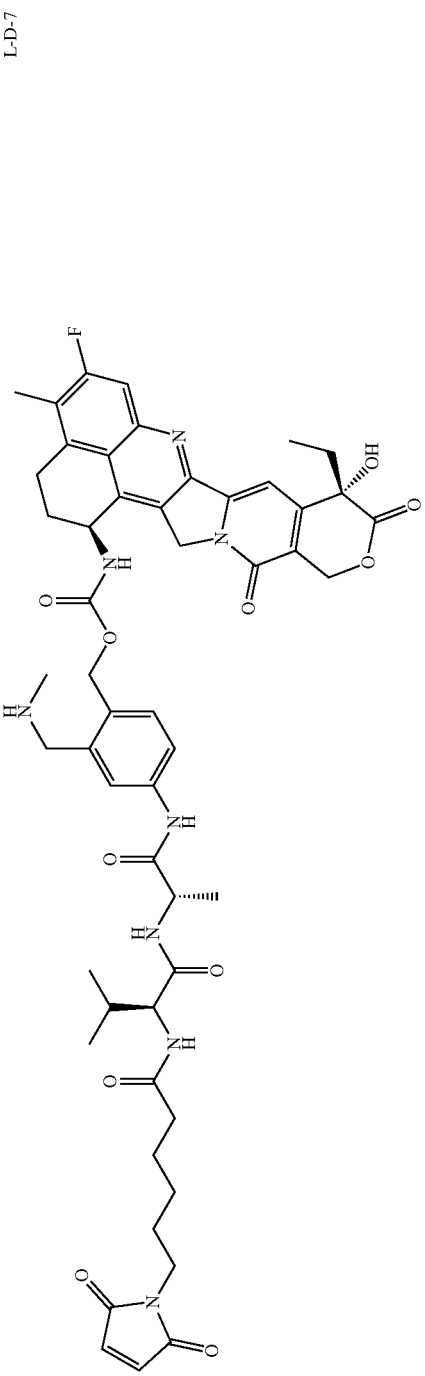 |

| Structural Formula | Number |
|---|---|
| 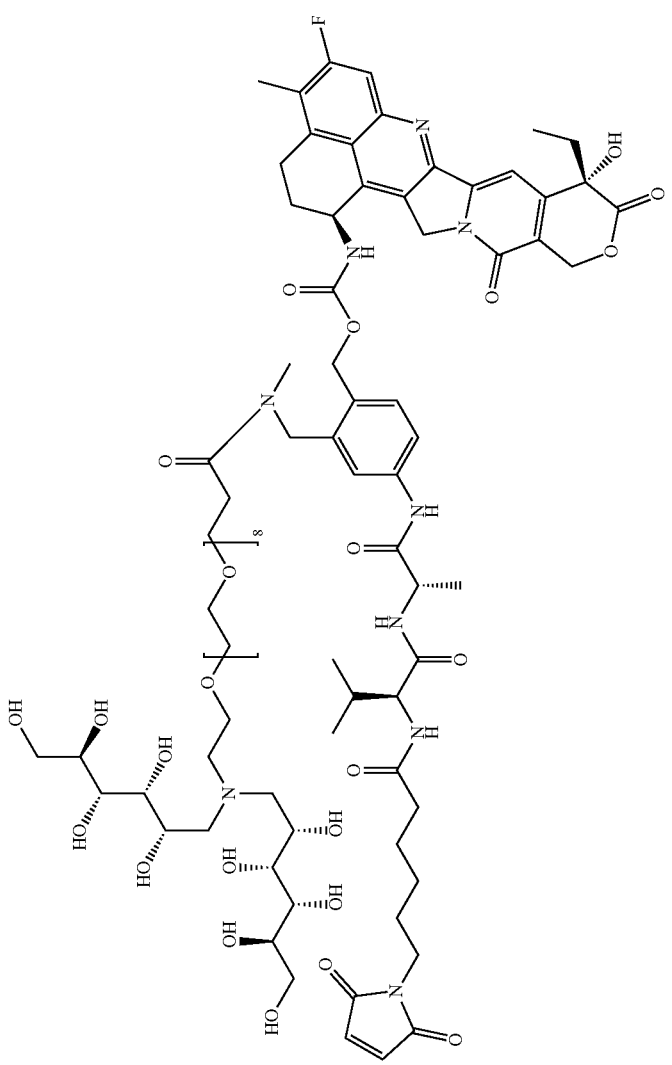 | L-D-10 |

Example 2 Preparation of Anti-PTK7 Monoclonal Antibody

Balb/c mice (8-12 weeks old) were immunized using an extracellular region fragment antigen of human PTK7 protein (NCBI reference sequence: NM_002821.5, amino acid sequence of positions 31-704) and monitored for serum potency to determine the number of immunizations. The initial immunization was followed by 3 to 4 booster immunizations, mouse serum was taken and tested for titer according to methods routinely used in the art. After one rush immunization of mice that passed the titer test, the whole spleen and ½ of lymph nodes were taken and fused with myeloma SP2/0 cell lines by PEG. The fused cells were plated and cultured, and the supernatant of all wells was collected and screened for antigens using ELISA method. The positive wells with cells by microscopic examination were transferred to a 96-well plate for further culture. After 7 days of growth, supernatants of all wells were collected and tested for reaction with antigen using ELISA method. Positive wells were further tested for antigen binding at different dilutions for affinity ranking. The 20 parental clones with the highest immunogen affinity were subjected into subcloning. Subcloning was performed by limited dilution method and ELISA screening to obtain a hybridoma cell line. The hybridoma cell line was subjected to mouse ascites preparation, collected and purified to obtain murine-derived PTK7 monoclonal antibodies.

The sequence information of the murine-derived PTK7 monoclonal antibodies are as follows:
the amino acid sequences of CDR1-3 of the heavy chain variable region are as set forth in SEQ ID NOs: 1-3; and the amino acid sequences of CDR1-3 in the light chain variable region are as set forth in SEQ ID NOs: 4-6; or
the amino acid sequences of CDR1-3 of the heavy chain variable region are as set forth in SEQ ID NOs: 7-9; and the amino acid sequences of CDR1-3 of the light chain variable region are as set forth in SEQ ID NOs: 10-12; or
the amino acid sequences of CDR1-3 of the heavy chain variable region are as set forth in SEQ ID NOs: 13-15; and the amino acid sequences of CDR1-3 of the light chain variable region are as set forth in SEQ ID NOs: 16-18.

The above CDR region sequences are defined using the Chothia, Kabat, and IMGT numbering systems, respectively, and any other CDR region sequence determination methodology well-known in the art can also be used for identifying amino acid residues in the CDR region within the variable region.

Based on the CDR of the murine-derived PTK7 monoclonal antibody, the hybridoma sequence was humanized to obtain the human-murine chimeric PTK7 antibody (abbreviated as "ch13") as well as the humanized PTK7 antibodies (abbreviated as "Hu13") H2L0, H2L3, H3L0 (abbreviated as "Ab13"), H3L3 and H3L5. Among which, L0, L3 and L5 denote the numbers of the antibody light chain variable region sequences, and H2 and H3 denote the numbers of the antibody heavy chain variable region sequences, that is, the H2L0 antibody includes a light chain variable region numbered L0 and a heavy chain variable region numbered H2; the H2L3 antibody includes a light chain variable region numbered L3 and a heavy chain variable region numbered H2; the H3L0 antibody includes a light chain variable region numbered L0 and a heavy chain variable region numbered H3; the H3L3 antibody includes a light chain variable region numbered L3 and a heavy chain variable region numbered H3; and the H3L5 antibody includes a light chain variable region numbered L5 and a heavy chain variable region numbered H3.

The amino acid sequences of the heavy and light chain variable regions of the above chimeric PTK7 antibody as well as humanized PTK7 antibodies are shown in Table 2.

TABLE 2

Amino acid sequences of the heavy and light chain variable regions of the chimeric PTK7 antibody and the humanized PTK7 antibodies.

| Name | Heavy Chain Variable Region | Light Chain Variable Region |
| --- | --- | --- |
| ch13 | SEQ ID NO: 20 | SEQ ID NO: 19 |
| Hu13H2L0 | SEQ ID NO: 21 | SEQ ID NO: 23 |
| Hu13H2L3 | SEQ ID NO: 21 | SEQ ID NO: 24 |
| Hu13H3L0 (Ab13) | SEQ ID NO: 22 | SEQ ID NO: 23 |
| Hu13H3L3 | SEQ ID NO: 22 | SEQ ID NO: 24 |
| Hu13H3L5 | SEQ ID NO: 22 | SEQ ID NO: 25 |

Preparation of Human-Murine Chimeric Antibody

The sequences of ch13 heavy chain and light chain variable regions (see SEQ ID NO: 19 and SEQ ID NO: 20) were cloned into a vector containing a human IgG1 heavy chain constant region and a Kappa chain constant region by gene recombinant technology. After being sequenced as correct, the chimeric antibody as constructed was expressed with a transfection technology and a mammalian expression system (FreeStyle™ 293T cells), and then purified. The human-murine chimeric antibody as obtained was named ch13, and the sequences of its heavy chain and light chain variable regions are shown in Table 2. The positive control antibody h6M24 was prepared in the same way, and the antibody sequence thereof can be referred to SEQ ID NO. 25 and SEQ ID NO. 39 in U.S. Pat. No. 9,777,070. The full-length sequences of the heavy chain and the light chain of h6M24 (amino acid sequences as shown in SEQ ID NOs: 26 and 27) were respectively used for constructing a pCDNA3.1 expression vector. The antibody was obtained from the culture and expression of 293F suspension cells and purified by a proteinA/G gravity column.

Preparation of Humanized Antibodies

The humanized template with the best alignment with the non-CDR region of ch13 was searched and selected in the Germline database. Then, the CDR region of the antibody was grafted onto the selected humanized template to replace the CDR region of the humanized template, and then recombined with the constant region of IgG1. Meanwhile, on the basis of the three-dimensional structure of the murine-derived antibody, the embedded residues, the residues with direct interaction with the CDR region and the residues important for the conformation of VL and VH were subjected to back mutation.

The designed sequences of humanized variable region were cloned into a vector containing a human IgG1 heavy chain constant region and a Kappa chain constant region by gene recombinant technology. After being sequenced as correct, the humanized antibodies as constructed were expressed with the transfection technology and the mammalian expression system (FreeStyle™ 293 cells), and then purified. Finally, 5 humanized antibodies were obtained, Hu13H2L0, Hu13H2L3, Hu13H3L0 (Ab13), Hu13H3L3, and Hu13H3L5, respectively and the sequences of their heavy chain and light chain variable regions are shown in Table 2.

Example 3 Affinity Assay of Anti-PTK7 Antibodies in SK-OV-3 Cell Line by Flow Cytometry SK-OV-3 (human ovarian cancer cells, ATCC, Catalog No. HTB-77) was digested with trypsin in a culture dish, and the digested cells were centrifuged at 1000 rpm for 5 min and then blocked with 10% goat serum (purchased from Beijing Solarbio Science & Technology Co. Ltd., Item No. SL038) for 30 min. The anti-PTK7 antibodies as prepared in Example 2 of the present disclosure were diluted in a 3-fold gradient with a starting concentration of 500 nM. At the end of dilution, the gradient diluted anti-PTK7 antibodies were added to the cells, incubated for 1 h, and washed twice with PBS. Then, FITC-labeled goat anti-human secondary antibody (purchased from Jackson ImmunoResarch, Item No. 109-545-008) was added at 1:500, incubated for 1 h, and finally washed twice with PBS. The results were analyzed by flow cytometry.

FIG. 1 shows affinity assay data for anti-PTK7 antibodies ch13, Hu13H2L0, Hu13H2L3, Hu13H3L0 (Ab13), Hu13H3L3, and Hu13H3L5 as prepared in Example 2 of the present disclosure in the SK-OV-3 cell line by flow cytometry. The results show that all of the anti-PTK7 antibody molecules as prepared in Example 2 of the present disclosure bind specifically to the SK-OV-3 cell line with similar binding affinities.

Example 4 Relative Binding Activity of Anti-PTK7 Antibody to Human PTK7, Monkey PTK7, and Murine PTK7 Determined by ELISA Assay Human PTK7 protein (Catalog No. PT7-H52H3, Acrobiosystems), monkey PTK7 protein (Catalog No. PT7-C52H3, Acrobiosystems), and murine PTK7 protein (Catalog No. PT7-M52H3, Acrobiosystems) were incubated at 4° C. overnight and immobilized onto a 96-well plate. The plate was then blocked by incubating at 37° C. with 1% BSA in PBS for 1 h. After blocking, the plate was washed 3 times with PBST (PBS containing 0.05% Tween 20). Serial dilutions of anti-PTK7 antibody as prepared in Example 2 of the present disclosure was prepared in a binding buffer (PBS containing 0.05% Tween20 and 0.5% BSA) and incubated with the immobilized proteins at 37° C. for 1 h. After binding, the plate was washed 3 times with PBST, incubated with peroxidase-labeled donkey anti-human IgG (Jackson ImmunoResearch) diluted at 1/15,000 in the binding buffer at 37° C. for 1 h, washed again, developed with TMB and terminated with 1M $H_2SO_4$. The absorbance at 450 nm-620 nm was measured.

Figure 2:
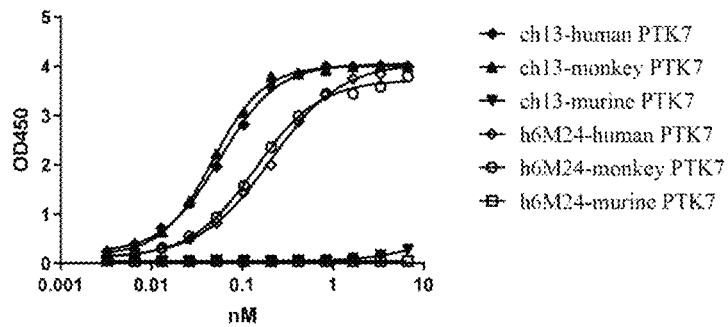
FIG. 2 shows $EC_{50}$ and representative binding curves for anti-PTK7 antibody ch13 as prepared in Example 2 of the present disclosure and h6M24 antibody (positive control antibody) binding to human PTK7, murine PTK7 and monkey PTK7.

FIG. 2 shows $EC_{50}$ and representative binding curves for anti-PTK7 antibody ch13 as prepared in Example 2 of the present disclosure and h6M24 antibody (positive control antibody) binding to human PTK7 and monkey PTK7, which indicate that ch13 and h6M24 specifically bind to the human and monkey PTK7 proteins and that the affinity of the ch13 antibody is significantly superior over that of h6M24 (positive control antibody). Also, neither ch13 nor h6M24 antibodies cross-react with mouse PTK7.

Example 5 Preparation of Antibody-Drug Conjugates Ab13-T1000-Exatecan and h6M24-T1000-Exatecan 500 mM potassium dihydrogen phosphate-dipotassium hydrogen phosphate ($KH_2PO_4$— $K_2HPO_4$)/20 mM ethylenediaminetetraacetic acid (EDTA) buffer and deionized water were added to a stock solution of the anti-PTK7 antibody Ab13 as prepared in Example 2 of the present disclosure or the positive control antibody h6M24, and the pH of the system was adjusted to 7.0. Meanwhile, it was ensured that the phosphate concentration of the solution was at 50 mM and the concentration of ethylenediaminetetraacetic acid was at 2 mM. 7.0 times molar excess of tris(2-carboxyethyl)phosphine hydrochloride (TCEP) was added, and the reaction solution was stirred at 37° C. for 2 h. The above reaction solution was placed in an ice water bath and cooled for 10 min, and then 10 mM of T1000-exatecan compound pre-dissolved in dimethylacetamide (DMA) was slowly added dropwise at a molar ratio of T1000-exatecan (i.e., the compound L-D-6 as prepared in Example 1) to the antibody of 14. It was ensured that the volume of the organic solvent in the total reaction solution accounted for 10%, and the coupling reaction was stirred at room temperature for 1 h.

At the end of the reaction, the coupling reaction mixture was immediately desalted and exchanged with histidine-acetic acid/NaCl buffer using a desalting column.

Activated charcoal powder (30 mg of powder per ml of liquid) was then added to the collection solution, which was suspended for 2 h at room temperature, centrifuged, and sterilized using a 0.22 μm filter membrane, and the activated charcoal particles were removed at the same time. The resulting product was calculated by UV for its concentration and DAR value, detected by hydrophobic chromatography (HIC) for product homogeneity, and detected by size exclusion chromatography (SEC) for the degree of aggregation. The products were placed in a refrigerator at −80° C. for cryopreservation.

The structural formula of the prepared antibody-drug conjugates Ab13-T1000-exatecan and h6M24-T1000-exatecan is shown in C-6, wherein m represents the DAR value, which is about 8; and Ab represents the antibody, which is the anti-PTK7 antibody Ab13 or the positive control antibody h6M24.

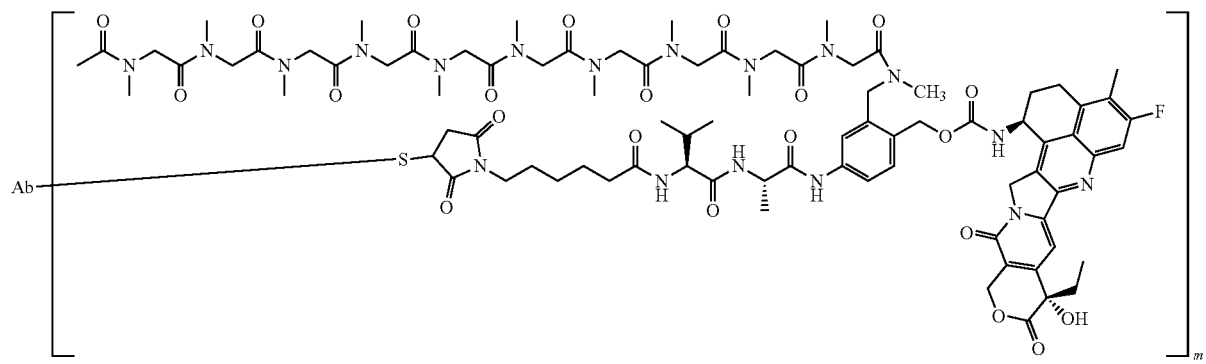

C-6

Figure 3:
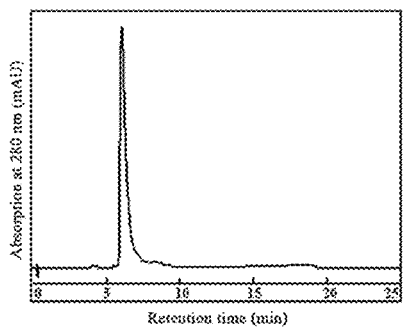
FIG. 3 shows a hydrophobic chromatography (HIC) chromatogram of Ab13-T1000-exatecan as prepared in Example 5 of the present disclosure.
Figure 4:
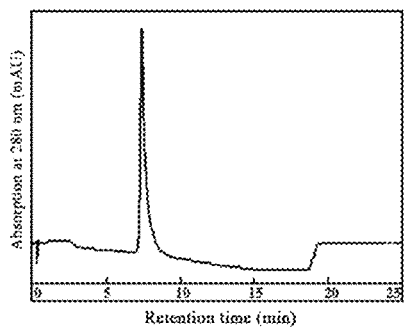
FIG. 4 shows a hydrophobic chromatography (HIC) chromatogram of h6M24-T1000-exatecan as prepared in Example 5 of the present disclosure.

The DAR values obtained by UV detection and calculation were 7.91 for the Ab13-T1000-exatecan product and 8.11 for the h6M24-T1000-exatecan product. FIG. 3 and FIG. 4 show the hydrophobic chromatography chromatograms of Ab13-T1000-exatecan and h6M24-T1000-exatecan, respectively, where a single peak indicates the product obtained by coupling with this method with high homogeneity and the main component being the DAR8.

Figure 5:
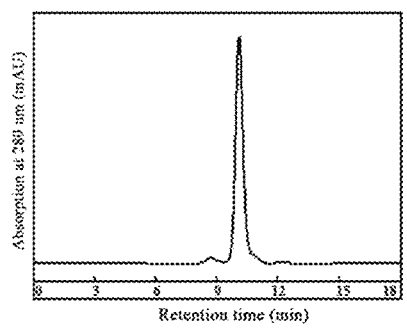
FIG. 5 shows a size exclusion (SEC) chromatogram of Ab13-T1000-exatecan as prepared in Example 5 of the present disclosure.
Figure 6:
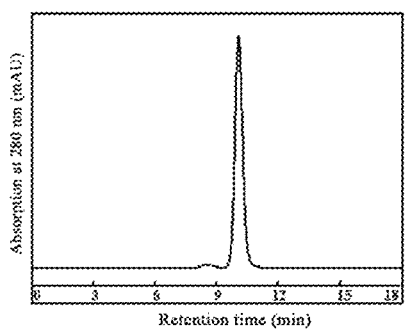
FIG. 6 shows a size exclusion (SEC) chromatogram of h6M24-T1000-exatecan as prepared in Example 5 of the present disclosure.

FIG. 5 and FIG. 6 show size exclusion chromatograms of Ab13-T1000-exatecan and h6M24-T1000-exatecan, where the percentage of aggregates of Ab13-T1000-exatecan and h6M24-T1000-exatecan were 3.26% and 1.79%, respectively, based on integral analysis.

Example 6 Preparation of Antibody-Drug Conjugate Ab13-T800-Exatecan 500 mM potassium dihydrogen phosphate-dipotassium hydrogen phosphate ($KH_2PO_4$— $K_2HPO_4$)/20 mM ethylenediaminetetraacetic acid (EDTA) buffer and deionized water were added to a stock solution of the anti-PTK7 antibody Ab13 as prepared in Example 2 of the present disclosure, and the pH of the system was adjusted to 7.0. Meanwhile, it was ensured that the phosphate concentration of the solution was at 50 mM and the concentration of ethylenediaminetetraacetic acid was at 2 mM. 7.0 times molar excess of tris(2-carboxyethyl)phosphine hydrochloride (TCEP) was added, and the reaction solution was stirred at 37° C. for 2 h. The above reaction solution was placed in an ice water bath and cooled for 10 min, and then 10 mM of T800-exatecan (i.e., the compound L-D-7 as prepared in Example 1) pre-dissolved in dimethylacetamide (DMA) was slowly added dropwise at a molar ratio of T800-exatecan compound to the antibody of 14. It was ensured that the volume of the organic solvent in the total reaction solution accounted for 10%, and the coupling reaction was stirred at room temperature for 1 h.

At the end of the reaction, the coupling reaction mixture was immediately desalted and exchanged with histidine-acetic acid/NaCl buffer using a desalting column. Activated charcoal powder (30 mg of powder per ml of liquid) was then added to the collection solution, which was suspended for 2 h at room temperature, centrifuged, and sterilized using a 0.22 μm filter membrane, and the activated charcoal particles were removed at the same time. The resulting product was calculated by UV for its concentration and DAR value, detected by hydrophobic chromatography (HIC) for product homogeneity, and detected by size exclusion chromatography (SEC) for the degree of aggregation. The product was placed in a refrigerator at −80° C. for cryopreservation.

The structural formula of the prepared antibody-drug conjugate Ab13-T800-exatecan is shown in C-7, wherein m represents the DAR value, which is about 8; and Ab represents the antibody, which is the anti-PTK7 antibody Ab13.

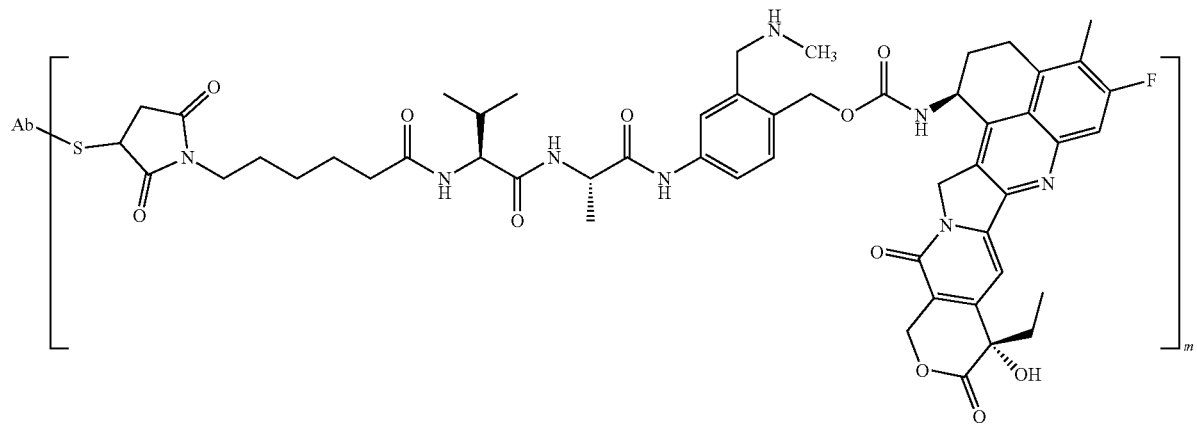

C-7

Figure 7:
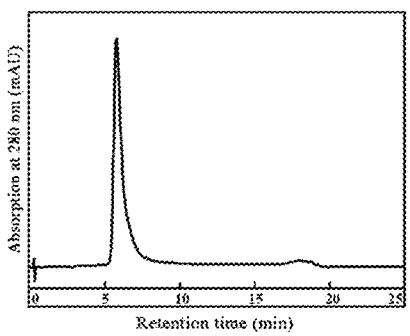
FIG. 7 shows a hydrophobic chromatography (HIC) chromatogram of Ab13-T800-exatecan as prepared in Example 6 of the present disclosure.
Figure 8:
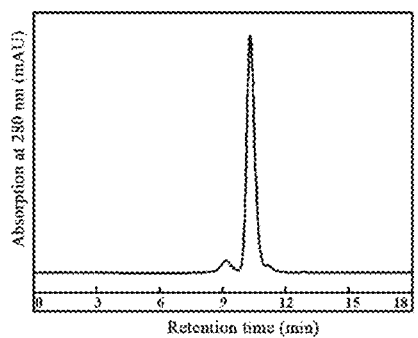
FIG. 8 shows a size exclusion (SEC) chromatogram of Ab13-T800-exatecan as prepared in Example 6 of the present disclosure.

FIG. 7 shows a hydrophobic chromatography chromatogram of Ab13-T800-exatecan, where a single peak indicates the conjugate obtained by coupling with this method with high product homogeneity and a main peak with a DAR value of about 8. FIG. 8 shows a size exclusion chromatogram of Ab13-T800-exatecan, where the percentage of aggregates of Ab13-T800-exatecan was 6.36% based on integral analysis.

Example 7 Preparation of Antibody-Drug Conjugate Ab13-T1000-Vinblastine 500 mM potassium dihydrogen phosphate-dipotassium hydrogen phosphate ($KH_2PO_4$— $K_2HPO_4$)/20 mM ethylenediaminetetraacetic acid (EDTA) buffer and deionized water were added to a stock solution of the anti-PTK7 antibody Ab13 as prepared in Example 2 of the present disclosure, and the pH of the system was adjusted to 7.0. Meanwhile, it was ensured that the phosphate concentration of the solution was at 50 mM and the concentration of ethylenediaminetetraacetic acid was at 2 mM. 7 times molar excess of tris(2-carboxyethyl)phosphine hydrochloride (TCEP) was added, and the reaction solution was stirred at 37° C. for 2 h. The above reaction solution was placed in an ice water bath and cooled for 10 min, and then 5 mM of T1000-Vinblastine (i.e., the compound L-D-8 as prepared in Example 1) pre-dissolved in dimethylacetamide (DMA) was slowly added dropwise at a molar ratio of T1000-Vinblastine compound to the antibody of 14. It was ensured that the volume of the organic solvent in the total reaction solution accounted for 10%, and the coupling reaction was stirred at room temperature for 1 h.

At the end of the reaction, the coupling reaction mixture was immediately desalted and exchanged with histidine-acetic acid/NaCl buffer using a desalting column. Activated charcoal powder (30 mg of powder per ml of liquid) was then added to the collection solution, which was suspended for 2 h at room temperature, centrifuged, and sterilized using a 0.22 μm filter membrane, and the activated charcoal particles were removed at the same time. The resulting product was calculated by UV for its concentration and DAR value, detected by hydrophobic chromatography (HIC) for product homogeneity, and detected by size exclusion chromatography (SEC) for the degree of aggregation. The product was placed in a refrigerator at −80° C. for cryopreservation.

The structural formulas of the prepared antibody-drug conjugate Ab13-T1000-Vinblastine are shown in C-8, wherein m represents the DAR value, which is about 8, and Ab represents the antibody, which is the anti-PTK7 antibody Ab13.

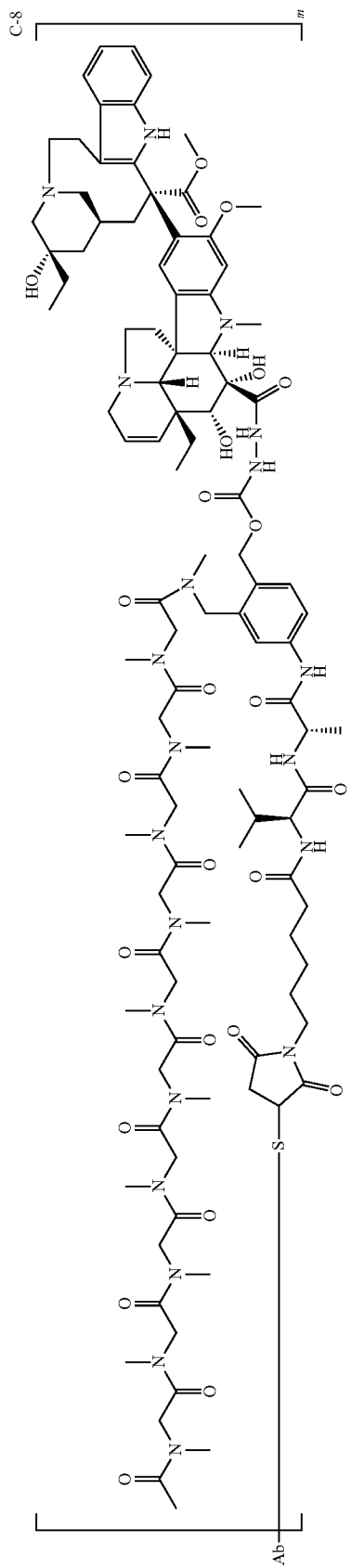

Figure 9:
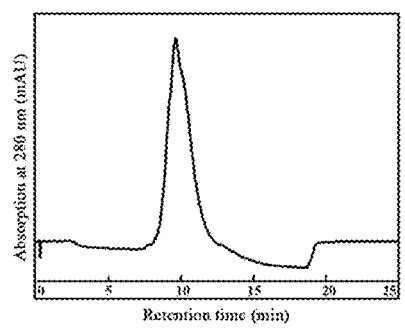
FIG. 9 shows a hydrophobic chromatography (HIC) chromatogram of Ab13-T1000-Vinblastine as prepared in Example 7 of the present disclosure.
Figure 10:
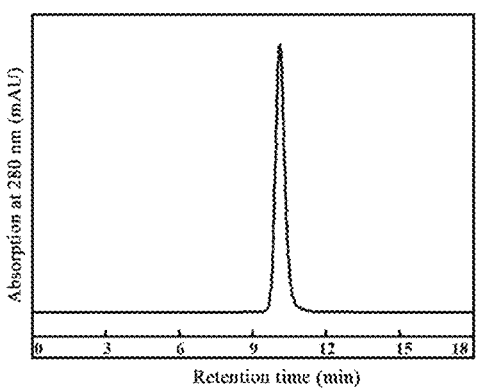
FIG. 10 shows a size exclusion (SEC) chromatogram of Ab13-T1000-Vinblastine as prepared in Example 7 of the present disclosure.

FIG. 9 shows a hydrophobic chromatography chromatogram of Ab13-T1000-Vinblastine, where a single peak indicates the conjugate obtained by coupling with this method with high product homogeneity and a main peak with a DAR value of about 8. FIG. 10 shows a size exclusion chromatogram of Ab13-T1000-Vinblastine, where the percentage of aggregates of Ab13-T1000-Vinblastine was 0.72% based on integral analysis.

Example 8 Preparation of Antibody-Drug Conjugates Ab13-Vc0101 and h6M24-Vc0101

500 mM potassium dihydrogen phosphate-dipotassium hydrogen phosphate ($KH_2PO_4$— $K_2HPO_4$)/20 mM ethylenediaminetetraacetic acid (EDTA) buffer and deionized water were added to a stock solution of the anti-PTK7 antibody Ab13 as prepared in Example 2 of the present disclosure or the positive control antibody h6M24, and the pH of the system was adjusted to 7.0. Meanwhile, it was ensured that the phosphate concentration of the solution was at 50 mM and the concentration of ethylenediaminetetraacetic acid was at 2 mM. 3-6 times molar excess of tris(2-carboxyethyl)phosphine hydrochloride (TCEP) was added, and the reaction solution was stirred at 37° C. for 2 h. The above reaction solution was placed in an ice water bath and cooled for 10 min, and then 5 mM of vc-Aur0101 compound (purchased from Shanghai Haoyuan Chemexpress Co. Ltd., Item No. HY-128955) pre-dissolved in dimethylacetamide (DMA) was slowly added dropwise at a molar ratio of vc-Aur0101 compound to the antibody of 7. It was ensured that the volume of the organic solvent in the total reaction solution accounted for 10%, and the coupling reaction was stirred at room temperature for 1 h.

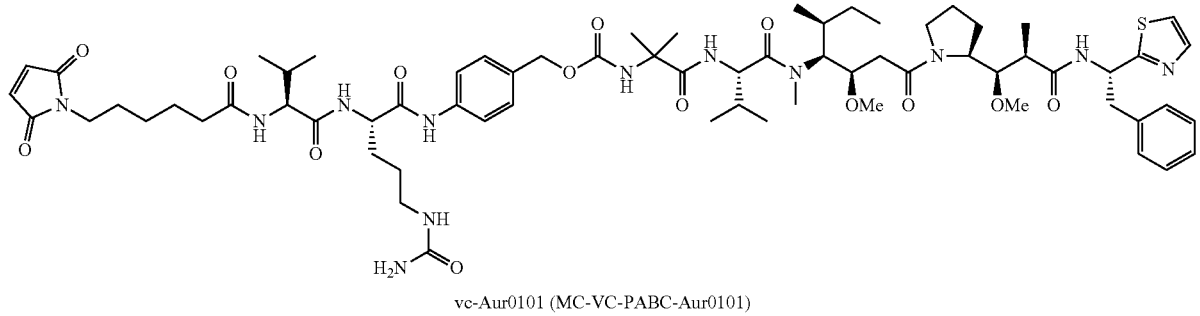 [SMILES: CC[C@H](C)[C@@H]([C@@H](CC(=O)N1CCC[C@H]1[C@H](OC)[C@@H](C)C(=O)N[C@@H](Cc1ccccc1)c1nccs1)OC)N(C)C(=O)[C@@H](NC(=O)C(C)(C)NC(=O)OCc1ccc(NC(=O)[C@H](CCCNC(N)=O)NC(=O)[C@@H](NC(=O)CCCCCN2C(=O)C=CC2=O)C(C)C)cc1)C(C)C]

vc-Aur0101 (MC-VC-PABC-Aur0101)

At the end of the reaction, the coupling reaction mixture was immediately desalted and exchanged with histidine-acetic acid/NaCl buffer using a desalting column, and then sterilized using a 0.22 μm filter membrane. The resulting product was calculated by UV for its concentration, analyzed by hydrophobic chromatography (HIC) for product DAR value, and detected by size exclusion chromatography (SEC) for the degree of aggregation. The products were placed in a refrigerator at −80° C. for cryopreservation.

The structural formulas of the prepared antibody-drug conjugates Ab13-vc0101 and h6M24-vc0101 are shown in C-11, wherein m represents the DAR value, which is about 4, and Ab represents the antibody, which is the anti-PTK7 antibody Ab13, or the positive control antibody h6M24.

C-11

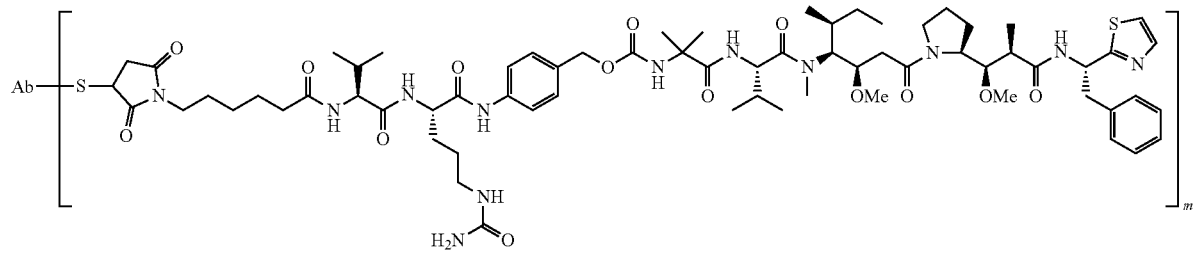

Figure 11:
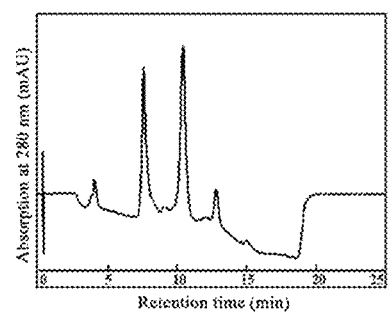
FIG. 11 shows a hydrophobic chromatography (HIC) chromatogram of Ab13-vc0101 as prepared in Example 8 of the present disclosure.
Figure 12:
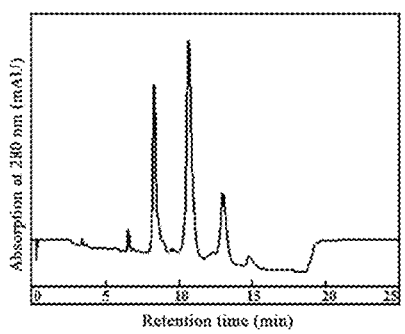
FIG. 12 shows a hydrophobic chromatography (HIC) chromatogram of h6M24-vc0101 as prepared in Example 8 of the present disclosure.
Figure 13:
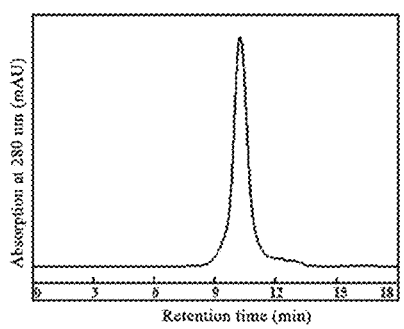
FIG. 13 shows a size exclusion (SEC) chromatogram of Ab13-vc0101 as prepared in Example 8 of the present disclosure.
Figure 14:
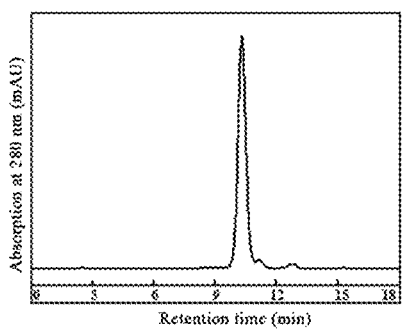
FIG. 14 shows a size exclusion (SEC) chromatogram of h6M24-vc0101 as prepared in Example 8 of the present disclosure.

FIG. 11 and FIG. 12 show hydrophobic chromatography chromatograms of Ab13-vc0101 and h6M24-vc0101, respectively. The DAR values of Ab13-vc0101 and h6M24-vc0101 were calculated to be 3.73 and 3.93, respectively, by grouping and analyzing the components of peaks in these graphs. FIG. 13 and FIG. 14 show size exclusion chromatograms of Ab13-vc0101 and h6M24-vc0101, respectively, where the percentage of aggregates of Ab13-vc0101 and h6M24-vc0101 were 6.31% and 1.39%, respectively, based on the integral analysis.

Antibody-drug conjugates C-1, C-2, C-3, C-4, C-5, C-9, and C-10 were prepared by reference to the methods recited in Examples 5, 6, 7, or 8, and their structural formulas are shown in the table below, wherein m represents the DAR value, which is about 8 or about 4, and Ab represents the antibody, which is the anti-PTK7 antibody Ab13.

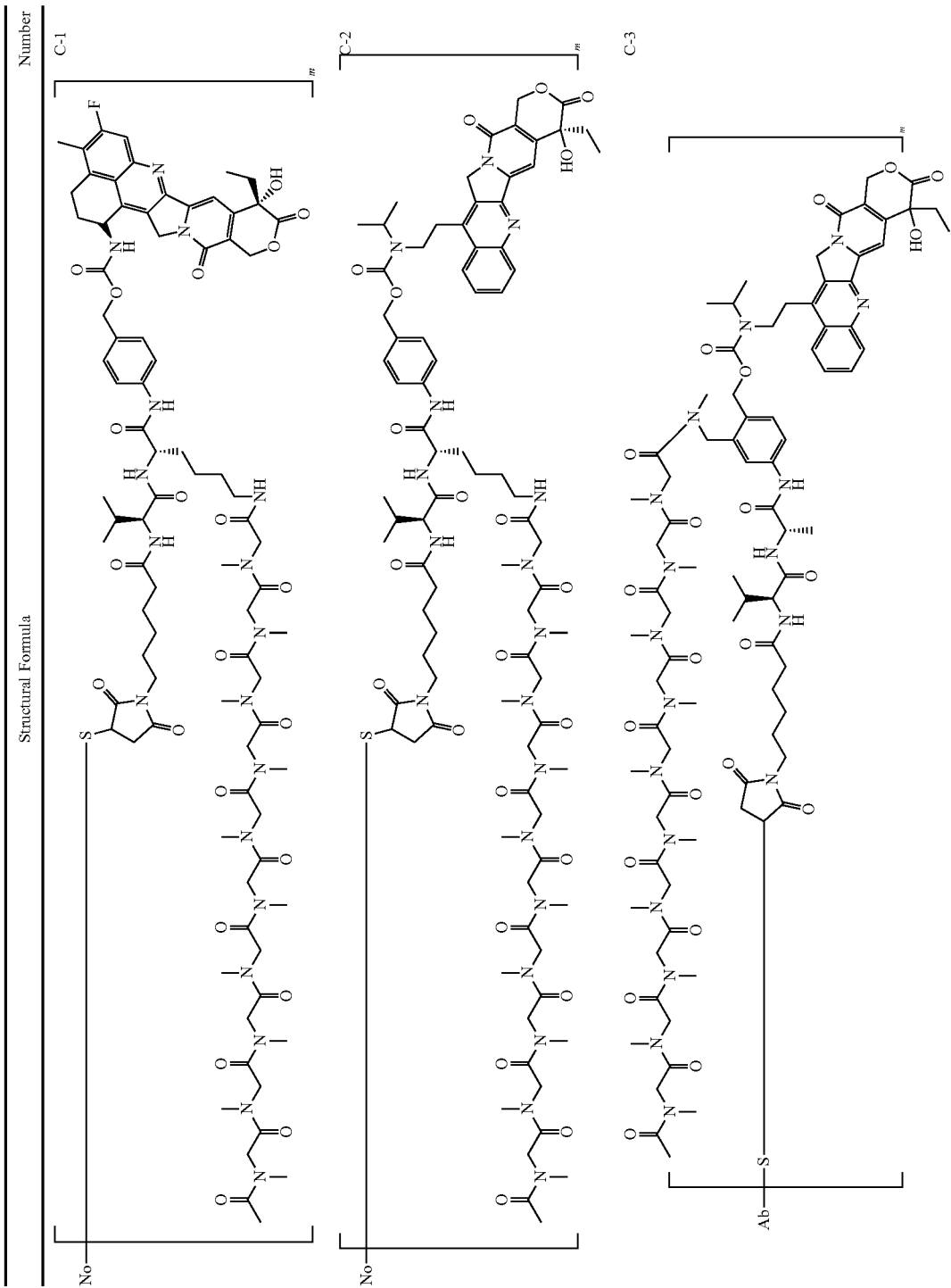

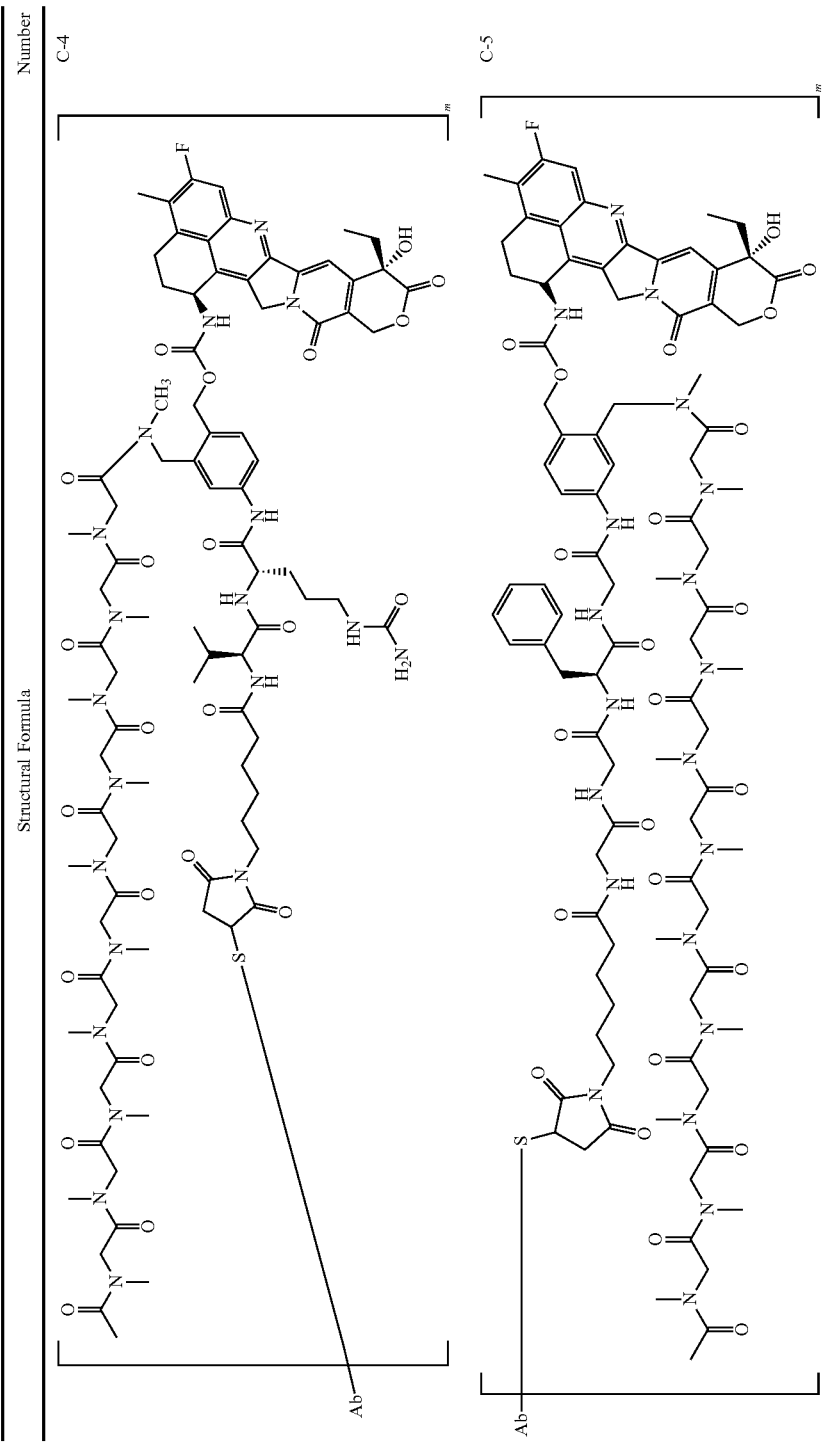

| Structural Formula | Number |
|---|---|
| 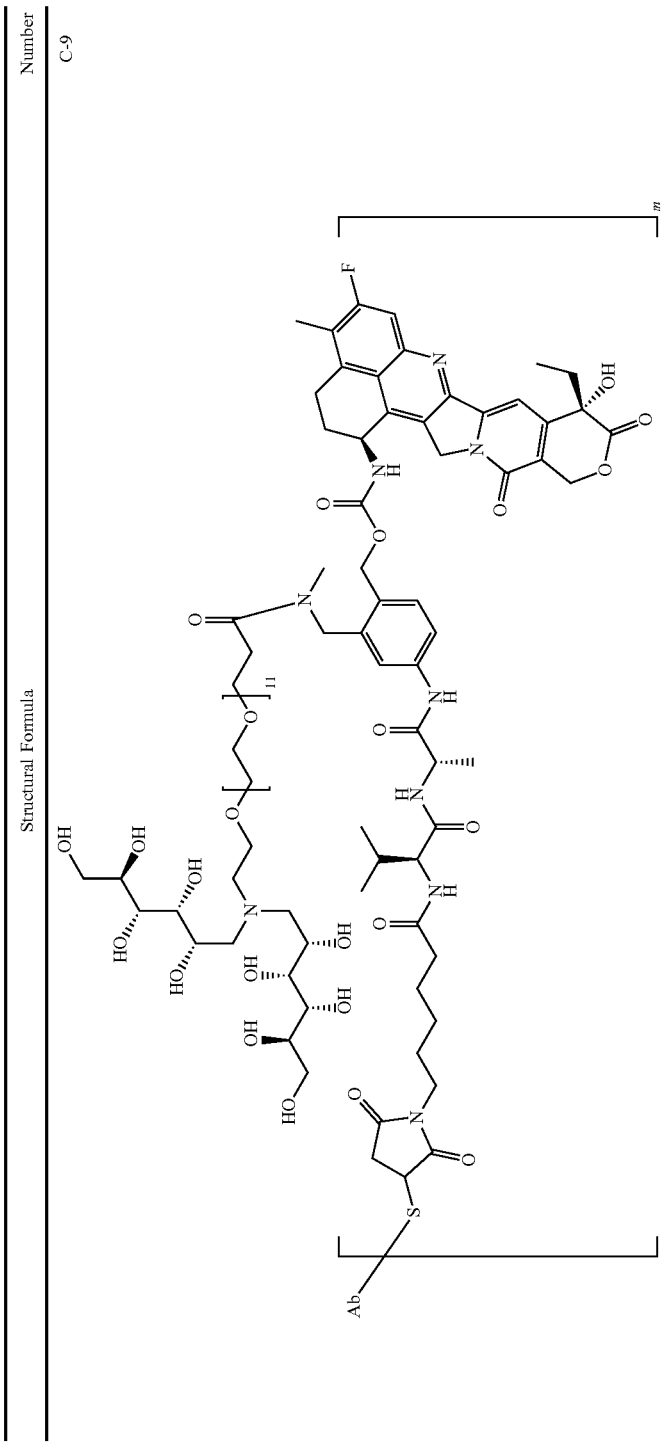 | C-9 |

-continued
| Structural Formula | Number |
|---|---|
| 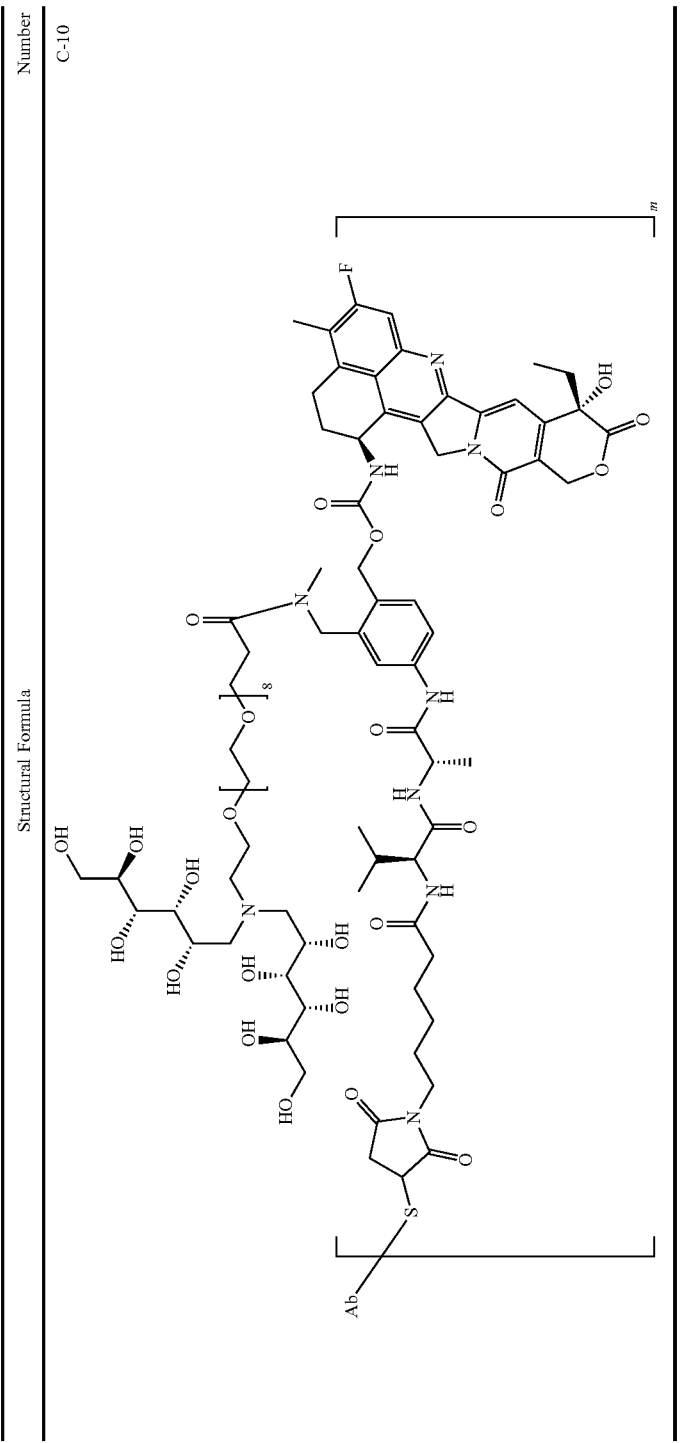 | C-10 |

Example 9 In Vitro Cell Killing Assay of PTK7 Antibody-Drug Conjugates (PTK7-ADCs) on SK-OV-3 Cell Line SK-OV-3 (Human Ovarian Cancer Cells, ATCC, Catalog No. HTB-77) was cultured to reach 800% cell density. The cells were collected and plated into a 96-well plate, and the cell density was adjusted to $2-5 \times 10^4$/ml. 100 μl was plated in each well, and the antibody or ADC molecule was diluted in a 3-fold gradient with a starting concentration of 300 nM. After the completion of the dilution, the cell culture was added for stationary culture for 5 days, during which the cell apoptosis status was observed regularly. After 5 days, 15 μl of CCK-8 stock solution was added to the 96-well plate and reacted in an incubator at 37° C. for 0.5-2 h. Then, the absorbance at 450 nm was measured, and a cell survival curve was plotted according to the detection results and the dilution gradient of ADC.

Figure 15:
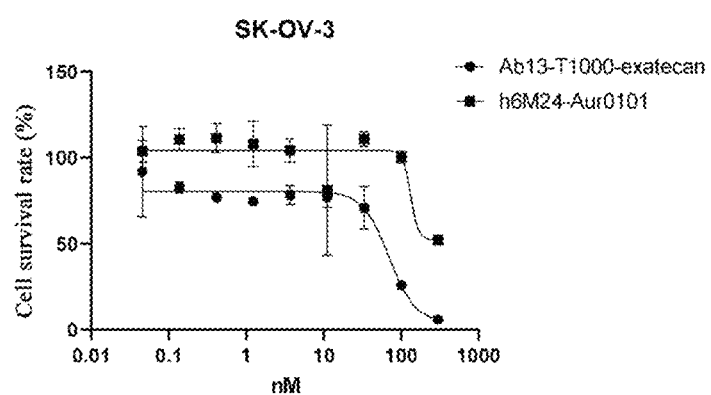
FIG. 15 shows a survival curve of cells after treatment of the SK-OV-3 cell line with Ab13-T1000-exatecan as prepared in Example 5 of the present disclosure or h6M24-vc0101 as prepared in Example 8 of the present disclosure.

FIG. 15 shows a survival curve of cells after treatment of the SK-OV-3 cell line with the antibody-drug conjugate Ab13-T1000-exatecan as prepared in Example 5 or the antibody-drug conjugate h6M24-vc0101 as prepared in Example 8. The results show that the in vitro cell killing effect of Ab13-T1000-exatecan on the SK-OV-3 cell line is significantly superior over that of the control drug h6M24-vc0101.

Example 10 In Vivo Anti-Tumor Activity of PTK7 Antibody-Drug Conjugates (PTK7-ADCs) Against Human Ovarian Cancer Cell Line OVCAR-3

6-week-old NCG mice, female, weighing 18-21 g, were purchased from Beijing Vital River Laboratory Animal Technology Co., Ltd. The mice were subcutaneously inoculated with OVCAR-3 cells (Human Ovarian Cancer Cells, ATCC, Catalog No. HTB-161). When the average tumor volume reached 150 mm$^3$, the antibody-drug conjugates Ab13-T1000-exatecan and h6M24-T1000-exatecan as prepared in Example 5 and the antibody-drug conjugate Ab13-vc0101 and h6M24-vc0101 as prepared in Example 8 were administered intravenously at a dose of 3 mg/kg or 5 mg/kg, respectively, and a negative control Vehicle group was set and administered intravenously with PBS at an equal dose, once a week for a total of 1 dose. After dosing, the tumor volume was measured twice a week using a vernier caliper and calculated according to the following formula: TV=(length*width$^2$)/2.

Figure 16:
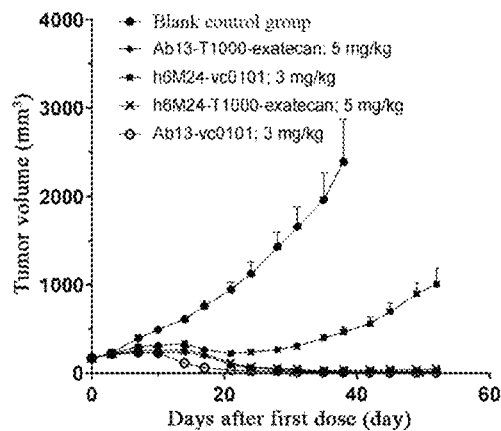
FIG. 16 shows curves of in vivo tumor volume over time in an OVCAR-3 mouse model after dosing PTK7-ADCs as prepared in Examples of the present disclosure.

FIG. 16 shows curves of in vivo tumor volume over time in an OVCAR-3 mouse model, and the results show that compared to the negative control group, Ab13-T1000-exatecan, h6M24-T1000-exatecan and Ab13-vc0101 significantly inhibit tumor growth but h6M24-vc0101 is less effective in inhibiting tumor growth.

Example 11 In Vivo Anti-Tumor Activity of PTK7 Antibody-Drug Conjugates (PTK7-ADCs) Against Human Triple-Negative Breast Cancer PDX LD1-2009-361918

6-week-old NU/NU mice, female, weighing 18-21 g, were purchased from Beijing Vital River Laboratory Animal Technology Co., Ltd. The mice were subcutaneously inoculated with triple-negative breast cancer tumor mass (specimen no. 361918, obtained from Xi'an LIDE Biotech Co. Ltd.). When the average tumor volume reached 150 mm$^3$, the antibody-drug conjugates Ab13-T1000-exatecan and h6M24-T1000-exatecan as prepared in Example 5 were administered intravenously at a dose of 10 mg/kg, respectively, the antibody-drug conjugate h6M24-vc0101 as prepared in Example 8 was administered intravenously at a dose of 5 mg/kg, and a negative control Vehicle group was set and administered intravenously with PBS at an equal dose, once a week for a total of 2 doses. After dosing, the tumor volume was measured twice a week using a vernier caliper and calculated according to the following formula: TV=(length*width$^2$)/2.

Figure 17:
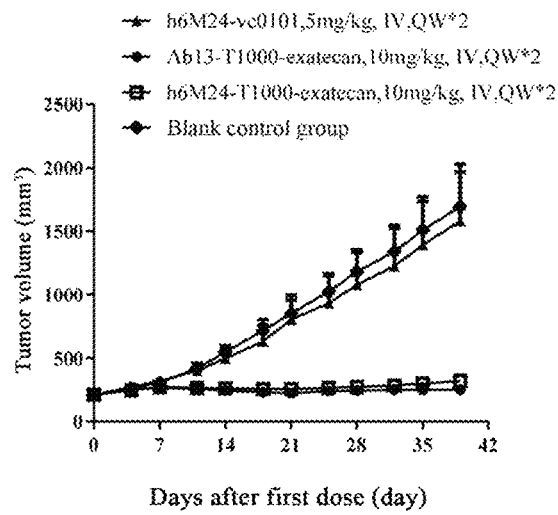
FIG. 17 shows curves of in vivo tumor volume over time in a triple-negative breast cancer PDX LD1-2009-361918 mouse model after dosing PTK7-ADCs as prepared in Examples of the present disclosure.

FIG. 17 shows curves of in vivo tumor volume over time in a triple-negative breast cancer mouse model, and the results show that compared to the negative control, Ab13-T1000-exatecan and h6M24-T1000-exatecan significantly inhibit tumor growth but h6M24-vc0101 does not produce any tumor growth inhibitory effect.

Example 12 In Vivo Anti-Tumor Activity of PTK7 Antibody-Drug Conjugates (PTK7-ADCs) Against Human Small Cell Lung Cancer PDX LD1-2025-362797

6-week-old NU/NU mice, female, weighing 18-21 g, were purchased from Beijing Vital River Laboratory Animal Technology Co., Ltd. The mice were subcutaneously inoculated with small cell lung cancer tumor mass (specimen no. 362797, obtained from Xi'an LIDE Biotech Co. Ltd.). When the average tumor volume reached 150 mm$^3$, the antibody-drug conjugates Ab13-T1000-exatecan and h6M24-T1000-exatecan as prepared in Example 5 were administered intravenously at a dose of 10 mg/kg, respectively, the antibody-drug conjugate h6M24-vc0101 as prepared in Example 8 was administered intravenously at a dose of 5 mg/kg, and a negative control Vehicle group was set and administered intravenously with PBS at an equal dose, once a week for a total of 1 dose. After dosing, the tumor volume was measured twice a week using a vernier caliper and calculated according to the following formula: TV=(length*width$^2$)/2.

Figure 18:
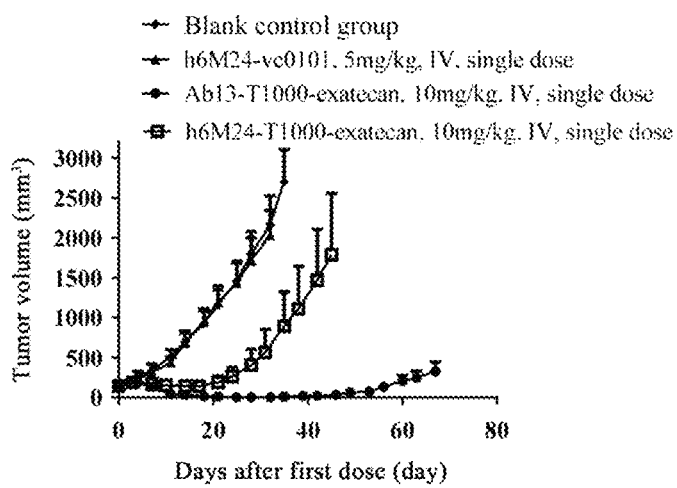
FIG. 18 shows curves of in vivo tumor volume over time in a human small cell lung cancer PDX LD1-2025-362797 mouse model after dosing PTK7-ADCs as prepared in Examples of the present disclosure.

FIG. 18 shows curves of in vivo tumor volume over time in a small cell lung cancer mouse model, and the results show that compared to the negative control, Ab13-T1000-exatecan can significantly inhibit tumor growth, h6M24-T1000-exatecan can partially inhibit tumor growth but tumor relapses in a short period of time, but h6M24-vc0101 does not produce any tumor growth inhibitory effect.

Example 13 In Vivo Anti-Tumor Activity of PTK7 Antibody-Drug Conjugates (PTK7-ADCs) Against Human Lung Squamous Cell Carcinoma PDX LD1-0025-200615

6-week-old NU/NU mice, female, weighing 18-21 g, were purchased from Beijing Vital River Laboratory Animal Technology Co., Ltd. The mice were subcutaneously inoculated with lung squamous cell carcinoma tumor mass (specimen no. 200615, obtained from Xi'an LIDE Biotech Co. Ltd.). When the average tumor volume reached 150 mm$^3$, the antibody-drug conjugate Ab13-T1000-exatecan as prepared in Example 5 was administered intravenously at a dose of 10 mg/kg, the antibody-drug conjugate h6M24-vc0101 as prepared in Example 8 was administered intravenously at a dose of 5 mg/kg, and a negative control Vehicle group was set and administered intravenously with PBS at an equal dose, once a week for a total of 2 doses. After dosing, the tumor volume was measured twice a week using a vernier caliper and calculated according to the following formula: TV=(length*width$^2$)/2.

Figure 19:
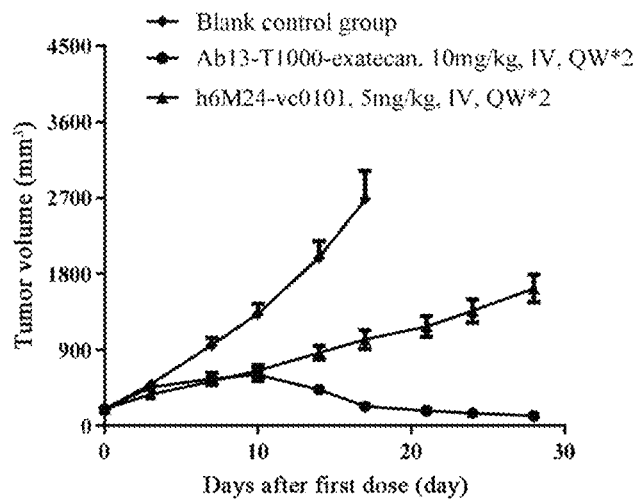
FIG. 19 shows curves of in vivo tumor volume over time in a human lung squamous cell carcinoma PDX LD1-0025-200615 mouse model after dosing PTK7-ADCs as prepared in Examples of the present disclosure.

FIG. 19 shows curves of in vivo tumor volume over time in a lung squamous cell carcinoma mouse model, and the results show that compared to the negative control, Ab13-T1000-exatecan can significantly inhibit tumor growth, h6M24-vc0101 can partially inhibit tumor growth, and the tumor inhibitory effect of Ab13-T1000-exatecan is superior to that of h6M24-vc0101.

Example 14 In Vivo Anti-Tumor Activity of PTK7 Antibody-Drug Conjugates (PTK7-ADCs) Against Human Esophageal Squamous Cell Carcinoma PDX LD1-2015-361318

6-week-old NU/NU mice, female, weighing 18-21 g, were purchased from Beijing Vital River Laboratory Animal Technology Co., Ltd. The mice were subcutaneously inoculated with esophageal squamous cell carcinoma tumor mass (specimen no. 361318, obtained from Xi'an LIDE Biotech Co. Ltd.). When the average tumor volume reached 150 mm$^3$, the antibody-drug conjugate Ab13-T1000-exatecan as prepared in Example 5 was administered intravenously at a dose of 10 mg/kg, the antibody-drug conjugate h6M24-vc0101 as prepared in Example 8 was administered intravenously at a dose of 5 mg/kg, and a negative control Vehicle group was set and administered intravenously with PBS at an equal dose, once a week for a total of 2 doses. After dosing, the tumor volume was measured twice a week using a vernier caliper and calculated according to the following formula: TV=(length*width$^2$)/2.

Figure 20:
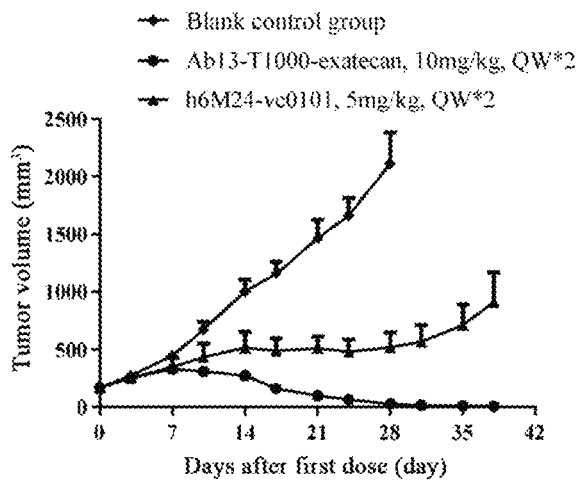
FIG. 20 shows curves of in vivo tumor volume over time in a human esophageal squamous cell carcinoma PDX LD1-2015-361318 mouse model after dosing PTK7-ADCs as prepared in Examples of the present disclosure.

FIG. 20 shows curves of in vivo tumor volume over time in a human esophageal squamous cell carcinoma mouse model, and the results show that compared to the negative control, Ab13-T1000-exatecan can significantly inhibit tumor growth, h6M24-vc0101 can partially inhibit tumor growth, and the tumor inhibitory effect of Ab13-T1000-exatecan is superior to that of h6M24-vc0101.

Example 15 In Vivo Anti-Tumor Activity of PTK7 Antibody-Drug Conjugates (PTK7-ADCs) Against Human Cervical Squamous Cell Carcinoma PDX LD1-0010-362343

6-week-old NU/NU mice, female, weighing 18-21 g, were purchased from Beijing Vital River Laboratory Animal Technology Co., Ltd. The mice were subcutaneously inoculated with cervical squamous cell carcinoma tumor mass (specimen no. 362343, obtained from Xi'an LIDE Biotech Co. Ltd.). When the average tumor volume reached 150 mm$^3$, the antibody-drug conjugate Ab13-T1000-exatecan as prepared in Example 5 was administered intravenously at a dose of 10 mg/kg, the antibody-drug conjugate h6M24-vc0101 as prepared in Example 8 was administered intravenously at a dose of 5 mg/kg, and a negative control Vehicle group was set and administered intravenously with PBS at an equal dose, once a week for a total of 2 doses. After dosing, the tumor volume was measured twice a week using a vernier caliper and calculated according to the following formula: TV=(length*width$^2$)/2.

Figure 21:
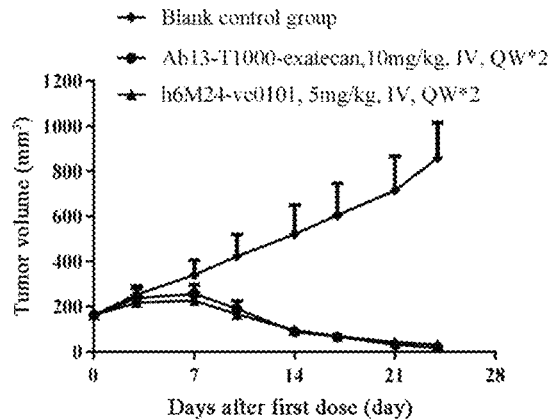
FIG. 21 shows curves of in vivo tumor volume over time in a human cervical squamous cell carcinoma PDX LD1-0010-362343 mouse model after dosing PTK7-ADCs as prepared in Examples of the present disclosure.

FIG. 21 shows curves of in vivo tumor volume over time in a human cervical squamous cell carcinoma mouse model, and the results show that compared to the negative control, both of Ab13-T1000-exatecan and h6M24-vc0101 can significantly inhibit tumor growth and the tumor inhibitory effect of Ab13-T1000-exatecan is superior to that of h6M24-vc0101.

Example 16 In Vivo Anti-Tumor Activity of PTK7 Antibody-Drug Conjugates (PTK7-ADCs) Against Human Head and Neck Squamous Cell Carcinoma PDX LD1-0023-200615

6-week-old NU/NU mice, female, weighing 18-21 g, were purchased from Beijing Vital River Laboratory Animal Technology Co., Ltd. The mice were subcutaneously inoculated with head and neck squamous cell carcinoma tumor mass (specimen no. 200615, obtained from Xi'an LIDE Biotech Co. Ltd.). When the average tumor volume reached 150 mm$^3$, the antibody-drug conjugate Ab13-T1000-exatecan as prepared in Example 5 was administered intravenously at a dose of 10 mg/kg, the antibody-drug conjugate h6M24-vc0101 as prepared in Example 8 was administered intravenously at a dose of 5 mg/kg, and a negative control Vehicle group was set and administered intravenously with PBS at an equal dose, once a week for a total of 2 doses. After dosing, the tumor volume was measured twice a week using a vernier caliper and calculated according to the following formula: TV=(length*width$^2$)/2.

Figure 22:
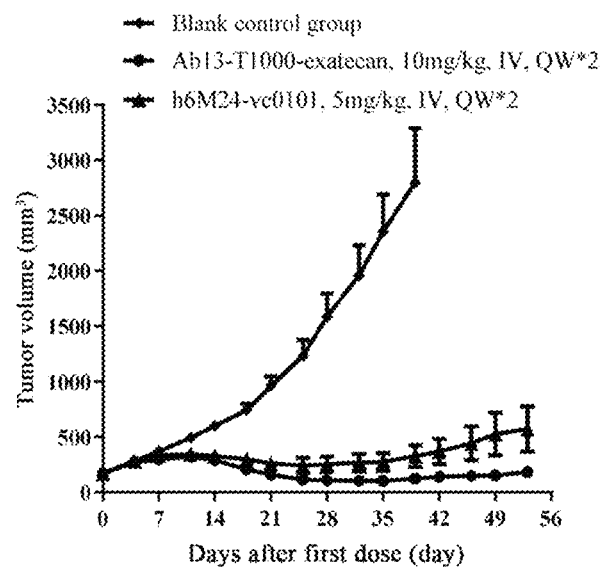
FIG. 22 shows curves of in vivo tumor volume over time in a human head and neck squamous cell carcinoma PDX LD1-0023-200615 mouse model after dosing PTK7-ADCs as prepared in Examples of the present disclosure.

FIG. 22 shows curves of in vivo tumor volume over time in a human head and neck squamous cell carcinoma mouse model, and the results show that compared to the negative control, both of Ab13-T1000-exatecan and h6M24-vc0101 can significantly inhibit tumor growth and the tumor inhibitory effect of Ab13-T1000-exatecan is superior to that of h6M24-vc0101.

Example 17 In Vivo Anti-Tumor Activity of PTK7 Antibody-Drug Conjugates (PTK7-ADCs) Against Human Colorectal Cancer PDX LD1-2038-361980

6-week-old NU/NU mice, female, weighing 18-21 g, were purchased from Beijing Vital River Laboratory Animal Technology Co., Ltd. The mice were subcutaneously inoculated with colorectal cancer tumor mass (specimen no. 361980, obtained from Xi'an LIDE Biotech Co. Ltd.). When the average tumor volume reached 150 mm$^3$, the antibody-drug conjugate Ab13-T1000-exatecan as prepared in Example 5 was administered intravenously at a dose of 10 mg/kg, the antibody-drug conjugate h6M24-vc0101 as prepared in Example 8 was administered intravenously at a dose of 5 mg/kg, and a negative control Vehicle group was set and administered intravenously with PBS at an equal dose, once a week for a total of 2 doses. After dosing, the tumor volume was measured twice a week using a vernier caliper and calculated according to the following formula: TV=(length*width$^2$)/2.

Figure 23:
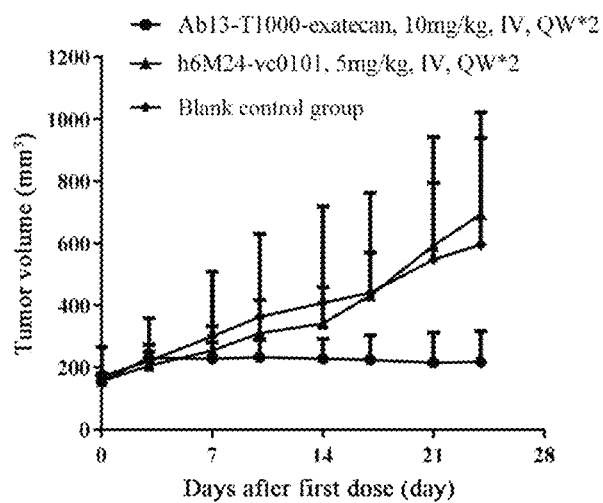
FIG. 23 shows curves of in vivo tumor volume over time in a human colorectal cancer PDX LD1-2038-361980 mouse model after dosing PTK7-ADCs as prepared in Examples of the present disclosure.

FIG. 23 shows curves of in vivo tumor volume over time in a human colorectal cancer mouse model, and the results show that compared to the negative control, Ab13-T1000-exatecan can significantly inhibit tumor growth and h6M24-vc0101 does not produce any tumor growth inhibitory effect.

It should be pointed out that the killing activity of camptothecin drugs on tumor cells is relatively weak compared to the microtubule protein inhibitor Aur0101. The tolerated dose of Aur0101-based ADC drugs in clinical practice (TROP2 or HER2-related clinical studies) is about 2.4-2.8 mg/kg, and a large toxicity response is observed. In monkey toxicological experiments, usually the MTD of such drugs is basically around 6-8 mg/kg. The toxicological experiments show that the ADC drugs in the Examples of the present disclosure have a HNSTD of more than 30 mg/kg in monkeys. Therefore, although the administration dose is higher than the control drug (10 mg/kg vs. 5 mg/kg), the ADC drugs of the present disclosure have a larger safety window and will have better therapeutic effect and safety for PTK7-expressing tumors.

The present disclosure describes a plurality of examples, but this description is exemplary and not for limiting, and it will be apparent to those of ordinary skill in the art that more examples and embodiments are possible within the scope encompassed by the examples described in the present disclosure. Although many possible combinations of features are illustrated herein and discussed in specific embodiments, many other ways of combining the disclosed features are also possible. Unless purposely limited, any feature or element of any example may be used in combination with any other feature or element in any other example, or may be substituted for any other feature or element in any other example.

What is claimed is:

1. A compound of formula (I) or a pharmaceutically acceptable salt thereof,

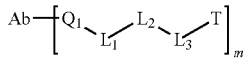

wherein:
Ab is an anti-PTK7 antibody or antigen-binding fragment thereof, comprising:
- (a) a heavy chain variable region (VH) comprising a heavy chain complementarity determining region 1 (HC CDR1), a heavy chain complementarity determining region 2 (HC CDR2), and a heavy chain complementarity determining region 3 (HC CDR3), wherein:
  - HC CDR1 is SEQ ID NO: 1, HC CDR2 is SEQ ID NO: 2, and HC CDR3 is SEQ ID NO: 3; or
  - HC CDR1 is SEQ ID NO: 7, HC CDR2 is SEQ ID NO: 8, and HC CDR3 is SEQ ID NO:3; or
  - HC CDR1 is SEQ ID NO: 13, HC CDR2 is SEQ ID NO: 14, and HC CDR3 is SEQ ID NO: 15; and
- (b) a light chain variable region (VL) comprising a light chain complementarity determining region 1 (LC CDR1), a light chain complementarity determining region 2 (LC CDR2), and a light chain complementarity determining region 3 (LC CDR3), wherein:
  - LC CDR1 is SEQ ID NO: 4, LC CDR2 is SEQ ID NO: 5, and LC CDR3 is SEQ ID NO: 6; or
  - LC CDR1 is SEQ ID NO: 10, LC CDR2 is SEQ ID NO: 11, and LC CDR3 is SEQ ID NO: 12; or
  - LC CDR1 is SEQ ID NO: 16, LC CDR2 is SGS, and LC CDR3 is SEQ ID NO: 18;

T is a drug unit or a diagnostic reagent unit;
m is a number between 1 and 8;
$Q_1$ is selected from:

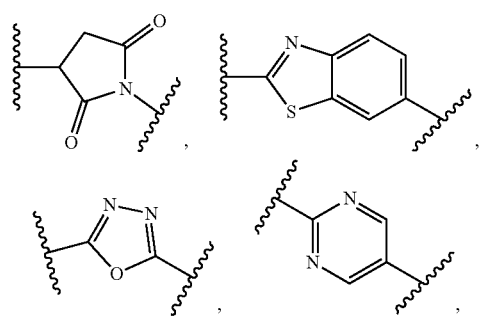

substituted

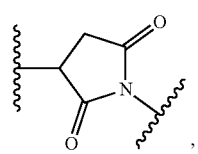 [SMILES: *C1CC(=O)N(*)C1=O]

substituted,

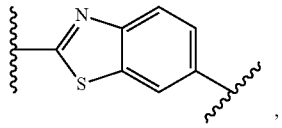 [SMILES: *c1ccc2nc(*)sc2c1]

substituted,

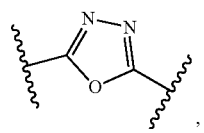 [SMILES: *c1nnc(*)o1]

and substituted

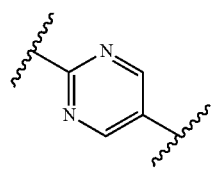

$L_1$ is $-L_{1a}-C(=O)-$, wherein $L_{1a}$ is selected from alkylene, polyethylene glycol group, alkenylene, alkynylene, alicylidene, aliphatic heterocyclylene, arylene, heteroarylene, substituted alkylene, substituted polyethylene glycol group, substituted alkenylene, substituted alkynylene, substituted alicylidene, substituted aliphatic heterocyclylene, substituted arylene, and substituted heteroarylene;
$L_2$ is a polypeptide residue or a substituted polypeptide residue; and
$L_3$ is

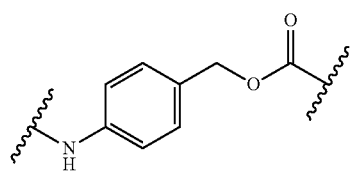 [SMILES: *Nc1ccc(COC(*)=O)cc1]

or substituted

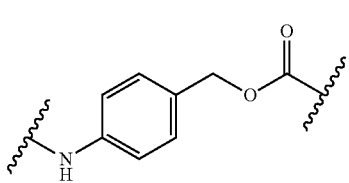

2. The compound or pharmaceutically acceptable salt thereof of claim 1, wherein the antibody or the antigen-binding fragment thereof is bound to $Q_1$ via a sulfur atom in the antibody or the antigen binding fragment thereof.

3. The compound or pharmaceutically acceptable salt thereof of claim 1, wherein the drug unit or the diagnostic reagent unit is bound to $L_3$ via a nitrogen atom or an oxygen atom in the drug unit or the diagnostic reagent unit.

4. The compound or pharmaceutically acceptable salt thereof of claim 1, wherein either of $L_2$ or $L_3$ is substituted with a polysarcosine residue, a glycosylated polyethylene glycol fragment, a substituted polysarcosine residue, or a substituted glycosylated polyethylene glycol fragment.

5. The compound or pharmaceutically acceptable salt thereof of claim 1, wherein the polypeptide residue comprises amino acids independently selected from phenylalanine, isoleucine, leucine, tryptophan, valine, methionine, tyrosine, alanine, threonine, histidine, serine, glutamine, arginine, lysine, asparagine, glutamic acid, proline, citrulline, aspartic acid, and glycine.

6. The compound or pharmaceutically acceptable salt thereof of claim 5, wherein the polypeptide residue is selected from phenylalanine-lysine (Phe-Lys), valine-alanine (Val-Ala), valine-citrulline (Val-Cit), glutamic acid-valine-alanine (Glu-Val-Ala), glutamic acid-valine-citrulline (Glu-Val-Cit), valine-lysine (Val-Lys), alanine-alanine-alanine (Ala-Ala-Ala), alanine-alanine-asparagine (Ala-Ala-Asn), and glycine-glycine-phenylalanine-glycine (Gly-Gly-Phe-Gly).

7. The compound or pharmaceutically acceptable salt thereof of claim 1, wherein m is about 4.

8. The compound or pharmaceutically acceptable salt thereof of claim 1, wherein $L_{1a}$ is —$(CH_2)_{n1}$—; and n1 is a number between 1 and 10.

9. The compound or pharmaceutically acceptable salt thereof of claim 8, wherein n1 is a number between 1 and 6.

10. The compound or pharmaceutically acceptable salt thereof of claim 1, wherein $L_3$ is

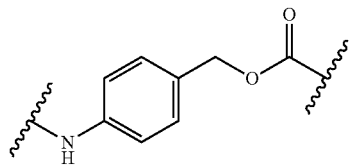 [SMILES: *Nc1ccc(COC(*)=O)cc1]

substituted with a substituted polysarcosine residue.

11. The compound or pharmaceutically acceptable salt thereof of claim 10, wherein the substituted polysarcosine residue is linked to the benzene ring of

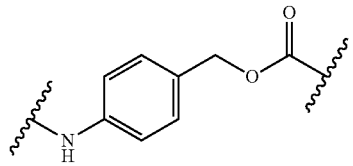 [SMILES: *Nc1ccc(COC(*)=O)cc1]

by

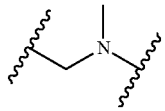 [SMILES: *CN(*)C]

or substituted

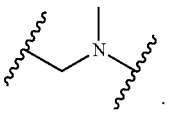 [SMILES: *CN(*)C]

12. The compound or pharmaceutically acceptable salt thereof of claim 11, wherein the substituted polysarcosine residue is

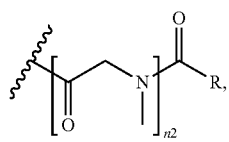

wherein n2 is a number between 4 and 18; and wherein R is selected from: $C_1$-$C_6$ alkyl, $C_1$-$C_6$ cycloalkyl, and $C_1$-$C_6$ alkoxy.

13. The compound or pharmaceutically acceptable salt thereof of claim 1, wherein the drug unit is selected from:

(i) a microtubule protein inhibitor selected from: monomethyl auristatin E (MMAE), monomethyl auristatin F (MMAF), tubulysin, Eribulin, vinblastine, and Aur0101;

(ii) a camptothecin topoisomerase inhibitor; and (iii) an immune activator.

14. The compound or pharmaceutically acceptable salt thereof of claim 1, wherein the compound is selected from:

113
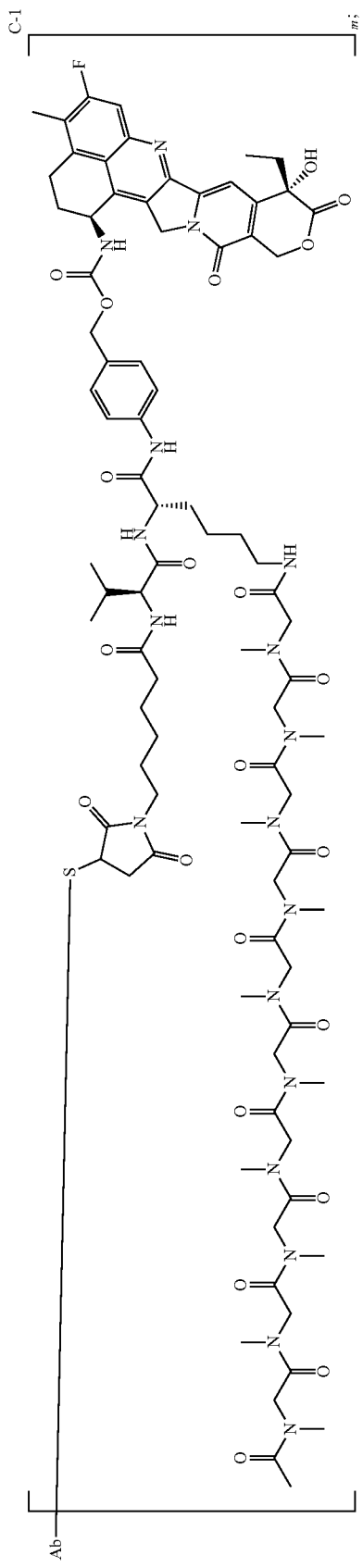
114
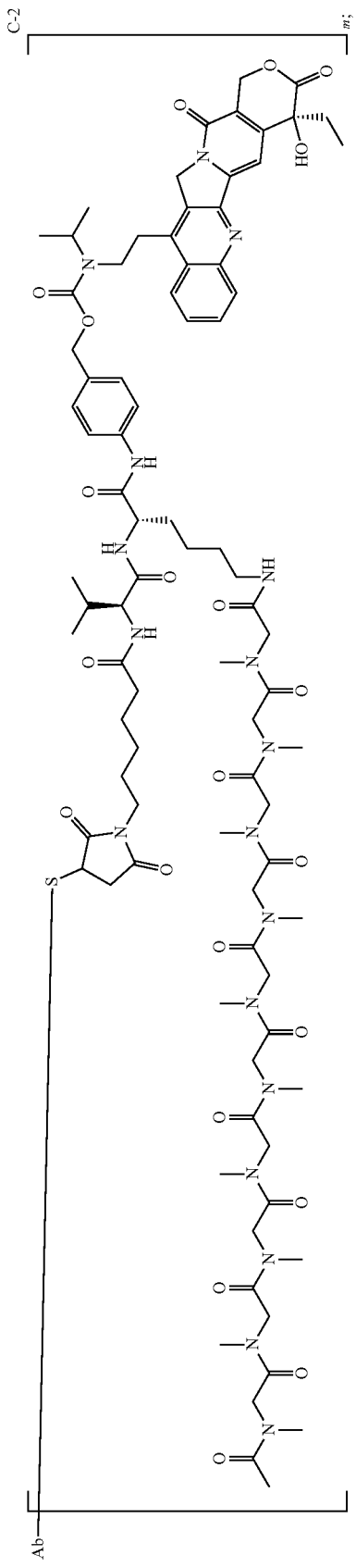

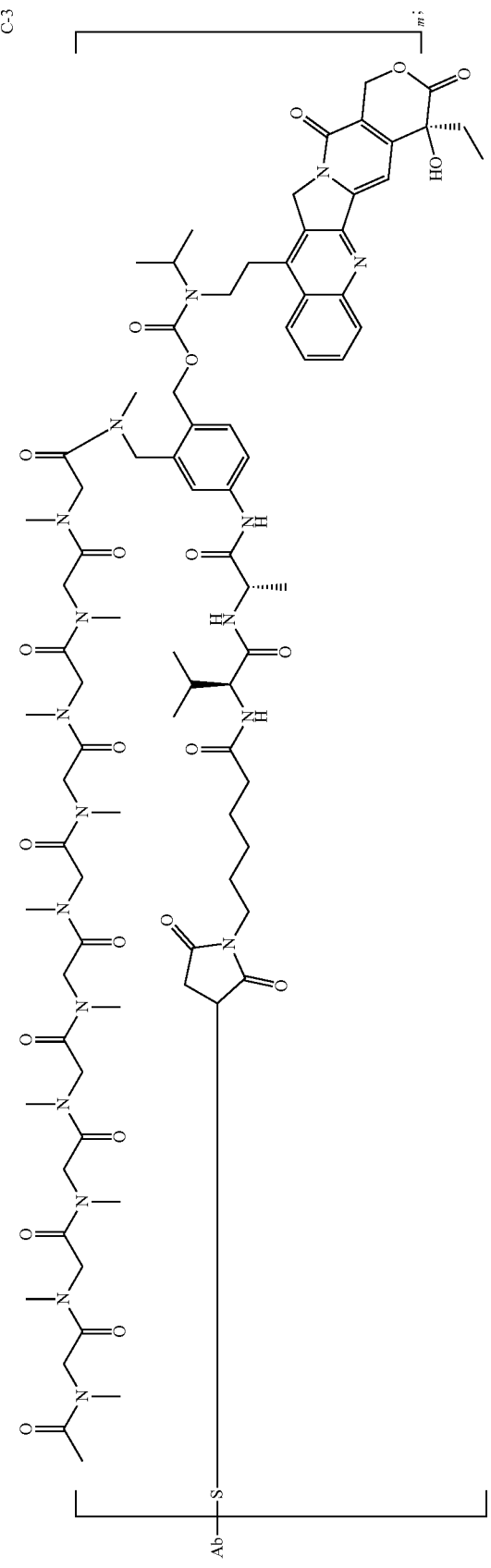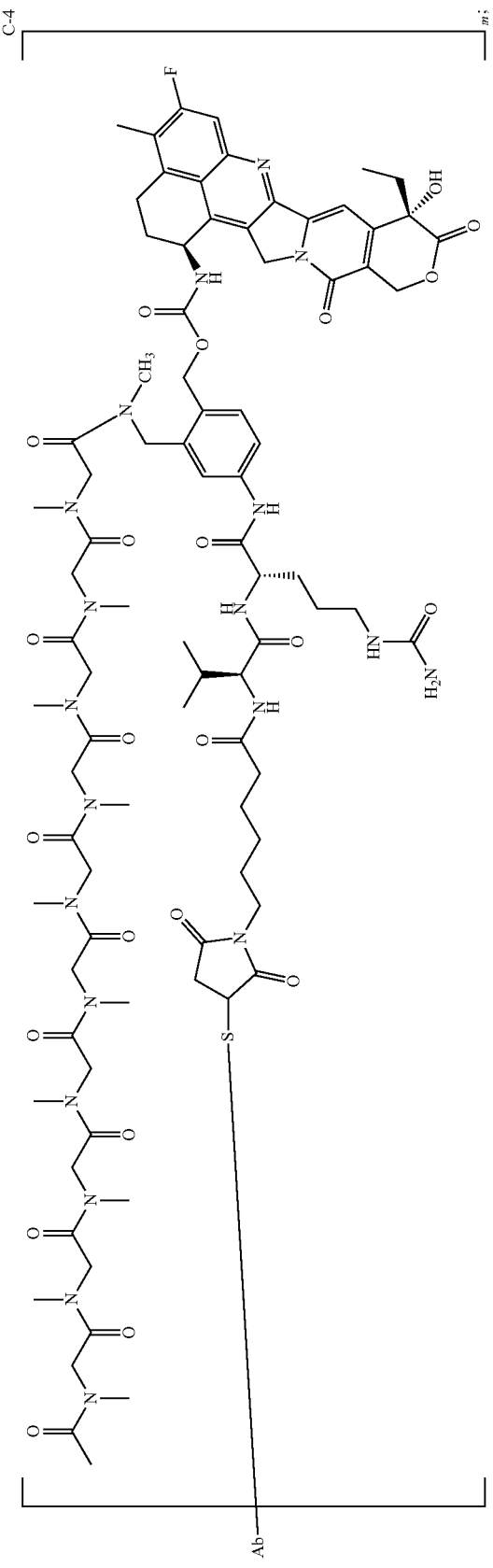

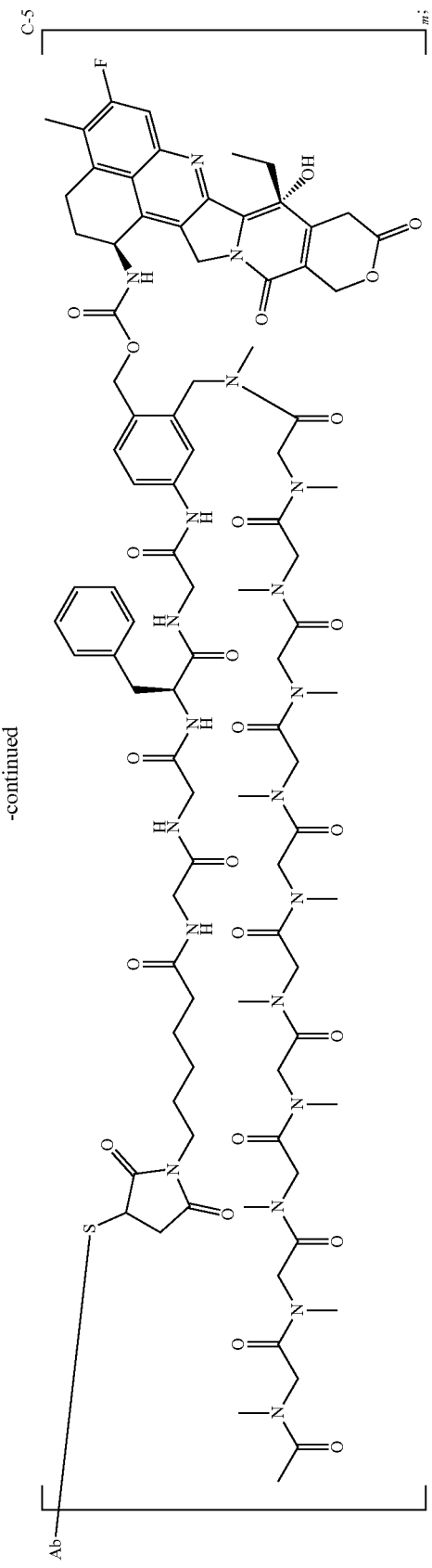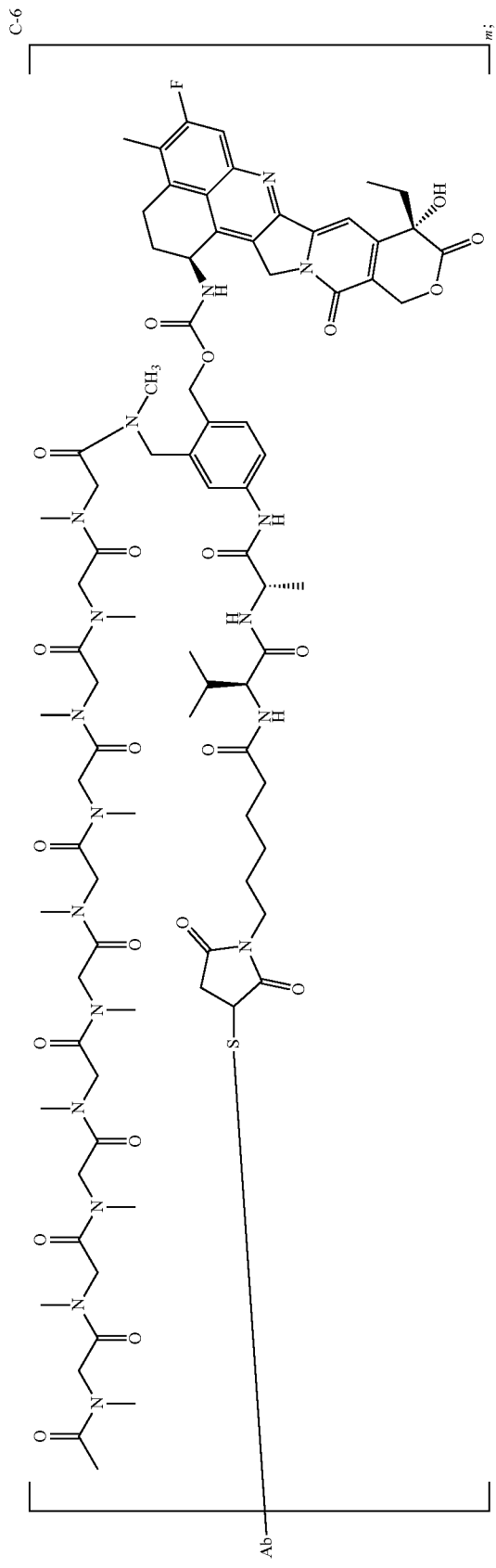

C-7
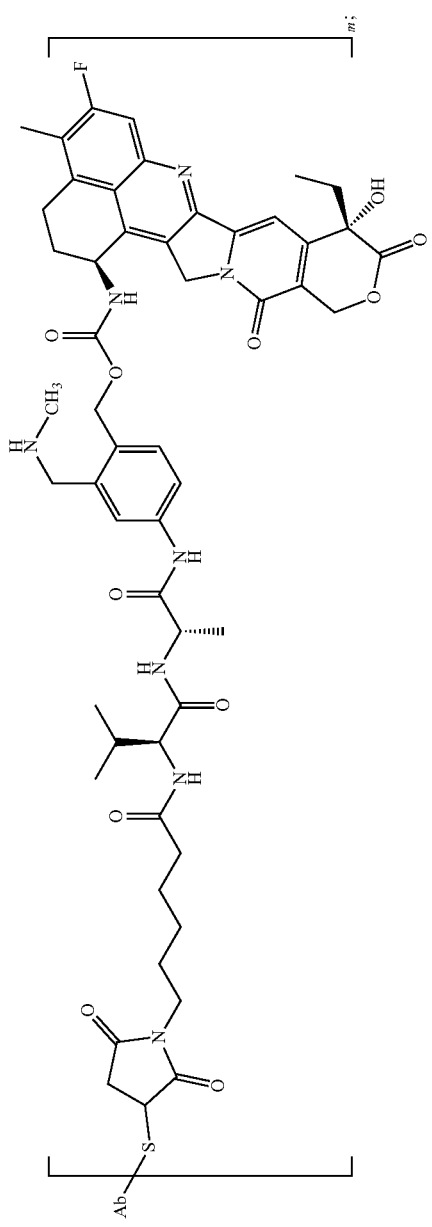
C-8
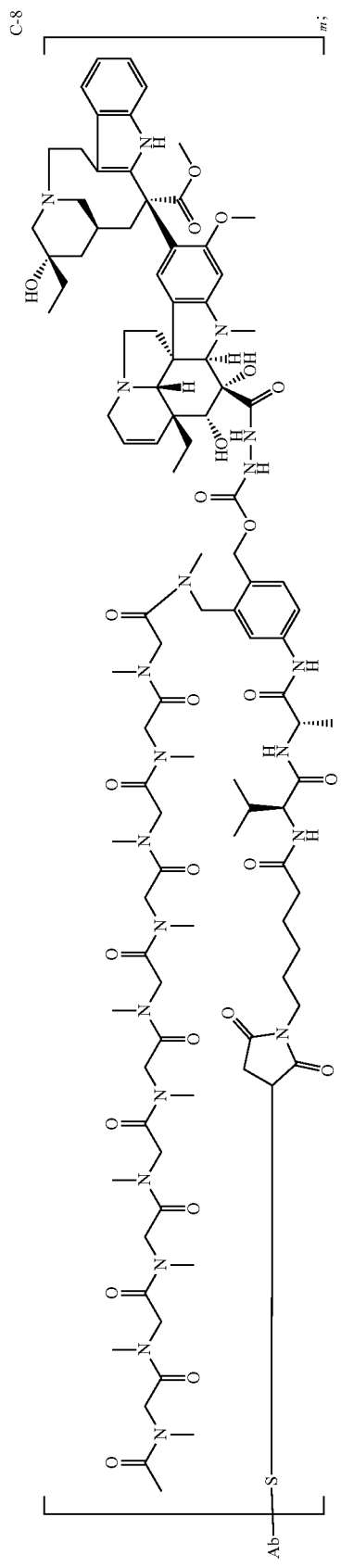

C-9
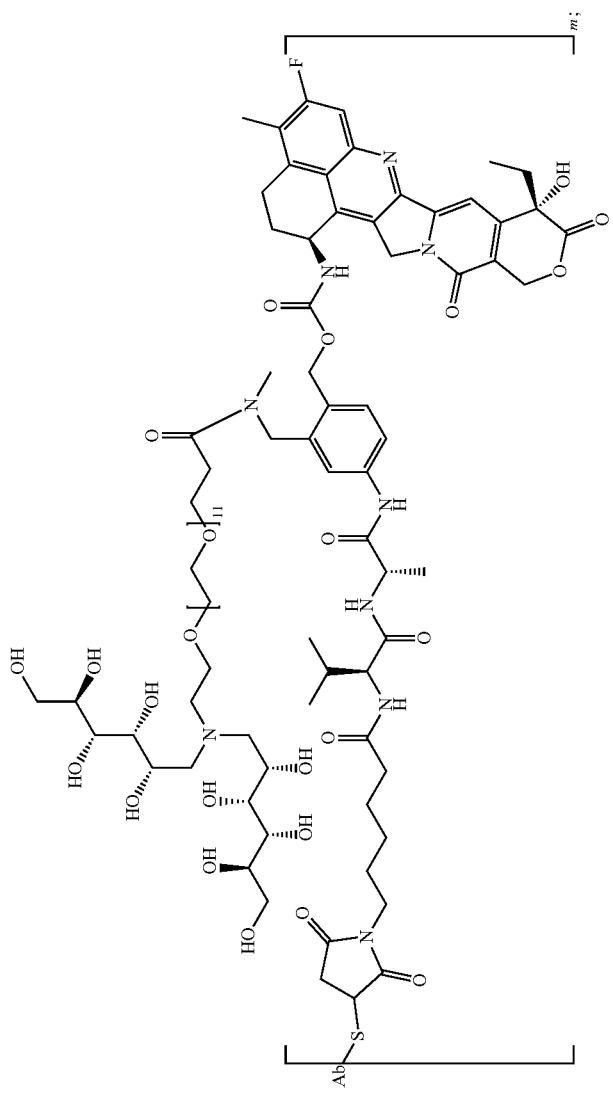

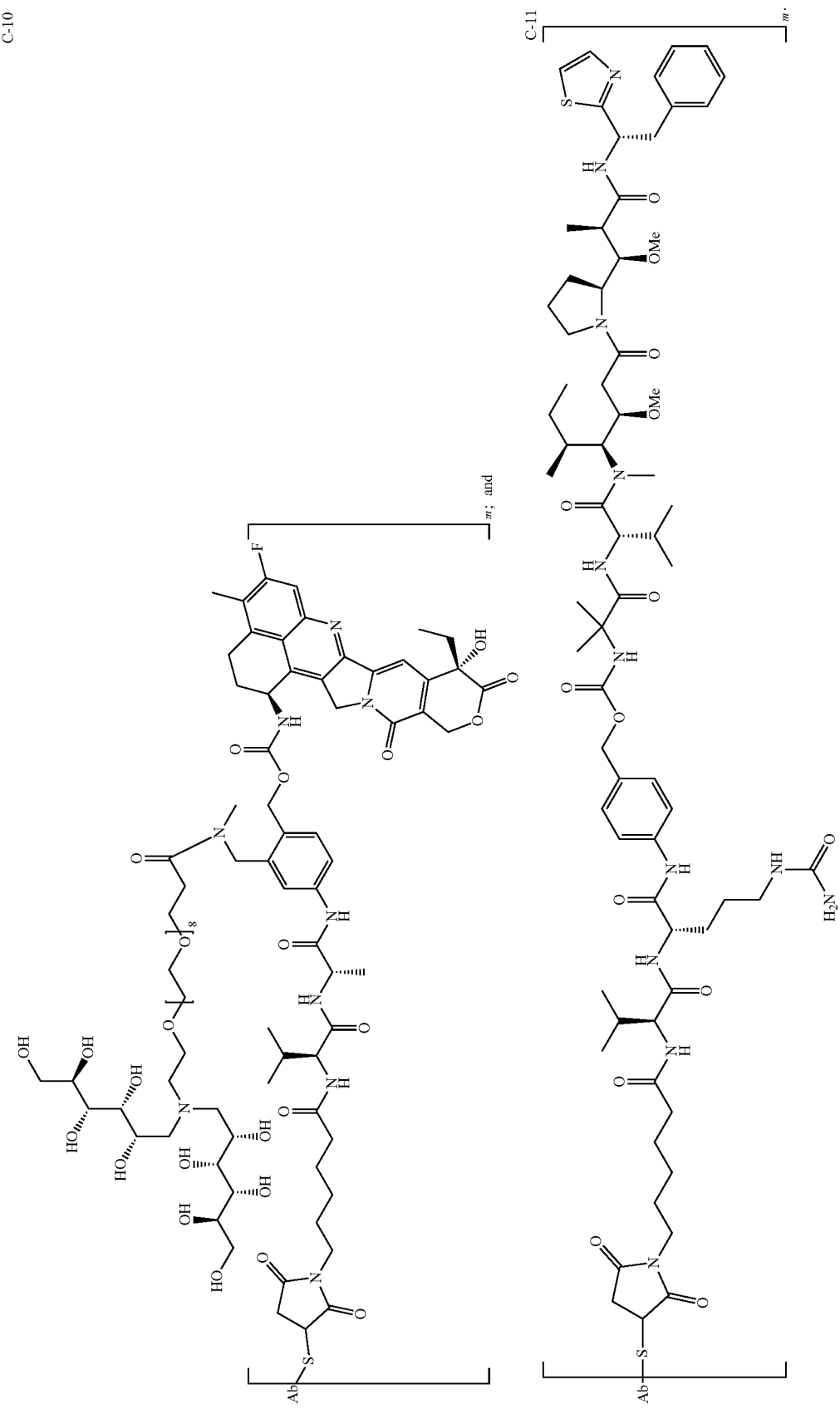

15. An anti-PTK7 antibody or an antigen-binding fragment thereof, comprising:
(a) a heavy chain variable region (VH) comprising a heavy chain complementarity determining region 1 (HC CDR1), a heavy chain complementarity determining region 2 (HC CDR2), and a heavy chain complementarity determining region 3 (HC CDR3), wherein:
HC CDR1 is SEQ ID NO: 1, HC CDR2 is SEQ ID NO: 2, and HC CDR3 is SEQ ID NO: 3; or
HC CDR1 is SEQ ID NO: 7, HC CDR2 is SEQ ID NO: 8, and HC CDR3 is SEQ ID NO:3; or
HC CDR1 is SEQ ID NO: 13, HC CDR2 is SEQ ID NO: 14, and HC CDR3 is SEQ ID NO: 15; and
(b) a light chain variable region (VL) comprising a light chain complementarity determining region 1 (LC CDR1), a light chain complementarity determining region 2 (LC CDR2), and a light chain complementarity determining region 3 (LC CDR3), wherein:
LC CDR1 is SEQ ID NO: 4, LC CDR2 is SEQ ID NO: 5, and LC CDR3 is SEQ ID NO: 6; or
LC CDR1 is SEQ ID NO: 10, LC CDR2 is SEQ ID NO: 11, and LC CDR3 is SEQ ID NO: 12; or
LC CDR1 is SEQ ID NO: 16, LC CDR2 is SGS, and LC CDR3 is SEQ ID NO: 18.

16. The antibody or the antigen-binding fragment thereof of claim 15, wherein the VH comprises an amino acid sequence having at least 90% sequence identity to SEQ ID NO: 21 or SEQ ID NO: 22.

17. The antibody or the antigen-binding fragment thereof of claim 16, wherein the VH comprises the amino acid sequence of SEQ ID NO: 21 or SEQ ID NO: 22.

18. The antibody or the antigen binding fragment thereof of claim 15, wherein the VL comprises an amino acid sequence having at least 90% sequence identity to any one of SEQ ID NOs: 23-25.

19. The antibody or the antigen-binding fragment thereof of claim 16, wherein the VL comprises the amino acid sequence of any one of SEQ ID NOs: 23-25.

20. The antibody or the antigen binding fragment thereof of claim 15, wherein the antibody or the antigen-binding fragment thereof is humanized.

21. The antibody or the antigen binding fragment thereof of claim 15, further comprising a heavy chain constant region derived from a human immunoglobulin.

22. The antibody or the antigen binding fragment thereof of claim 21, wherein the human immunoglobulin is IgG1, IgG2, IgG3, or IgG4.

23. The antibody or the antigen binding fragment thereof of claim 15, further comprising a light chain constant region that is a κ light chain constant region or a λ light chain constant region.

24. The antibody or the antigen binding fragment thereof of claim 15, wherein the antibody or the antibody binding fragment thereof is selected from the group consisting of: a monoclonal antibody, a humanized antibody, a chimeric antibody, a bispecific antibody, a polyspecific antibody, a single-chain antibody, dAb, Fv, single-chain Fv (scFv), Fab, Fab', and F(ab')$_2$.

25. A method of preparing a compound or a pharmaceutically acceptable salt thereof, comprising:
contacting Ab with a compound selected from formula L-D-1 to L-D-11:

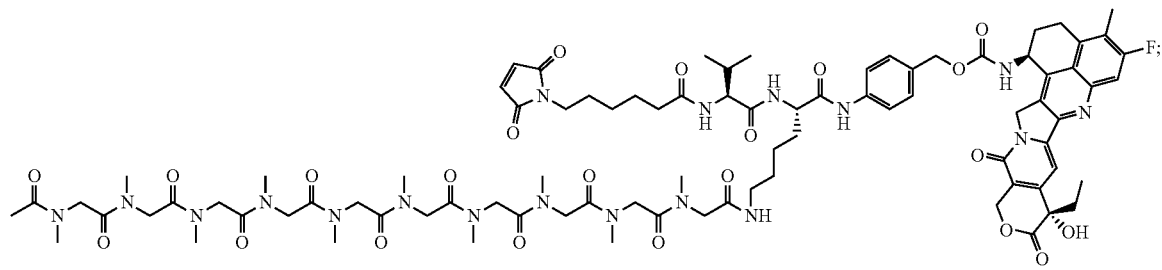

L-D-1

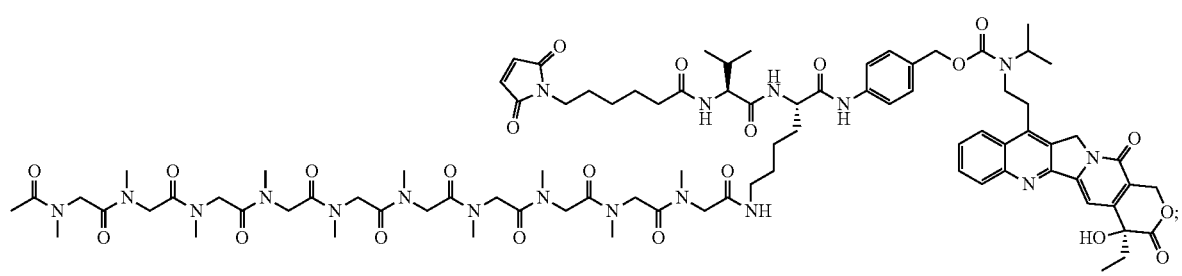

L-D-2

-continued
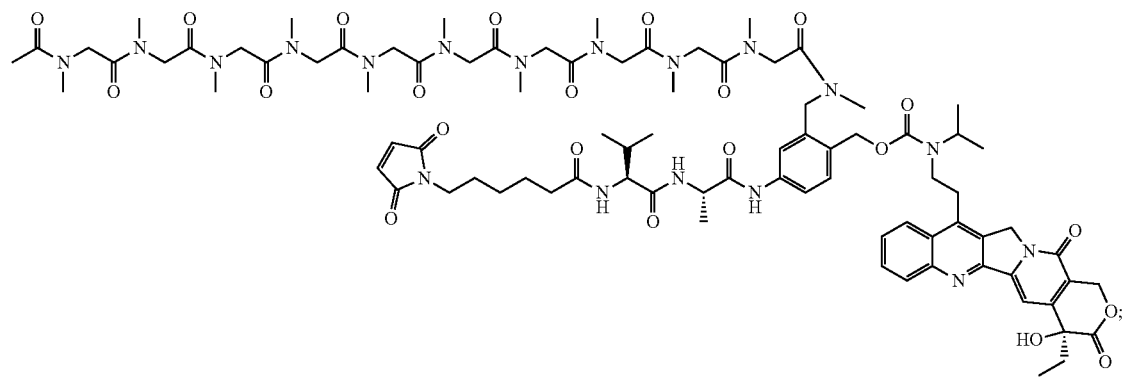
L-D-3
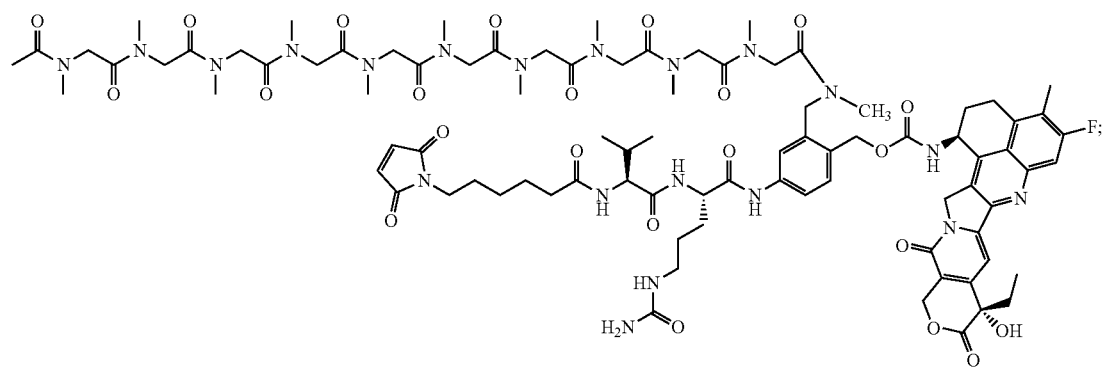
L-D-4
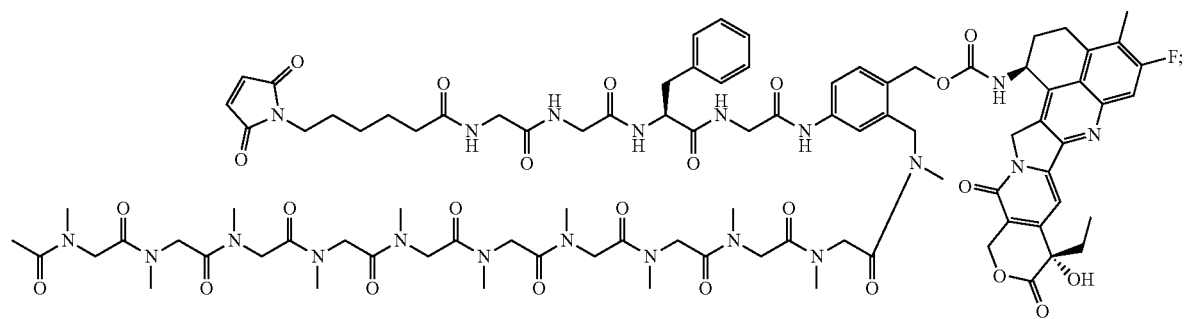
L-D-5
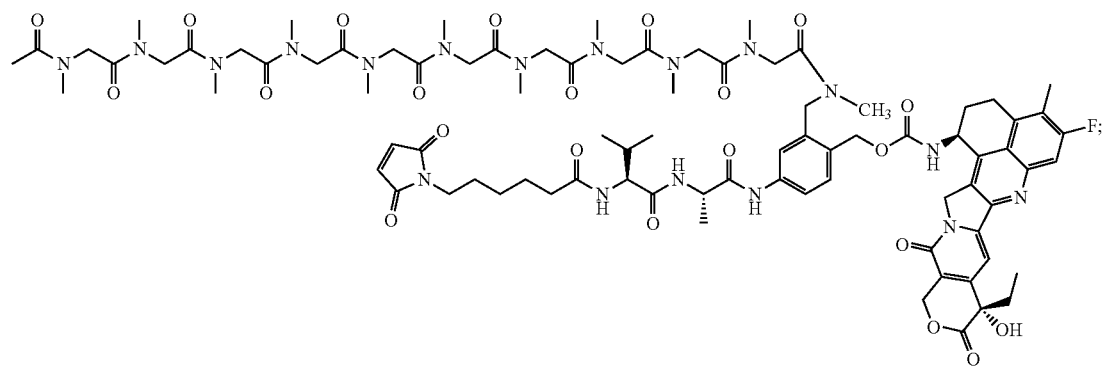
L-D-6

-continued
L-D-7
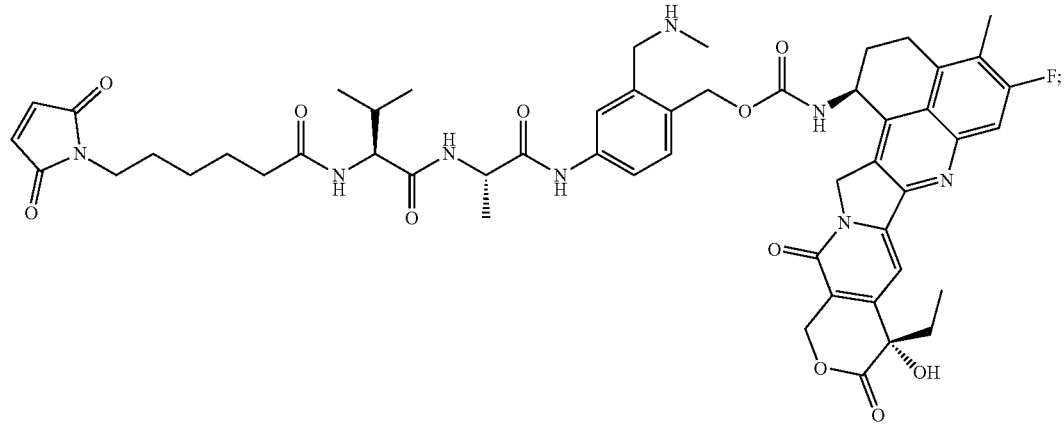
L-D-8
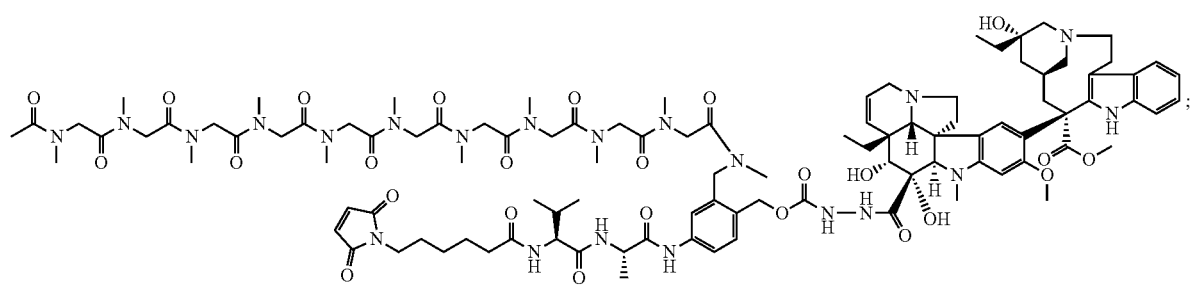
L-D-9
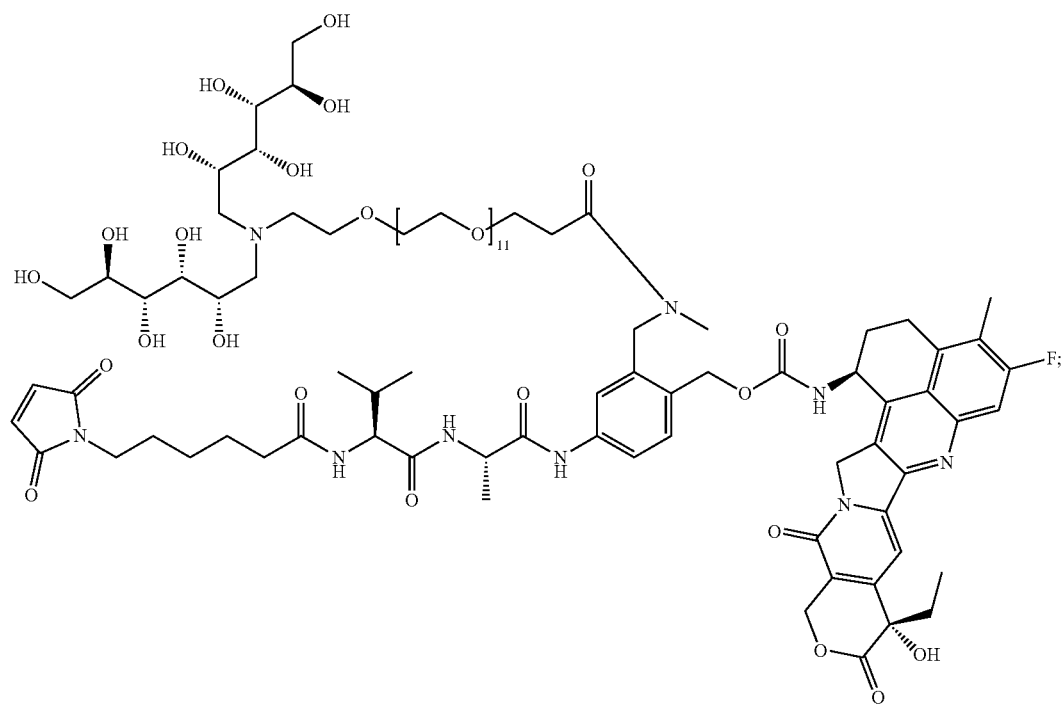

-continued

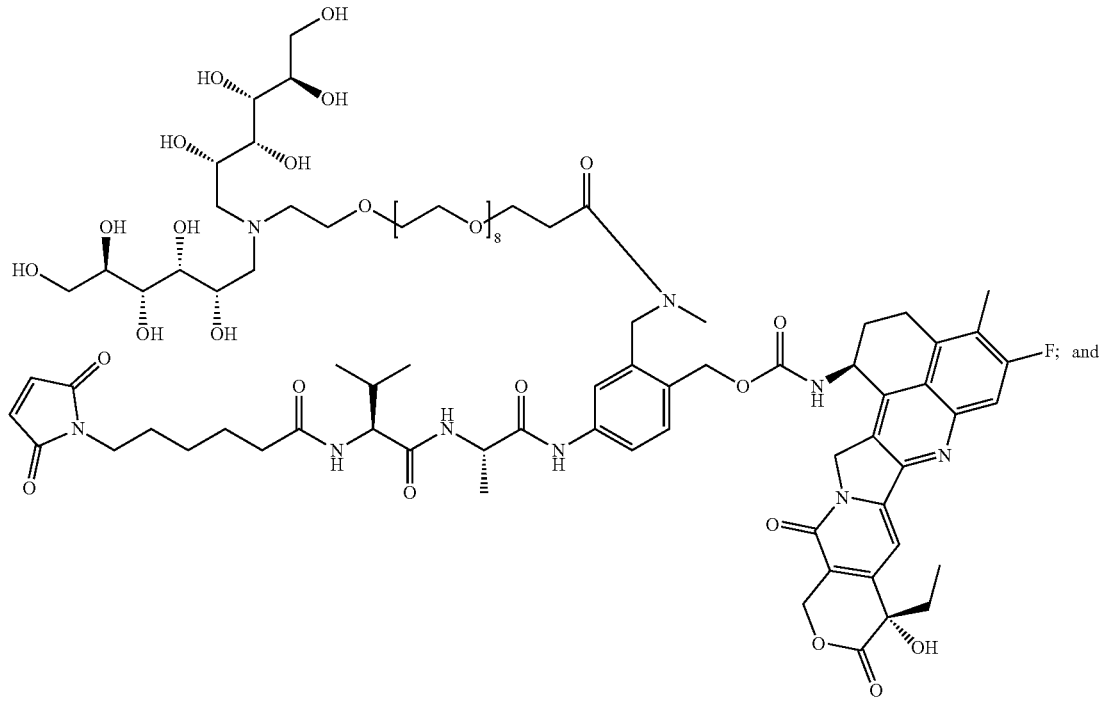

L-D-10

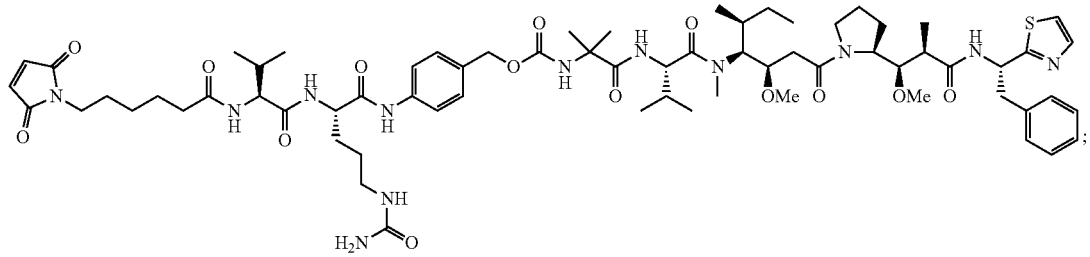

L-D-11

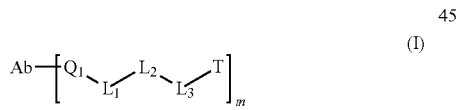

vc-Aur0101 (MC-VC-PABC-Aur0101)

to obtain a compound of formula (I):

$$Ab\text{---}\left[Q_1\text{---}L_1\text{---}L_2\text{---}L_3\text{---}T\right]_m \quad (I)$$

wherein:

Ab is an anti-PTK7 antibody or antigen-binding fragment thereof comprising:
 (a) a heavy chain variable region (VH) comprising a heavy chain complementarity determining region 1 (HC CDR1), a heavy chain complementarity determining region 2 (HC CDR2), and a heavy chain complementarity determining region 3 (HC CDR3), wherein:
  HC CDR1 is SEQ ID NO: 1, HC CDR2 is SEQ ID NO: 2, and HC CDR3 is SEQ ID NO: 3; or
  HC CDR1 is SEQ ID NO: 7, HC CDR2 is SEQ ID NO: 8, and HC CDR3 is SEQ ID NO:3; or
  HC CDR1 is SEQ ID NO: 13, HC CDR2 is SEQ ID NO: 14, and HC CDR3 is SEQ ID NO: 15; and
 (b) a light chain variable region (VL) comprising a light chain complementarity determining region 1 (LC CDR1), a light chain complementarity determining region 2 (LC CDR2), and a light chain complementarity determining region 3 (LC CDR3), wherein:
  LC CDR1 is SEQ ID NO: 4, LC CDR2 is SEQ ID NO: 5, and LC CDR3 is SEQ ID NO: 6; or
  LC CDR1 is SEQ ID NO: 10, LC CDR2 is SEQ ID NO: 11, and LC CDR3 is SEQ ID NO: 12; or
  LC CDR1 is SEQ ID NO: 16, LC CDR2 is SGS, and LC CDR3 is SEQ ID NO: 18.

26. A method of treating a disease or disorder in a subject in need thereof, comprising administering the compound or the pharmaceutical salt thereof of claim 1, in an amount effective to treat the disease or disorder, wherein the disease or disorder is a PTK7 expressing cancer.

27. The method of claim 26, wherein the cancer is selected from the group consisting of: lung cancer, urethral cancer, prostate cancer, ovarian cancer, pancreatic cancer, breast cancer, bladder cancer, gastric cancer, gastrointestinal stromal tumor, cervical cancer, esophageal cancer, squamous cell carcinoma, squamous carcinoma of head and neck, peritoneal cancer, liver cancer, colorectal cancer, endometrial cancer, uterine cancer, salivary gland cancer, renal cancer, vulvar cancer, thyroid cancer, penile cancer, leukemia, malignant lymphoma, plasmacytoma, myeloma, and sarcoma.

28. The method of claim 26, wherein the cancer is lung cancer, breast cancer, colorectal cancer, esophageal cancer, cervical cancer, squamous carcinoma of head and neck, ovarian cancer, or endometrial cancer.

29. The compound or pharmaceutically acceptable salt thereof of claim 1, wherein the VH comprises the amino acid sequence of SEQ ID NO: 21 or SEQ ID NO: 22 and wherein the VL comprises the amino acid sequence of any one of SEQ ID NOs: 23-25.

30. The method of claim 25, wherein the VH comprises the amino acid sequence of SEQ ID NO: 21 or SEQ ID NO: 22 and wherein the VL comprises the amino acid sequence of any one of SEQ ID NOs: 23-25.

31. The compound or pharmaceutically acceptable salt thereof of claim 1, wherein the compound is

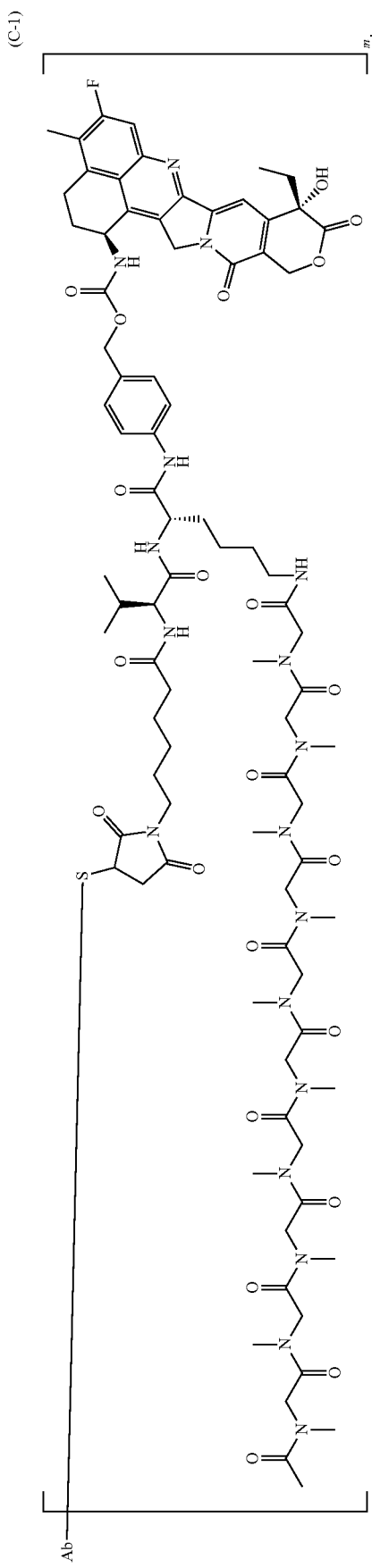

32. The compound or pharmaceutically acceptable salt thereof of claim 1, wherein the compound is

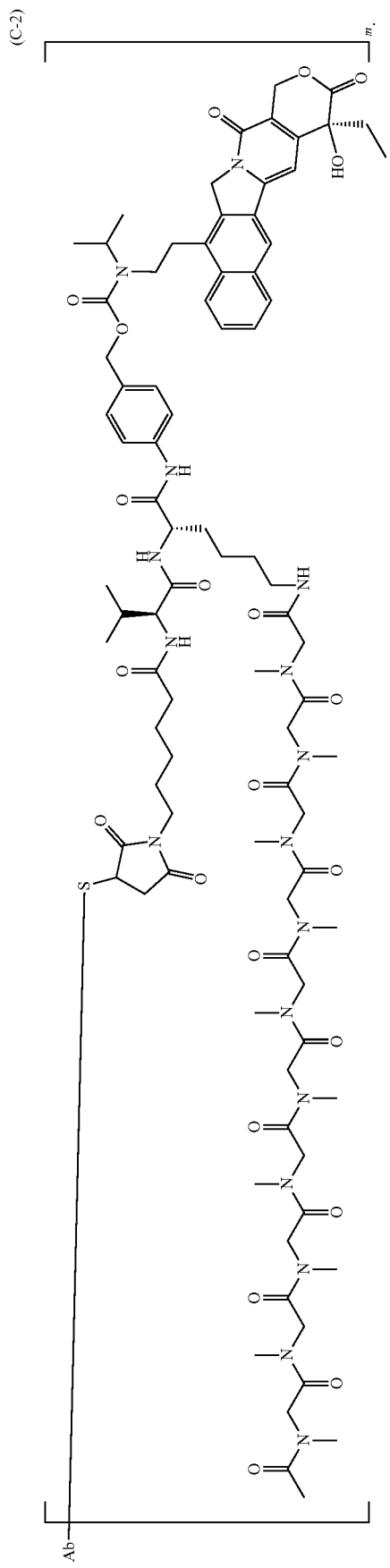

33. The compound or pharmaceutically acceptable salt thereof of claim 1, wherein the compound is

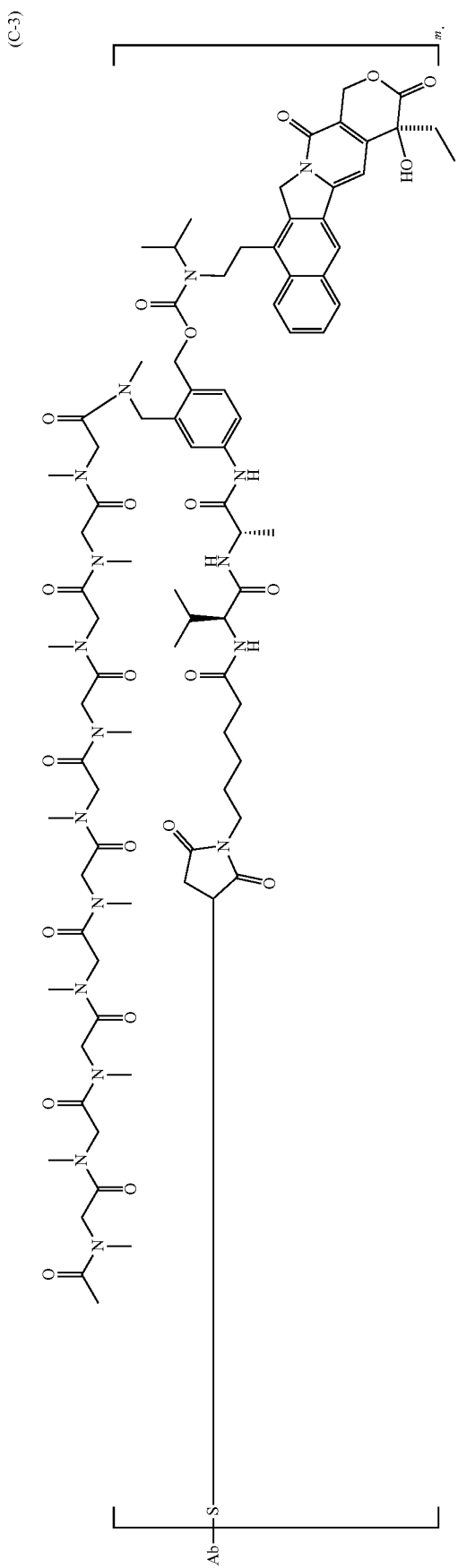

34. The compound or pharmaceutically acceptable salt thereof of claim 1, wherein the compound is

35. The compound or pharmaceutically acceptable salt thereof of claim 1, wherein the compound is

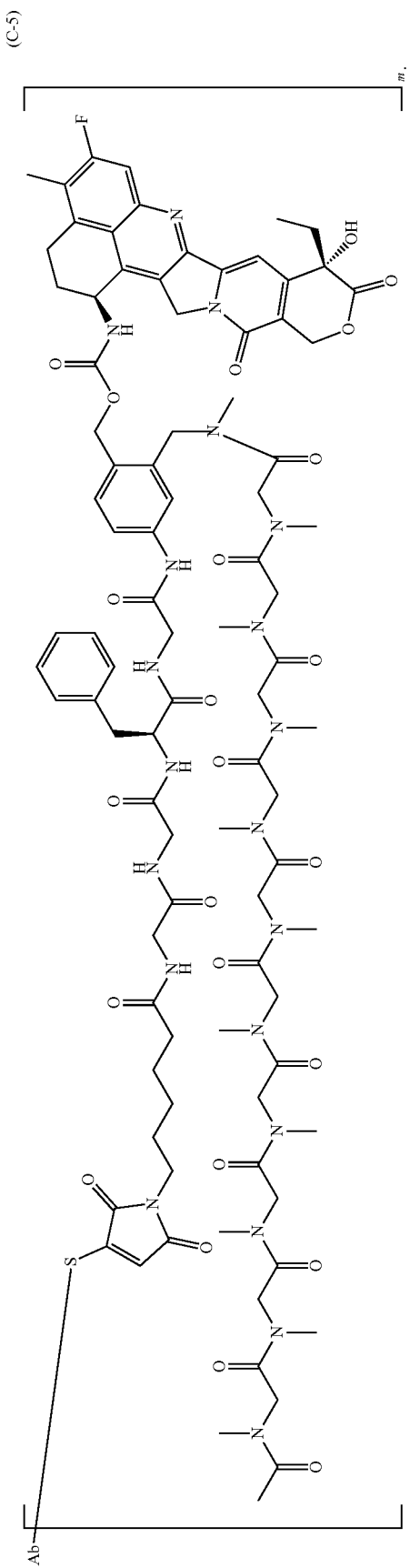

36. The compound or pharmaceutically acceptable salt thereof of claim 1, wherein the compound is
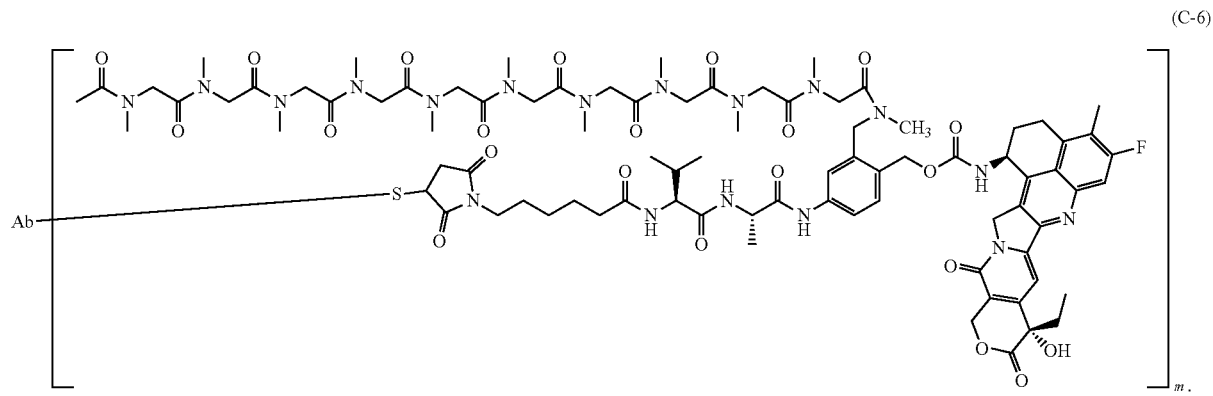
(C-6)
37. The compound or pharmaceutically acceptable salt thereof of claim 1, wherein the compound is
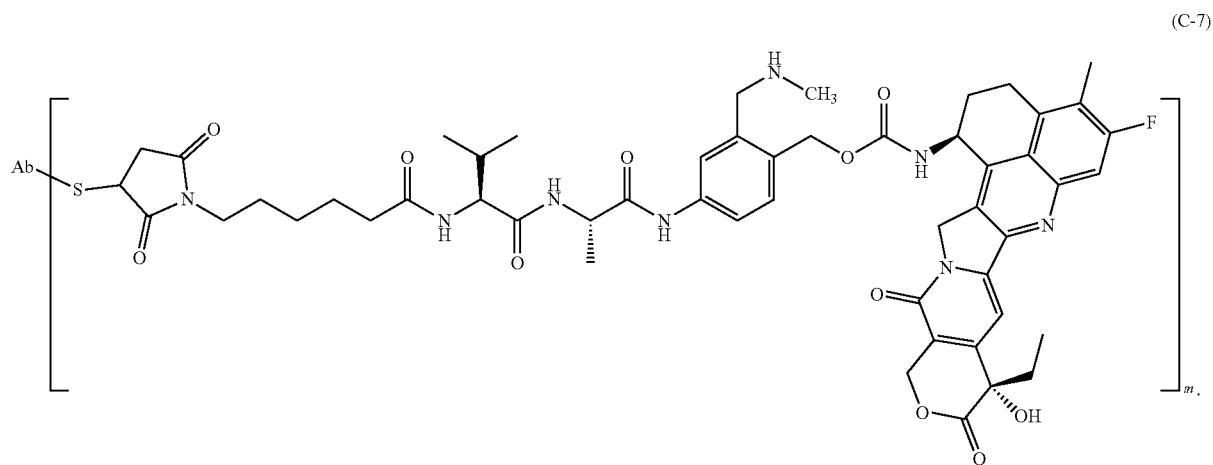
(C-7)
38. The compound or pharmaceutically acceptable salt thereof of claim 1, wherein the compound is

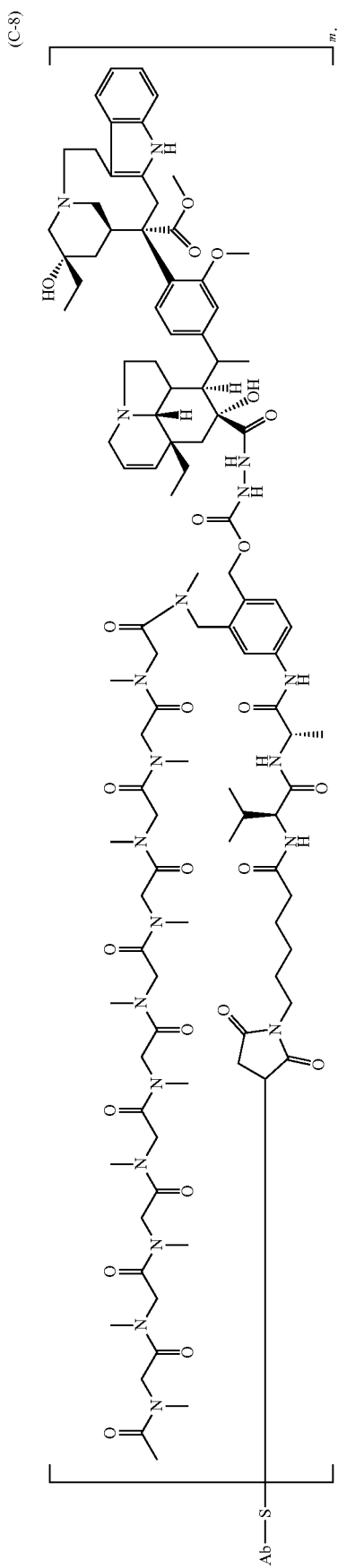

39. The compound or pharmaceutically acceptable salt thereof of claim 1, wherein the compound is
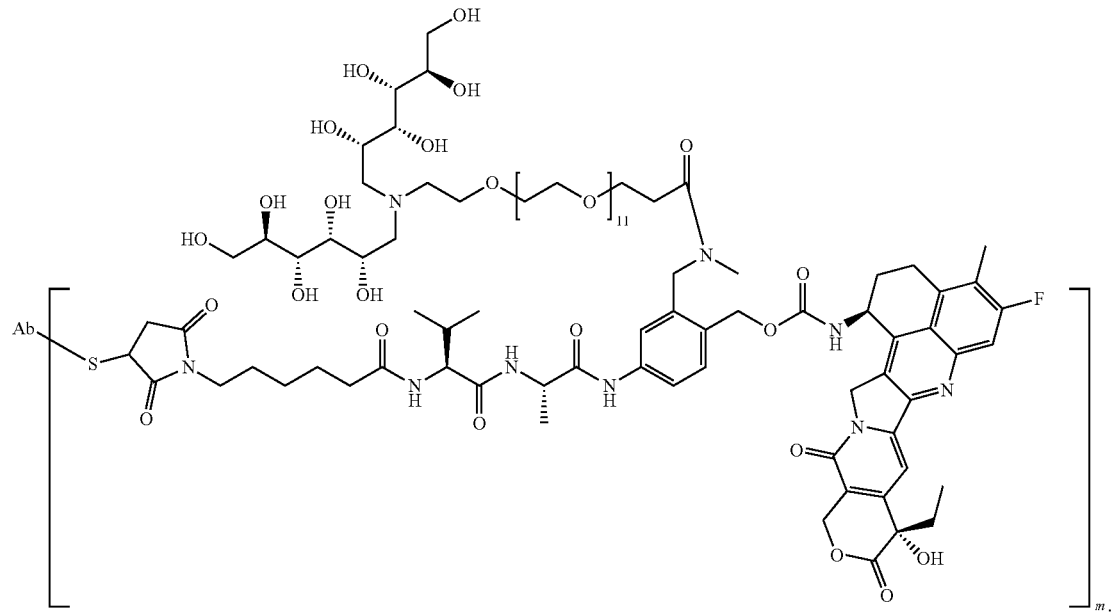
(C-9)
40. The compound or pharmaceutically acceptable salt thereof of claim 1, wherein the compound is
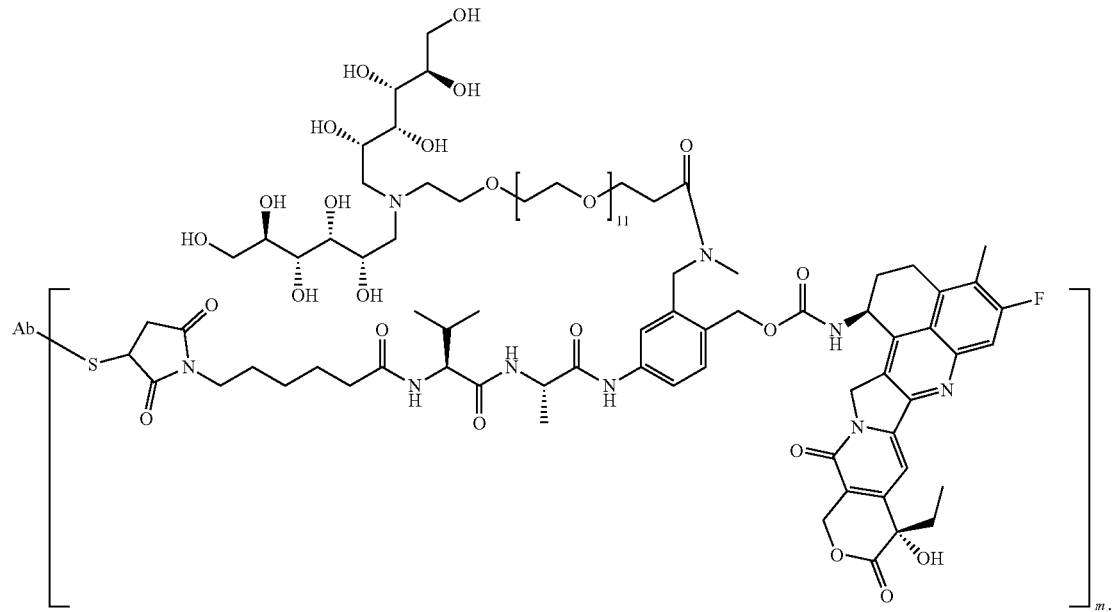
(C-10)

41. The compound or pharmaceutically acceptable salt thereof of claim 1, wherein the compound is
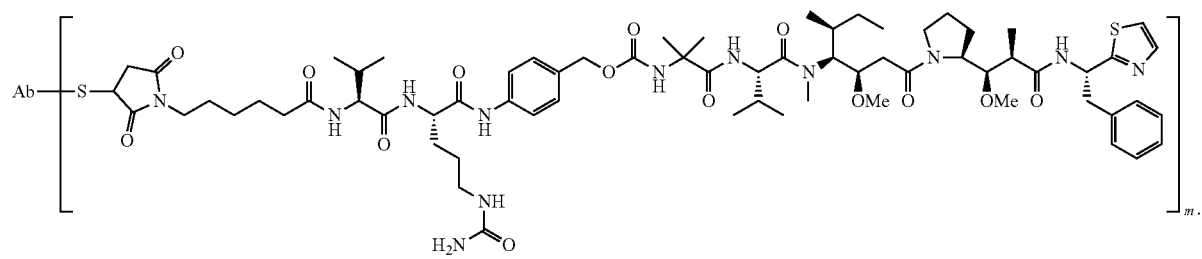
(C-11)
* * * * *